(12) United States Patent
Gaziano

(10) Patent No.: US 12,480,457 B2
(45) Date of Patent: Nov. 25, 2025

(54) INTERNAL COMBUSTION ENGINE

(71) Applicant: Philip Franklin Gaziano, Wilbraham, MA (US)

(72) Inventor: Philip Franklin Gaziano, Wilbraham, MA (US)

( * ) Notice: Subject to any disclaimer, the term of this patent is extended or adjusted under 35 U.S.C. 154(b) by 0 days.

(21) Appl. No.: 18/944,863

(22) Filed: Nov. 12, 2024

(65) Prior Publication Data

US 2025/0154921 A1 May 15, 2025

Related U.S. Application Data

(62) Division of application No. 18/440,717, filed on Feb. 13, 2024, now Pat. No. 12,228,091.

(Continued)

(51) Int. Cl.
*F02F 1/00* (2006.01)
*F02F 1/06* (2006.01)
(Continued)

(52) U.S. Cl.
CPC ............. *F02F 1/14* (2013.01); *F02F 1/004* (2013.01); *F02F 1/06* (2013.01); *F16C 5/00* (2013.01)

(58) Field of Classification Search
CPC .... F02F 1/004; F02F 1/243; F02F 3/02; F02F 3/10; F02F 3/12; F02F 3/0084;
(Continued)

(56) References Cited

U.S. PATENT DOCUMENTS

| 4,011,842 A | | 3/1977 | Davies et al. |
| 4,921,734 A | * | 5/1990 | Thorpe ................ F16J 10/04 123/193.2 |

(Continued)

FOREIGN PATENT DOCUMENTS

| CA | 2 159 232 A1 | 3/1996 |
| CH | 466 944 A | 12/1968 |

(Continued)

OTHER PUBLICATIONS

INCONEL Trademark Search Results, obtained from https://www.uspto.gov/trademarks.*

*Primary Examiner* — Grant Moubry
*Assistant Examiner* — James G Moubry
(74) *Attorney, Agent, or Firm* — Knobbe Martens Olson & Bear LLP

(57) ABSTRACT

An internal combustion engine has a uniblock that defines a blind cylinder bore that terminates within the uniblock. A piston is inserted into the cylinder bore from a bottom end of the cylinder bore. Parallel first and second vertical planes extend along first and second lateral sides of the cylinder bore. A cylinder zone being defined between the first and second vertical planes. A crosshead is coupled to the piston. A first crankshaft has a first crankshaft axis that extends parallel to the first vertical plane and that is positioned outside of the cylinder zone. A second crankshaft has a second crankshaft axis that extends parallel to the second vertical plane and that is positioned outside of the cylinder zone. The first crankshaft is coupled to the crosshead with a first connecting rod and the second crankshaft is coupled to the crosshead with a second connecting rod.

23 Claims, 54 Drawing Sheets

Related U.S. Application Data

(60) Provisional application No. 63/597,654, filed on Nov. 9, 2023.

(51) Int. Cl.
  *F02F 1/14* (2006.01)
  *F16C 5/00* (2006.01)

(58) Field of Classification Search
  CPC ........... F02F 2001/244; F02F 2001/249; F02B 77/11; F16J 1/01; F16J 10/04
  See application file for complete search history.

(56) References Cited

U.S. PATENT DOCUMENTS

| | | | |
|---|---|---|---|
| 4,957,081 A * | 9/1990 | Ito | F01L 3/22 123/193.5 |
| 5,421,293 A | 6/1995 | Noltemeyer et al. | |
| 5,954,038 A * | 9/1999 | Warwick | F02F 1/166 123/668 |
| 6,539,835 B1 | 4/2003 | Rasmussen et al. | |
| 7,533,648 B2 * | 5/2009 | Moller | F02F 1/40 123/193.3 |
| 7,895,936 B2 * | 3/2011 | Hofbauer | F02F 3/0023 92/159 |
| 8,360,028 B2 | 1/2013 | Betzmeir et al. | |
| 10,202,909 B2 | 2/2019 | Okazaki | |
| 10,801,403 B2 * | 10/2020 | Nishikawa | C25D 11/26 |
| 12,044,191 B2 * | 7/2024 | Eckroth | F02F 1/22 |
| 2007/0012180 A1 * | 1/2007 | Miyamoto | C23C 24/04 123/193.2 |
| 2009/0071434 A1 * | 3/2009 | MacMillan | F02B 77/11 123/193.6 |
| 2009/0151708 A1 | 6/2009 | Schouweiler, Jr. | |
| 2013/0213332 A1 | 8/2013 | Yano | |
| 2015/0136089 A1 | 5/2015 | Tanaka | |
| 2015/0240742 A1 | 8/2015 | Takahara | |
| 2016/0215692 A1 * | 7/2016 | Warey | F01P 3/02 |
| 2016/0319738 A1 | 11/2016 | Yamada et al. | |
| 2016/0356239 A1 * | 12/2016 | Graham | F02F 1/16 |
| 2017/0159602 A1 | 6/2017 | Park et al. | |
| 2017/0219006 A1 | 8/2017 | Chandrashekar | |
| 2017/0248099 A1 * | 8/2017 | Wagner | F02B 75/282 |
| 2017/0328299 A1 * | 11/2017 | Kim | C23C 4/11 |
| 2020/0080587 A1 * | 3/2020 | Campbell | F16J 1/08 |

FOREIGN PATENT DOCUMENTS

| | | | |
|---|---|---|---|
| CN | 204 099 043 U | 1/2015 | |
| CN | 112228236 A * | 1/2021 | ............. F02F 1/004 |
| CN | 116 335 817 A | 6/2023 | |
| DE | 8334059 U1 | 7/1985 | |
| DE | 10314683 | 11/2004 | |
| DE | 102008018949 A1 | 11/2008 | |
| DE | 102008060463 A1 * | 6/2010 | ................ F02F 1/00 |
| DE | 10 2016 210822 A1 | 12/2016 | |
| EP | 0649979 A1 * | 4/1995 | ............. F02B 77/11 |
| EP | 1 775 455 A2 | 4/2007 | |
| EP | 2396521 B1 | 3/2017 | |
| FR | 2 869 951 A1 | 11/2005 | |
| GB | 1344612 A * | 1/1974 | |
| JP | 2013 024142 A | 2/2013 | |
| KR | 101 709 624 B1 | 2/2017 | |
| WO | WO 95/18917 A1 | 7/1995 | |
| WO | WO 98/23855 A1 | 6/1998 | |
| WO | WO 2016/041298 A1 | 3/2016 | |
| WO | WO-2016056161 A1 * | 4/2016 | .......... F02B 23/0603 |
| WO | WO 2017/087733 A1 | 5/2017 | |

\* cited by examiner

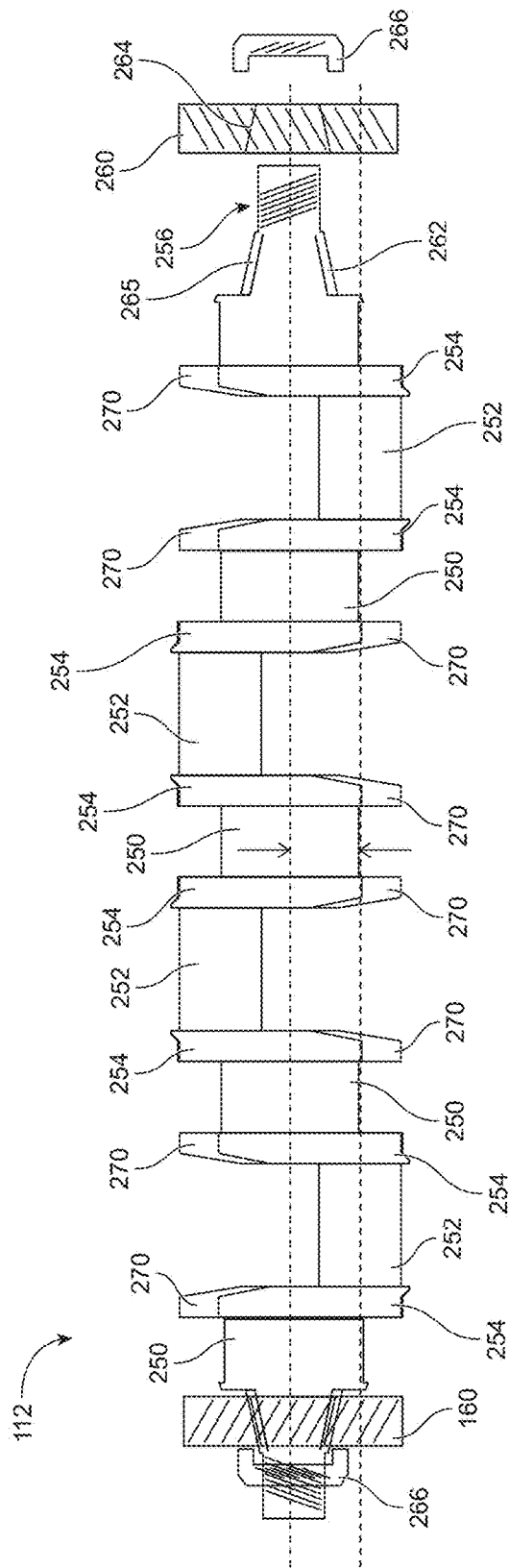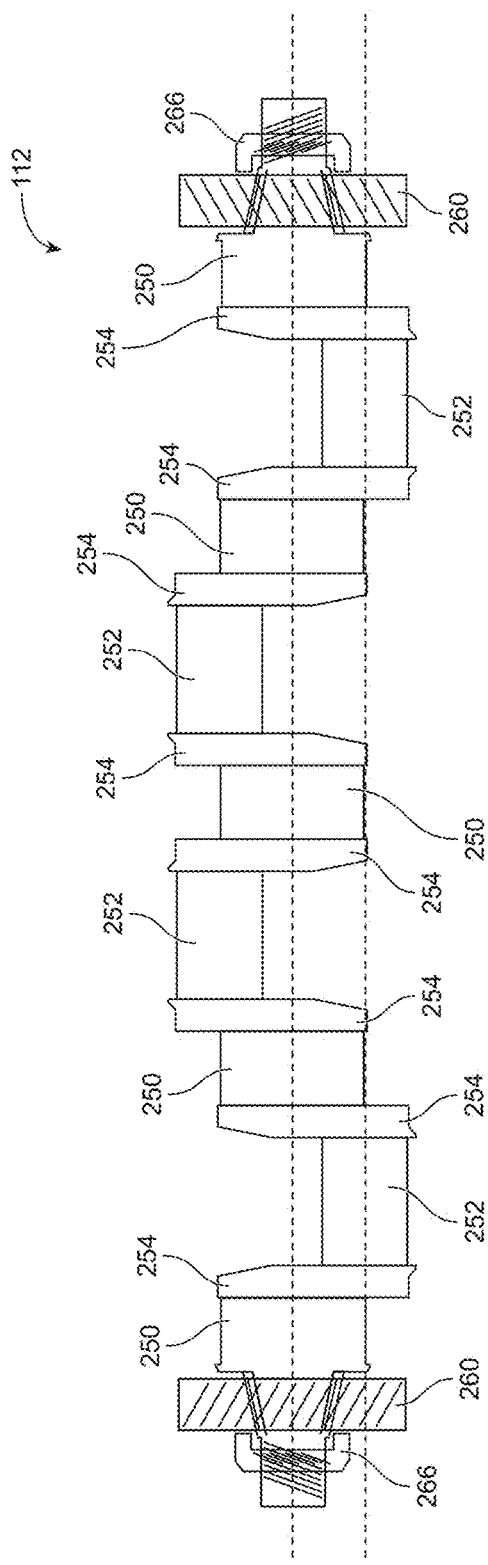
FIG. 9
FIG. 10

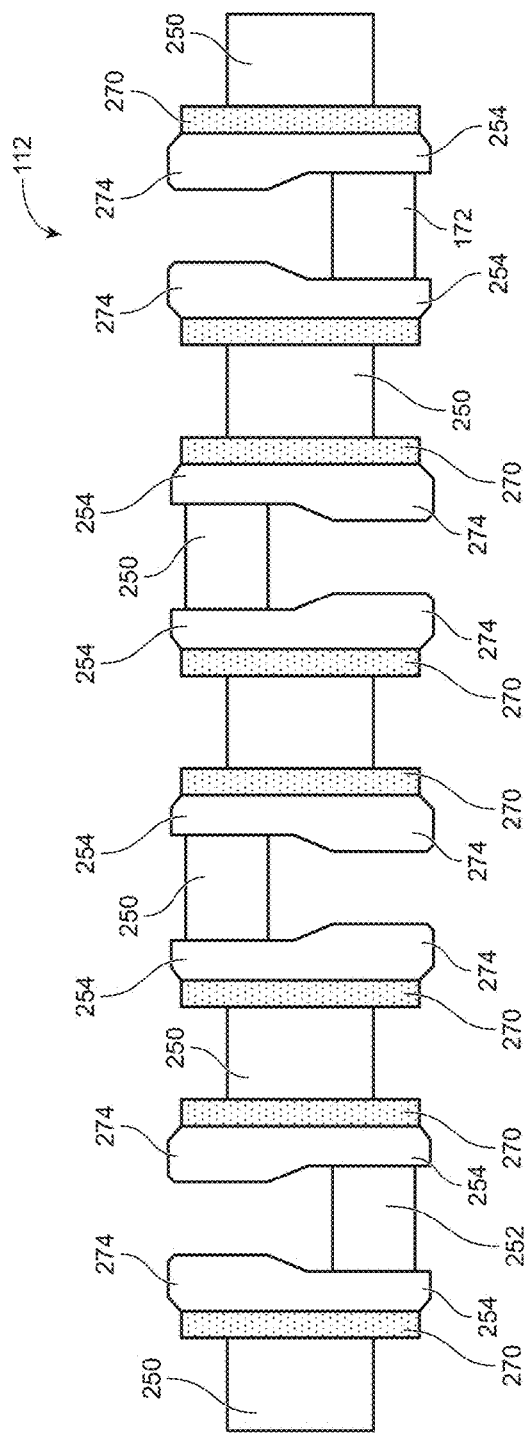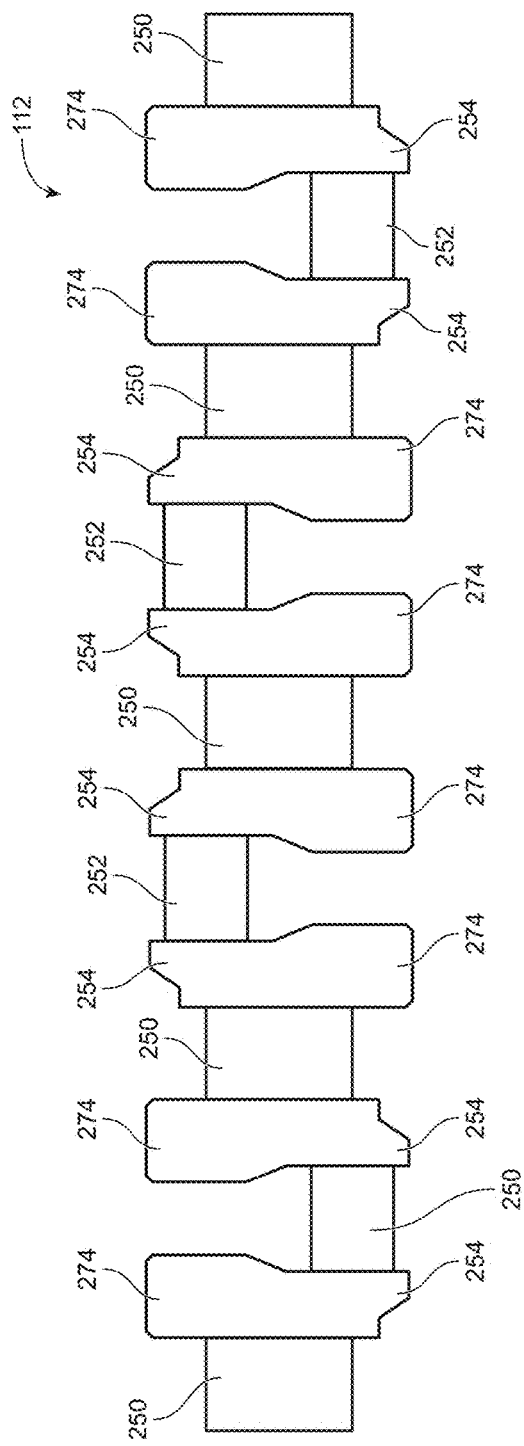
FIG. 11
FIG. 12

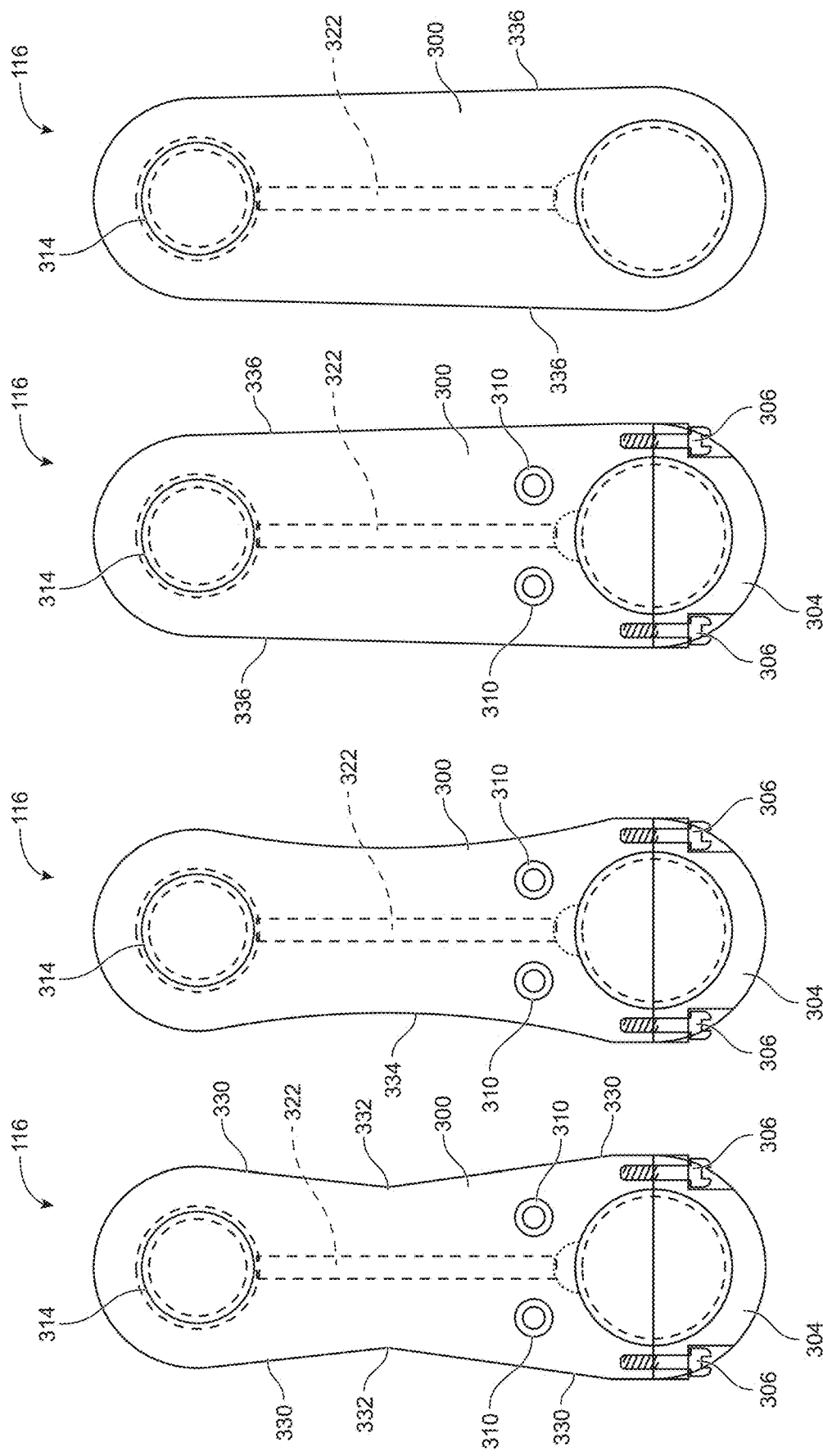

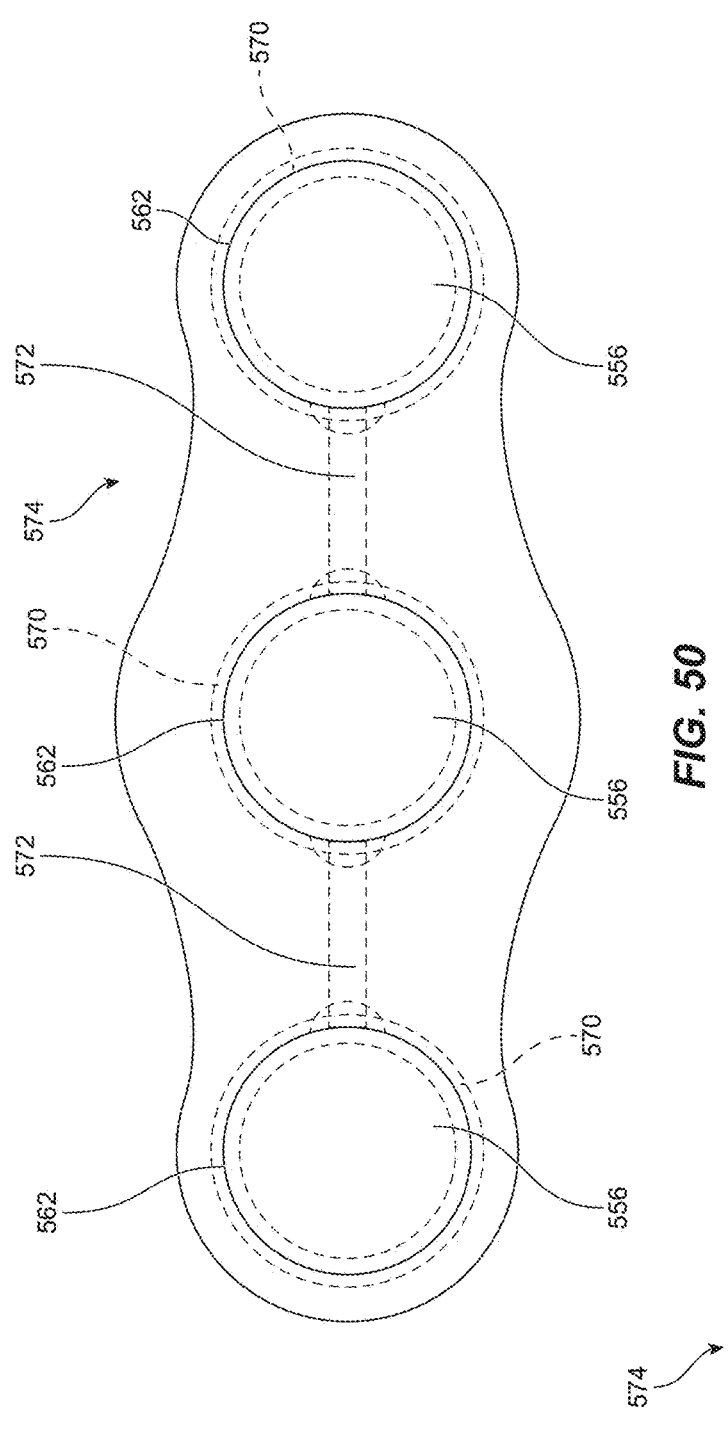
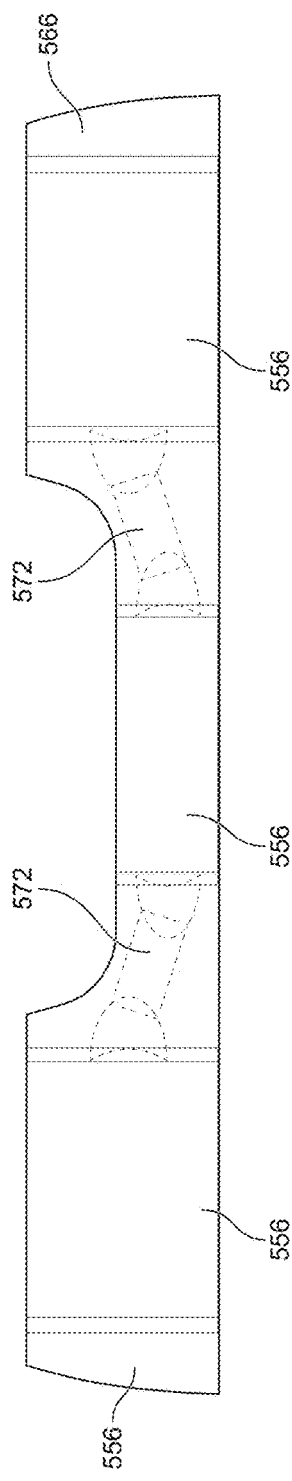
FIG. 50
FIG. 51

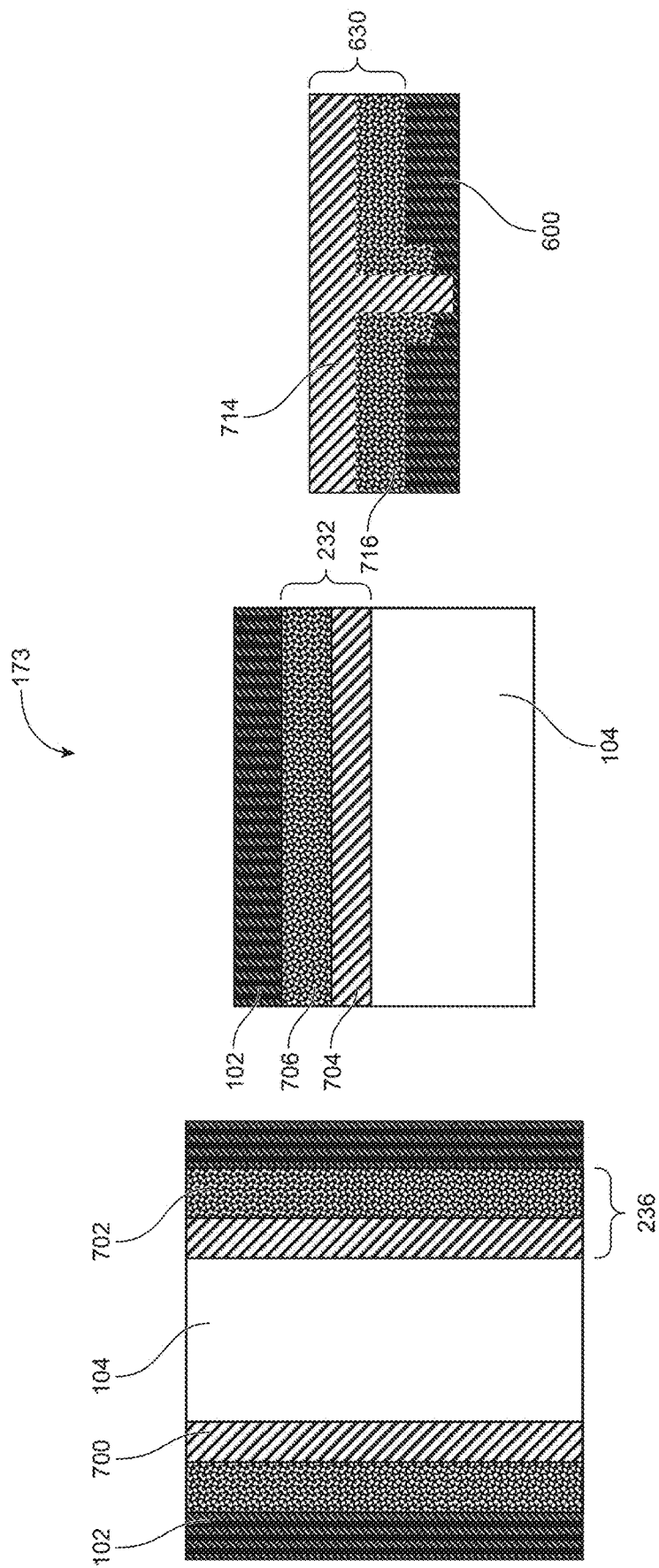

INTERNAL COMBUSTION ENGINE

INCORPORATION BY REFERENCE TO ANY PRIORITY APPLICATIONS

This application is a divisional of U.S. application Ser. No. 18/440,717, filed Feb. 13, 2024, entitled "INTERNAL COMBUSTION ENGINE," which claims priority benefit to U.S. Provisional Application No. 63/597,654, filed Nov. 9, 2023, entitled "INTERNAL COMBUSTION ENGINE." All of the abovementioned applications are hereby incorporated by reference herein in their entireties. Any and all applications for which a foreign or domestic priority claim is identified in the Application Data Sheet as filed with the present application are hereby incorporated by reference under 37 CFR 1.57 and made a part of this specification.

BACKGROUND

Field

The present disclosure generally relates to internal combustion engines. More particularly, the present disclosure relates to layouts, components, construction techniques, and materials for internal combustion engines.

Description of the Related Art

In reciprocating internal combustion engines, a cylinder block is a main structural component. The cylinder block contains one or more cylinder bores. A cylinder head typically connects to the upper end of the cylinder block. Together, the cylinder block and the cylinder head house the cylinder bores, the pistons, and combustion chambers. Each piston moves up and down inside a respective cylinder bore. Connecting rods connect the pistons to a crankshaft. The crankshaft can be positioned within a crankcase that is attached to the bottom end of the cylinder block or can be positioned within the cylinder block itself. The connecting rods convert the translational movement of the pistons to rotational movement of the crankshaft.

SUMMARY

There remains a need for improved engine designs and configurations. For example, there are needs that include improving efficiency, increasing access to new cleaner fuels, reducing engine size and weight for increased applications, and reducing emissions, including carbon dioxide, carbon monoxide, nitrogen oxides, and soot production.

The major components of a conventional internal combustion engine can include a cylinder head, a cylinder block, and a crankcase. In some cases, it can be beneficial to combine one or more of these major components into a single component. By combining one or more of these major components, the engine can operate with higher compression ratios with less risk of failure. For example, combining two or more major components can improve mechanical rigidity, reduce risk of failure due to unplanned separations or gasket/seal failures, and/or reduce or eliminate potential leaks of gases and/or fluids. While combining components can offer these advantages, combining components can have drawbacks, such as difficulty in accessing internal areas of an engine. Accordingly, even when combining components, the layout of the engine must be carefully considered.

Certain features, aspects, and advantages of configurations of the present disclosure relate to improvements to internal combustion engines. Certain features, aspects, and advantages of configurations of the present disclosure apply to two-stroke and/or four stroke heat engine cycles and to engines using different ignition types, including compression ignition, spark ignition, and/or stratified charge and/or homogeneous charge compression ignition engines.

Some configurations relate to engine parts, layouts, or both, that can afford many different advantages. In some configurations, these parts, layouts, or both can reduce part counts and/or simplify manufacturing. According to some configurations, various engine parts and the materials used for various parts can be selected to improve one or more of efficiency, lubrication, cooling, production costs, durability, scalability for engine power ratings, frequency of maintenance, ease of maintenance, fuel flexibility, emissions, engine balance (which in turn reduces noise and wear), and engine size and/or weight for given maximum power outputs.

Certain features, aspects, and advantages of certain configurations can provide engine designs that are scalable from small single-cylinder engines, for example as may be used with garden tools, to large multiple cylinder engines, which can be used in turboprop aircraft, ships, large land vehicles, or stationary power plants, for example. Some configurations can be designed to produce as low as about 1 horsepower. Some configurations can be designed to produce as much as 100,000 horsepower. According to some configurations, the maximum horsepower is not necessarily limited. For example, features of the engines (e.g., an array of uniblocks) may be combined for use in applications with greater horsepower, such as power plants or large ships. Certain features, aspects, and advantages of certain configurations use inventive combinations of materials to decrease the cost of materials, decrease the size and weight associated with the engines, provide improved thermal characteristics, and/or the like. Certain features, aspects, and advantages of certain configurations can achieve high efficiency power output. In some configurations according to the present disclosure, the engines can outperform current automotive engines with respect to various metrics, such as power to weight ratio, for example.

In some configurations, certain features, aspects, and advantages of certain configurations can facilitate simplified production using less material and/or less rare-earth material than existing engine designs. For example, in some configurations, the proportions and total amounts of gray cast iron versus aluminum versus other materials can be different from existing engine designs. In some configurations, the engines can have fewer parts than existing engines, which can improve manufacturability and reliability. As described herein, in some configurations, such engines can have higher thermodynamic efficiency, higher brake efficiency, or both compared to existing engines.

The systems, methods and devices described herein have innovative aspects, no single one of which is indispensable or solely responsible for their desirable attributes. Without limiting the scope of the claims, some of the advantageous features will now be summarized.

In some aspects, an internal combustion engine includes a cylinder block. The cylinder block defines a cylinder bore. A piston is capable of reciprocating within the cylinder bore between top dead center and bottom dead center. A cylinder sleeve surrounds the piston in all positions between top dead center and bottom dead center. The cylinder sleeve includes a first cylinder sleeve layer having a first thermal conductivity and a second cylinder sleeve layer having a second thermal conductivity. A cylinder top plate is positioned between a top of the cylinder bore and a top end of the cylinder sleeve. The cylinder top plate includes at least one intake opening. The at least one intake opening receives a valve seat. The valve seat cooperates with an intake valve to open and close an intake air passage.

In some aspects, the cylinder sleeve includes a third cylinder sleeve layer.

In some aspects, the third cylinder sleeve layer includes a third thermal conductivity.

In some aspects, one or more of the first cylinder sleeve layer, the second cylinder sleeve layer, and the third cylinder sleeve layer is formed of a material selected from the group consisting of invar, Inconel, stainless steel, ductile grey cast iron, and aluminum.

In some aspects, the internal combustion engine further includes a baffle. The baffle extends downwards into the cylinder bore from a top end of the cylinder bore.

In some aspects, the baffle extends downward from the cylinder top plate.

In some aspects, the baffle is integrally formed with the cylinder top plate.

In some aspects, the cylinder top plate includes a lower surface and the baffle extends downward to a height of at least 5 mm below the lower surface of the cylinder top plate.

In some aspects, the baffle covers about 25% of a valve curtain when the intake valve is open.

In some aspects, the internal combustion engine includes two exhaust valves and two intake valves and the baffle is positioned such that the two exhaust valves are on a first lateral side of the baffle and the two intake valves are on a second lateral side of the baffle.

In some aspects, the baffle is formed from a material having a thermal conductivity of less than 15 W/m*K.

In some aspects, the baffle is formed from Inconel.

In some aspects, the piston includes a crown. The crown of the piston is provided with a recess that accommodates the baffle when the piston is at top dead center.

In some aspects, the cylinder top plate and the cylinder sleeve are integrally formed.

In some aspects, the cylinder top plate includes a multi-layer construction.

In some aspects, the multi-layer construction includes a first cylinder top plate layer and a second cylinder top plate layer.

In some aspects, the multi-layer construction includes a third cylinder top plate layer and each of the first cylinder top plate layer, the second cylinder top plate layer, and the third cylinder top plate layer has a different thermal conductivity.

In some aspects, at least one of the first cylinder top plate layer, the second cylinder top plate layer, and the third cylinder top plate layer includes a material configured to cushion vibration or shock.

In some aspects, the cylinder top plate includes a central opening that accommodates an injector.

In some aspects, the cylinder top plate is secured in position within the cylinder bore by a nut that is secured to the injector.

In some aspects, the cylinder top plate has an outer perimeter and the outer perimeter defines a round shape.

In some aspects, the cylinder top plate includes a lower surface and the lower surface of the cylinder top plate includes a recessed dish shape in a central portion.

In some aspects, the piston includes a first portion and a second portion with the first portion and the second portion being formed of different materials and being secured together.

In some aspects, the piston further includes a third portion and an uppermost portion defines a crown formed of a material having a thermal conductivity of less than 15 W/m*K.

In some aspects, the piston includes a central aperture that defines a piston oil passage to feed an oil labyrinth formed within the piston to provide oil to one or more piston rings.

In some aspects, an internal combustion engine comprises a cylinder block. The cylinder block defines a cylinder bore. The cylinder bore includes an upper end that terminates within the cylinder block such that a cylinder bore top wall is defined. A piston is capable of reciprocating within the cylinder bore between top dead center and bottom dead center. The piston is capable of being inserted into the cylinder bore from a bottom end of the cylinder bore. A first vertical plane extends along a first lateral side of the cylinder bore. A second vertical plane extends along a second lateral side of the cylinder bore. The first vertical plane and the second vertical plane are parallel to each other. A cylinder zone is defined between the first vertical plane and the second vertical plane. A crosshead is coupled to the piston. The crosshead extends laterally outward from the piston and crosses the first vertical plane and the second vertical plane. A first crankshaft has a first crankshaft axis. The first crankshaft axis extends parallel to the first vertical plane and is positioned outside of the cylinder zone. A second crankshaft has a second crankshaft axis. The second crankshaft axis extends parallel to the second vertical plane and is positioned outside of the cylinder zone. The first crankshaft is coupled to the crosshead with a first connecting rod. The second crankshaft is coupled to the crosshead with a second connecting rod.

In some aspects, the piston and the crosshead are connected at a crosshead connection point and the first crankshaft axis and the second crankshaft axis are vertically higher than the crosshead connection point at all times during movement of the piston.

In some aspects, an included angle of at least 45 degrees is defined between the first crankshaft axis and a horizontal plane that extends through the crosshead connection point.

In some aspects, the crosshead includes one or more articulating components.

In some aspects, the cylinder block includes a trapezoidal cross section when viewed normal to the first vertical plane and the second vertical plane.

In some aspects, the internal combustion engine is configured to withstand compression ratios in excess of 50:1.

In some aspects, the internal combustion engine is configured to withstand compression ratios in excess of 100:1.

In some aspects, the first crankshaft is dropped into a first upwardly opened crankcase and the second crankshaft is dropped into a second upwardly opened crankcase.

In some aspects, a first crankcase cover and a second crankcase cover are positioned on opposing sides of the cylinder bore.

In some aspects, the first crankcase cover includes at least one journal placing and the second crankcase cover includes at least one journal placing.

In some aspects, the first crankcase cover is mounted to a first crankcase face of the cylinder block, the second crankcase cover is mounted to a second crankcase face of the cylinder block, and the first crankcase face is angled downward and outward from vertical at a first crankcase face angle of between 15 degrees and 30 degrees and the second crankcase face is angled downward and outward from vertical at a second crankcase face angle of between 15 degrees and 30 degrees.

In some aspects, the first crankcase face angle is about 20 degrees or about 25 degrees and the second crankcase face angle is about 20 degrees or about 25 degrees.

In some aspects, a first cooling structure is positioned to a first side of the cylinder bore, above a portion of the cylinder bore, and above a portion of the first crankshaft and a second cooling structure is positioned to a second side of the cylinder bore, above a portion of the cylinder bore, and above a portion of the second crankshaft.

In some aspects, the first cooling structure includes a plurality of cooling fins and the second cooling structure includes a plurality of cooling fins.

In some aspects, the plurality of cooling fins of the first cooling structure are formed of copper and the plurality of cooling fins of the second cooling structure are formed of copper.

In some aspects, a first cover encloses the first cooling structure to define a first water passage and a second cover encloses the second cooling structure to define a second water passage.

In some aspects, a portion of the first cooling structure is positioned between an exhaust port and the first crankshaft.

In some aspects, a portion of the second cooling structure is positioned between an intake port and the second crankshaft.

In some aspects, a second cylinder bore is positioned next to the cylinder bore with a spacing between the cylinder bore and the second cylinder bore being about 10% to 20% of a diameter of the cylinder bore.

In some aspects, the first crankshaft includes a crank throw and a distance from a center of the throw and the first crankshaft axis is between 25% and 40% of a stroke length of the piston.

In some aspects, at least a portion of each of the first connecting rod and the second connecting rod is formed of a carbon fiber composite material.

In some aspects, a joint between the first connecting rod and the crosshead traces a skinny figure eight during a full stroke of the piston.

In some aspects, the skinny figure eight includes a height that is defined by a stroke length of the piston and a width that is about 1/10 of the stroke length of the piston.

In some aspects, the internal combustion engine is configured as one of an inline engine, an opposed-balanced engine, and a captured free-piston engine.

In some aspects, the first crank and the second crank are configured to have synchronized and counter-rotating movement relative to each other.

Although several configurations, examples, and illustrations are disclosed below, the disclosure extends beyond the specifically disclosed configurations, examples, and illustrations and includes other uses of the disclosure. The terminology used in the description presented herein is not intended to be interpreted in any limited or restrictive manner simply because it is being used in conjunction with a detailed description of some specific configurations of the disclosure.

BRIEF DESCRIPTION OF THE DRAWINGS

Throughout the drawings, reference numbers may be reused to indicate general correspondence between referenced elements. The drawings are provided to illustrate example configurations described herein and are not intended to limit the scope of the disclosure.

FIGS. 9 and 10 illustrate two examples of crankshafts that can be used with the internal combustion engines employing a uniblock.

FIGS. 11 and 12 illustrate two examples of crankshafts having balance weights that can be used with the internal combustion engines employing a uniblock.

FIGS. 24-27 illustrate side views of connecting rods that have differing shapes and profiles and that can be used with the internal combustion engines employing a uniblock.

FIG. 50 is a side view of another link that is used in the crosshead of FIGS. 46 and 47.

FIG. 51 is a top view of the link of FIG. 50.

FIG. 77 illustrates a schematic of a layered cylinder liner.

FIG. 78 illustrates a schematic of a layered cylinder top plate.

FIG. 79 illustrates a schematic of a layered piston top plate.

DETAILED DESCRIPTION

Figure 1:
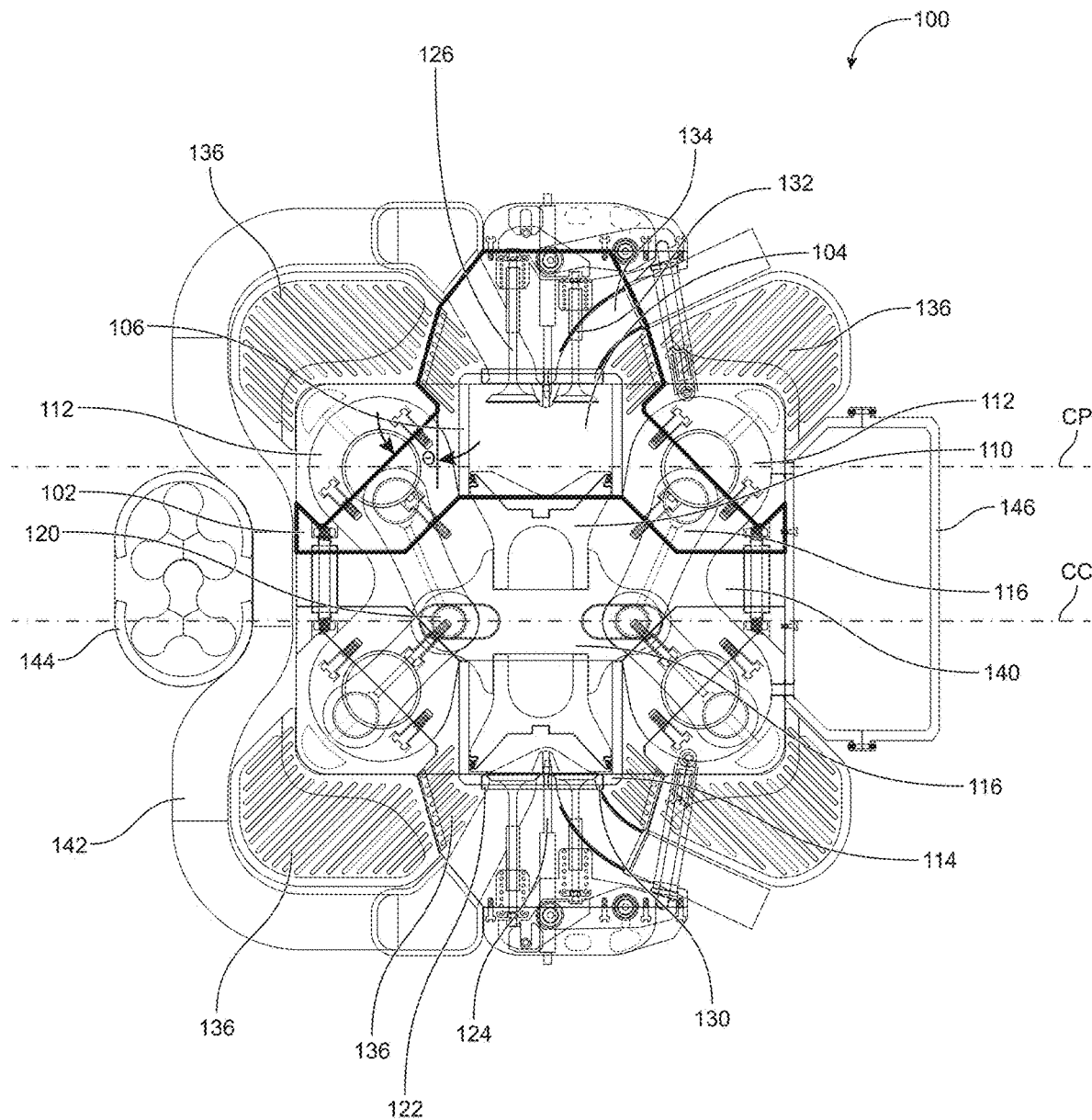
FIG. 1 illustrates a schematic view of a portion of an internal combustion engine employing at least two uniblocks.

With reference initially to FIG. 1, a portion of an internal combustion engine 100 is schematically illustrated. The internal combustion engine 100 is a type of heat engine that uses combustion (e.g., combustion of a fuel and air mixture) to produce mechanical energy. While engines designed according to the present disclosure can use two-stroke or four-stroke cycles, certain advantages may be more fully realized in two-stroke engines.

Example of Internal Combustion Engine with Uniblock

The internal combustion engine 100 that is illustrated in FIG. 1 comprises a uniblock 102. More particularly, the internal combustion engine 100 that is illustrated in FIG. 1 comprises at least two uniblocks. In some configurations, however, internal combustion engines can be formed using a single uniblock 102

The construction of the uniblock 102 is distinct from separable cylinder block and cylinder head assemblies commonly employed in conventional reciprocating internal combustion engines. In those conventional reciprocating internal combustion engines, the cylinder head assemblies are bolted to the cylinder block with a gasket positioned between the two. Together, the cylinder head assembly and the cylinder block define the combustion chambers while the cylinder block defines the cylinder bores.

In the illustrated construction, however, what would be considered the cylinder head and the cylinder block in conventional reciprocating internal combustion engines are integrated into a single component to define at least a portion of the uniblock 102. The uniblock 102 illustrated in FIG. 1 can be formed as a single component that defines a combustion chamber 104 and a cylinder bore 106. In some configurations, the uniblock 102 can be a monolithic component that defines the combustion chamber 104 and the cylinder bore 106. In some configurations, the uniblock 102 can define more than one combustion chamber and/or more than one cylinder bore.

The uniblock 102 that is illustrated encloses, envelopes, and/or surrounds both of the combustion chamber 104 and at least a portion of the cylinder bore 106 that is associated with the combustion chamber 104. In some configurations, the uniblock 102 encloses, envelopes, and/or surrounds the combustion chamber 104 and at least a majority of the cylinder bore 106. In some configurations, the uniblock 102 encloses, envelopes, and/or surrounds the combustion chamber 104 and all of the cylinder bore 106. In other words, the combustion chamber 104 and the cylinder bore 106 can be defined within the uniblock 102.

A piston 110 is positioned within the cylinder bore 106. The piston 110 is configured to reciprocate within the cylinder bore 106. In some configurations, the piston 110 is inserted into the uniblock 102 from the bottom of the uniblock 102. In other words, because the combustion chamber 104 and the cylinder bore 106 are formed inwardly from the bottom of the uniblock 102 (i.e., similar to a blind hole), the piston 110 is inserted into the cylinder bore 106 from the bottom of the uniblock 102. Several constructions for the piston 110 will be discussed below.

The piston 110 is connected to two crankshafts 112. The two crankshafts 112 in the internal combustion engine 100 are on opposing sides of the cylinder bore 106. In at least some configurations, a plane CP is defined through the two center axes of the two crankshafts 112 and the plane CP is positioned above an upper surface of the piston 110 when the piston 110 is disposed within the cylinder bore 106 at a location that is furthest from the combustion chamber 104 (i.e. at bottom dead center).

Depending upon the configuration of the internal combustion engine 100 using the uniblock 102, the number of crankshafts 112 and/or their rotation relative to one another can vary. In some configurations, each uniblock 102 carries two or more counter-rotating crankshafts 112. In some configurations, there can be an even number of crankshafts 112. The two crankshafts 112 can be disposed on either side of the or piston 110 (i.e., the piston is positioned between the two crankshafts 112. The center axes (i.e., the axes of rotation) of the crankshafts 112 can be disposed below the top of the cylinder bore 106 and/or the piston 110 when the piston is in top dead center but above the lower end of the cylinder bore and/or the piston 110 when the piston is in bottom dead center. In some configurations, the center axes of the crankshafts 112 can be above a connection point between a crosshead 114 and any connecting rods 116 that connect to the crosshead 114.

In the illustrated configuration, the two crankshafts 112 are at least partially housed within the uniblock 102. In the illustrated configuration, the two crankshafts 112 are accessible to an outside of the uniblock 102. More particularly, in the illustrated configuration, the two crankshafts 112 can be inserted from a top side (i.e., a side generally opposing the side with the opening in the uniblock 102 defined by the cylinder bore 106) or a lateral side of the uniblock 102. The two crankshafts 112 are accessible to the outside of the uniblock 102 through a side that is different from the side of the uniblock 102 through which the piston 110 is accessible.

The two crankshafts 112 are connected to the crosshead 114. The crosshead 114 can be separate of and connected to the piston 110 in the illustrated configuration. As discussed below, in some configurations, the crosshead 114 can be integrally formed as a monolith with at least one piston 110. The crosshead 114 can be triangular or Eiffel Tower shaped. The crosshead 114 can be subject to tensile and compressive forces. Accordingly, in some configurations, the crosshead 114 can be formed of a material with a high degree of mechanical strength, such as iron or steel. Several constructions for the crosshead 114 will be discussed below.

Each of the two crankshafts 112 is connected to the crosshead 114 using one or more connecting rod 116. As will be discussed further below, because of the positioning of, and use of, the two crankshafts 112, the connecting rods 116 operate primarily or almost entirely under tension during movement of the piston 110. Several constructions for the connecting rods 116 will be discussed below.

Crosshead/connecting rod axes are defined at connection locations between the connecting rod 116 and the crosshead 114. In the internal combustion engine 100 that is illustrated, a sliding pin 120 connects the connecting rod 116 to the crosshead 114. In some configurations, the plane CP defined by the center axes of the two crankshafts 112 is between the combustion chamber 104 and a plane CC that is defined by the crosshead/connecting rod axes.

The crosshead 114 in combination with the connecting rods 116 and the pair of crankshafts 112 define an assembly that constrains movement of the piston 110 to be only linear (allowing for slight variation as a result of tolerance deviations). The movement of the piston 110 is along the cylinder axis (e.g., the central axis of the cylinder bore 106). According to some configurations, the piston 110 can move only parallel (e.g., substantially only parallel) to the center line of the cylinder bore 106 with little or no side to side, rocking, or slapping forces. Constraining the motion of the piston 110 reduces side forces and stress loading on the piston 110 and on walls that define the cylinder bore 106. Such a configuration can provide significant advantages, including reduced wear of piston side walls, piston rings, and/or the cylinder/cylinder liner walls. In some cases, the arrangement can provide the advantage of reduced frictional heat and work energy losses Combustion materials (e.g., fuel and air) are delivered to the internal combustion engine 100 for combustion in the combustion chamber 104. The internal combustion engine 100 comprises at least one intake valve opening 122 and/or at least one fuel injector 124. Flow into the combustion chamber 104 through the intake valve opening 122 can be controlled by an intake valve 126.

The internal combustion engine 100 can expel exhaust products through at least one exhaust valve openings 130. Flow out of the combustion chamber 104 through the exhaust valve opening 130 can be controlled by an exhaust valve 132. The exhaust gases that pass through the exhaust valve opening 130 enter into an exhaust passage 134.

The internal combustion engine 100 can include one or more cooling component 136. The internal combustion engine 100 that is illustrated has fins, cooling tubes, and/or cooling plates (e.g., collectively referred to as one or more cooling component 136). The one or more cooling component 136 can be positioned near the combustion chamber 104. The one or more cooling component 136 can be used to prevent or at least reduce the likelihood of excess heat buildup in the combustion chamber 104. The excess heat could otherwise result in damage to engine components or cause premature lubricant degradation. Additionally, regulating the temperature of the combustion chamber 104 can enable the use of lower cost lubricants (e.g., avoid the use of more expensive lubricants suitable for use at temperatures higher than those typically encountered in an internal combustion engine). Several different cooling components 136 will be described below.

Figure 3:
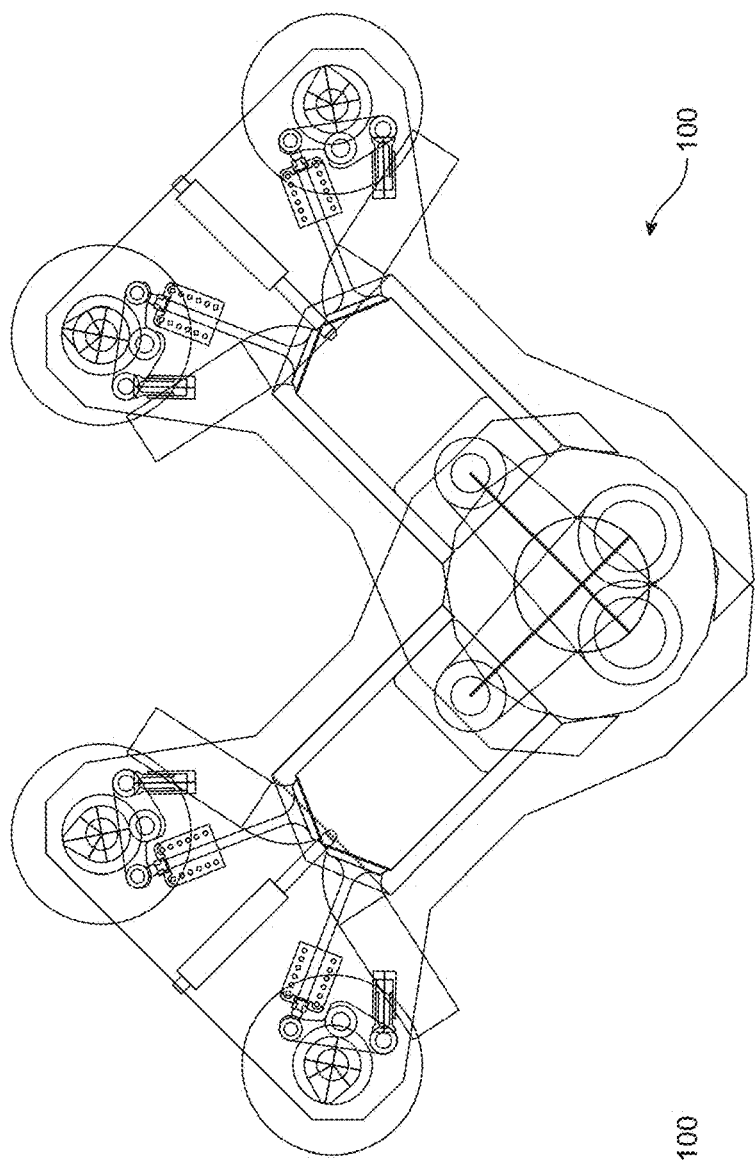
FIG. 3 illustrates a schematic cross-section view of a V engine configuration employing at least two uniblocks.
Figure 2:
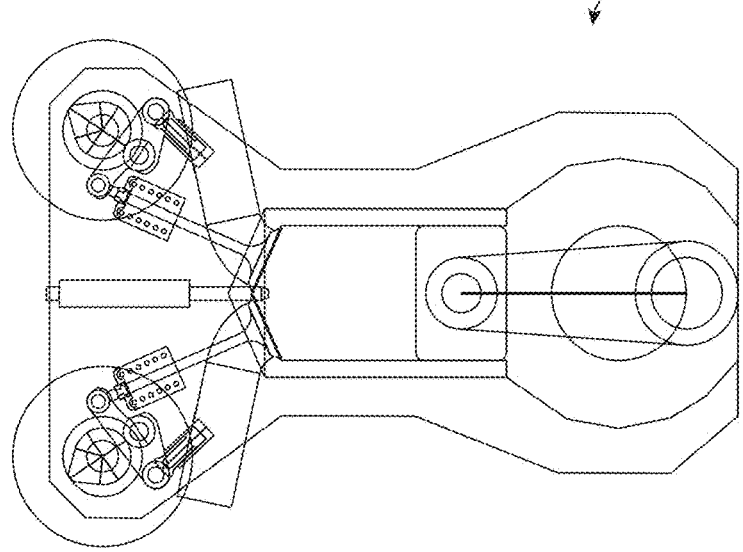
FIG. 2 illustrates a schematic cross-section view of an inline engine configuration employing a uniblock.
Figure 4:
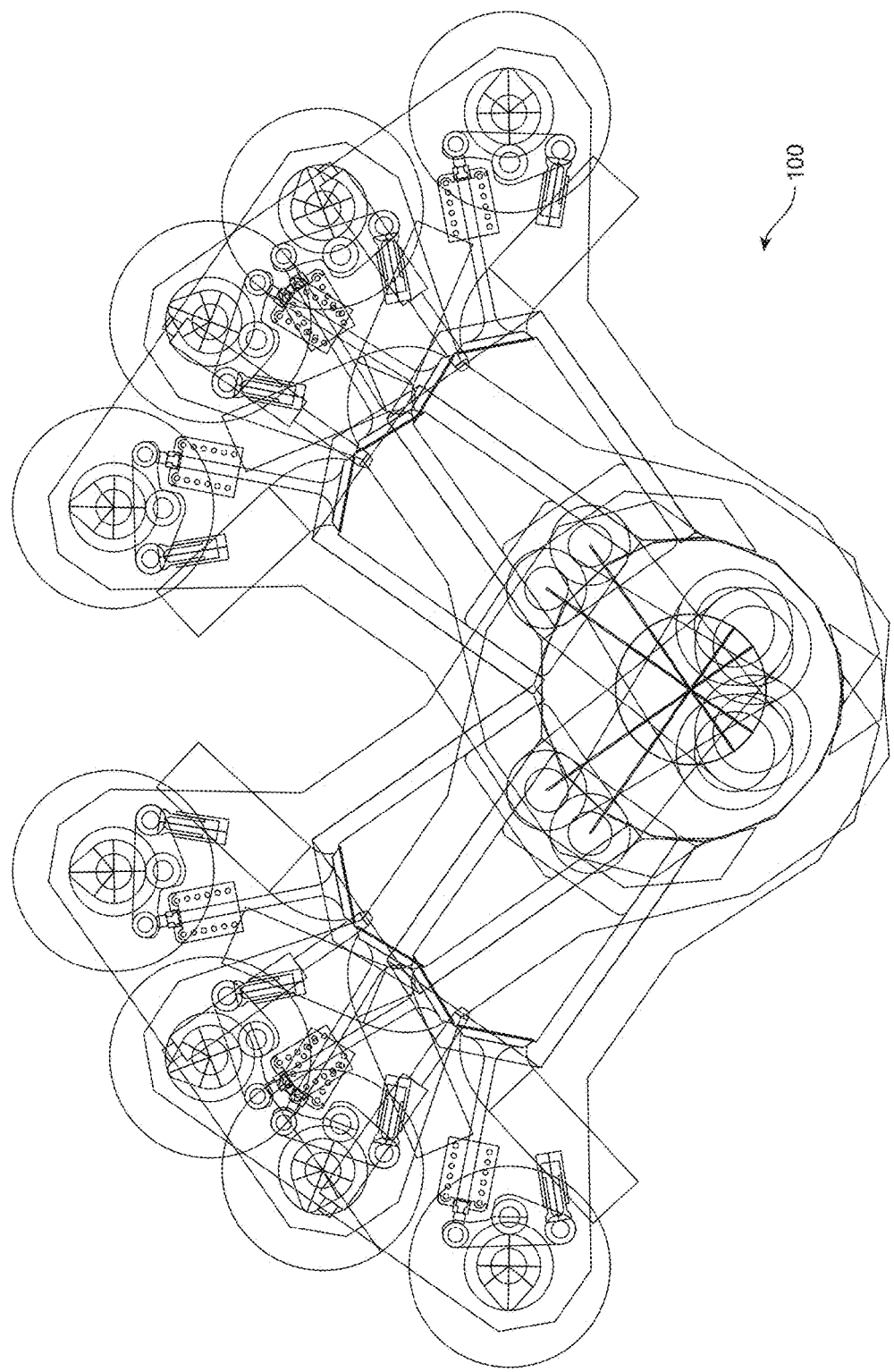
FIG. 4 illustrates a schematic cross-section view of a W engine configuration employing at least eight uniblocks.
Figure 5:
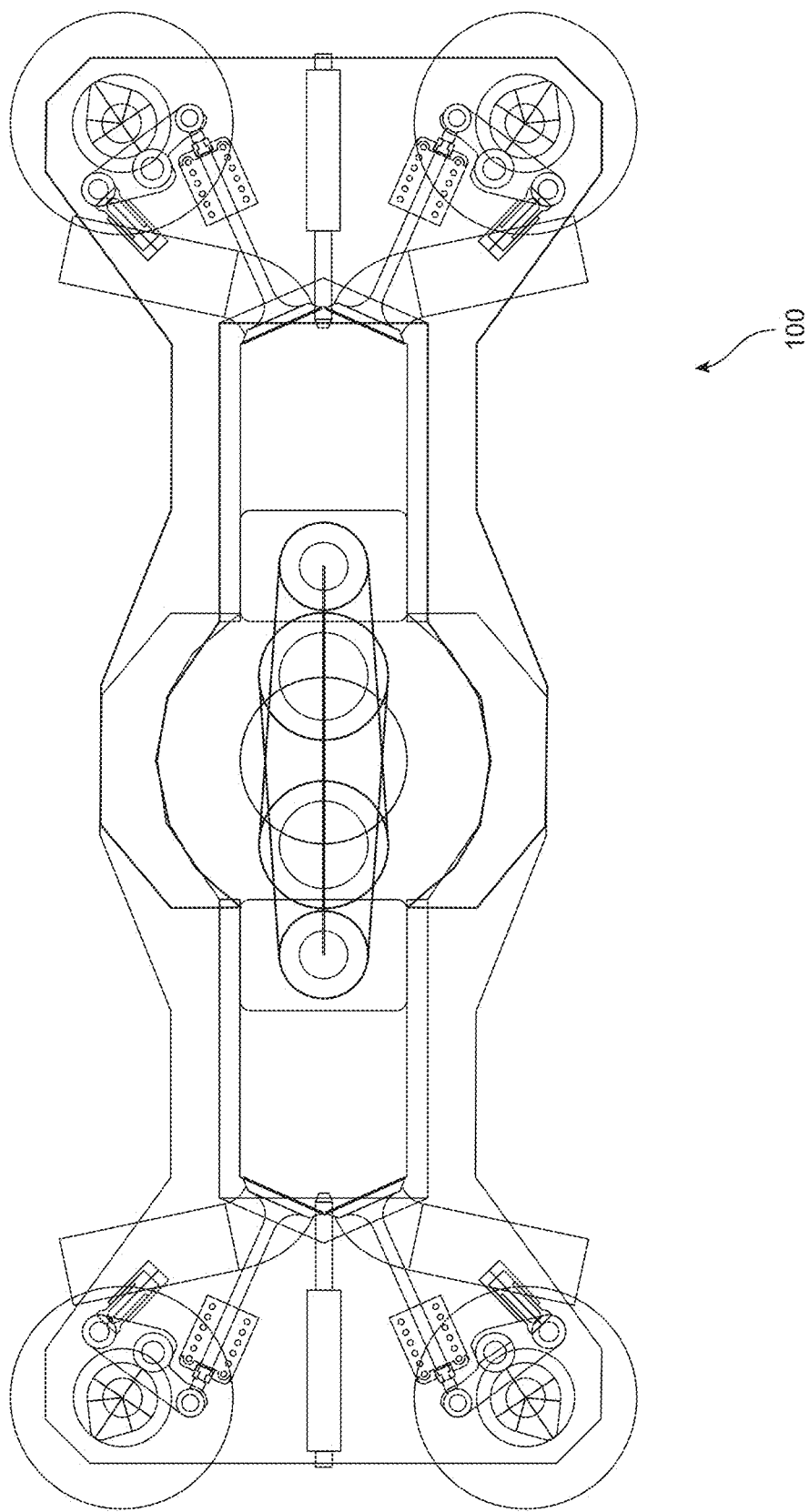
FIG. 5 illustrates a schematic cross-section view of an opposed engine employing at least two uniblocks.

With reference to FIGS. 1-5, two or more uniblocks can be paired in various configurations for the internal combustion engine 100 using the uniblock 102. The multiple uniblocks 102 can be positioned side-by-side and/or end-to-end. FIGS. 2-5 illustrate various non-limiting configurations of internal combustion engines featuring one or more uniblock 102. FIG. 2 illustrates a schematic view of an inline engine configuration. FIG. 3 illustrates a schematic view of a V engine configuration. FIG. 4 illustrates a schematic view of a W engine configuration. FIG. 5 illustrates a schematic view of an opposed engine. As illustrated in FIGS. 1-5, the modular nature afforded by the uniblock 102 facilitates engines of a multitude of constructions.

In configurations similar to those illustrated in FIGS. 1-5, the multiple uniblocks 102 can be joined together by a baseplate 140. The baseplate 140 can be used to mount uniblocks side-by-side and/or end-to-end. For example, multiple uniblocks 102 can be paired in opposed balanced constructions, opposed compact constructions, and/or opposed captive free piston constructions. In some configurations, such as in an inline construction, for example, the uniblock 102 may not be paired with another. The opposed balanced constructions can have the advantage of balancing all piston related forces including primary, secondary, and rocking forces in both two and four-stroke constructions, and can have the advantage or balancing all forces including all piston and valve and valvetrain related forces in two-stroke constructions.

The internal combustion engine 100 also can include any of a number of auxiliary components. For example, the internal combustion engine 100 illustrated in FIG. 1 includes an intake plenum 142, a scavenging blower/supercharger 144, and/or an oil pan 146. Other components also can be used to improve performance of the internal combustion engine 100.

The uniblock 102 provides the internal combustion engine 100 using the uniblock 102 with some distinct advantages over traditional internal combustion engine configurations. For example, defining the combustion chamber 104 within the uniblock 102 enables the internal combustion engine 100 to withstand extremely high compression pressures. This results because there no longer is a gasketed junction between the cylinder head and the cylinder block, which is a location for high compression pressure failures. For example, in the illustrated internal combustion engine 100 that employs the uniblock 102, the compression ratio can be about 10:1, about 20:1, about 30:1, about 40:1, about 50:1, about 75:1, about 100:1, any value between these values, or more or less depending upon the particular engine design. In other words, depending upon the desired compression ratio, the illustrated internal combustion engine 100 can be modified to obtain that desired compression ratio.

By contrast, conventional internal combustion engines have compression ratios between about 6:1 to about 10:1 for engines that burn gasoline and between about 12:1 and 20:1 for engines that burn diesel fuel. Thus, the internal combustion engines 100 using the uniblock 102 can have higher final compression ratios than typically is found in engines for many use cases. In some configurations, the final compression ratio can exceed 50:1. In some configurations, an engine according to the present disclosure can have a final compression ratio of 200:1 or higher. Such high compression ratios can result from the constructions that generally reduce the regions most likely to fail under the high pressures that result from the high compression ratios.

These higher than standard compression ratios can be more simply achieved in the internal combustion engine 100 that uses the uniblock 102. The benefits of the configurations of the internal combustion engine 100 employing the uniblock 102 can be scaled in size. The ability to scale in size results in engines with maximum power outputs from one horsepower to one million horsepower, for example.

The internal combustion engine 100 using the uniblock 102 can be flexible regarding the type of fuel at least in part because of the high compression pressures that can be generated within the combustion chamber 104. For example, certain features, aspects, and advantages of the internal combustion engine 100 with the uniblock 102 can be used with compression ignition fuels, while others can be used with spark ignition fuels, and still others can be used with any fuel, including spark ignition and/or compression ignition fuels.

The uniblock 102 construction also enables the internal combustion engine 100 using the uniblock 102 to be lighter than a conventional reciprocating internal combustion engine of equivalent power. The internal combustion engine 100 using the uniblock 102 also can achieve other advantages. For example, some of the other advantages can include, but are not limited to, reduced fuel energy going to waste heat, increased and more efficient cooling, increased charge air compression, reduced parts counts, reduced production costs, reduced stress risers in high temperature and high pressure areas of the uniblock, improved metal grain structure in high pressure and high temperature uniblock regions, increased engine longevity, increased engine working environments, increased service intervals and/or elimination of engine and engine parts failures due to engine block to engine head failures.

By combining the cylinder head and the cylinder block into a uniblock 102, issues like stress on head gaskets used to seal the connection between the cylinder block and the cylinder head can be avoided. In some configurations, the uniblock 102 facilitates constructions of the internal combustion engine 100 that can have reduced waste heat production, improved heat dissipation, or both. In some configurations, the uniblock 102 facilitates constructions of the internal combustion engine 100 that can make more efficient use of space and volume. For example, according to some configurations, the internal combustion engine 100 using the uniblock 102 can have reduced size for a given horsepower when compared with conventional reciprocating engine designs.

In some configurations, the internal combustion engine 100 using the uniblock 102 can have reduced volume and/or weight per maximum horsepower output when compared to conventional inline, "V", "VR", "W", "X", opposed, boxer, flat, and/or radial piston constructions. The internal combustion engines 100 using the uniblock 102 can have reduced volume and/or weight per maximum horsepower output compared to radial engine constructions, including older engine constructions, such as Wankel engines, and newer engine constructions, including liquid piston and related constructions. The internal combustion engine 100 using the uniblock 102 can have reduced volume and/or weight per maximum horsepower output compared to the majority of gas turbine engines.

This consistently reduced volume and/or weight per maximum horsepower outputs means that some configurations of the internal combustion engine 100 using the uniblock 102 are well suited for applications where small size and/or weight for given power outputs are desirable, such as, in air transportation vehicles. In another example, the internal combustion engine 100 using the uniblock 102 can be paired with an electric motor in a hybrid drive vehicle (e.g., which can include use as a range extender in an electric vehicle), including in air transportation vehicles. In yet another example, the internal combustion engine 100 using the uniblock 102 can provide benefits in engine retrofit applications where reduced size and/or weight provides ease of and flexibility in retrofit applications, such as when owners of existing vehicles desire increased efficiency, reduced emissions, and/or increased power.

In some configurations, the internal combustion engine 100 using the uniblock 102 can have reduced piston speed for a given horsepower as compared with some other reciprocating engines, which can offer several benefits. For example, reduced piston speeds in the internal combustion engine 100 using the uniblock 102 can help reduce engine failures, increase durability, and/or increase maintenance intervals, which may make such engines more suitable for continuous use or for use in aircrafts.

While increased compression ratios can be one advantage of the internal combustion engines 100 using the uniblock 102, there can also be other advantages in addition or alternatively to achieving higher compression ratios. For example, in some configurations, the uniblock 102 provides be more flexibility in the placement of fuel injectors, spark plugs, and the like because there is no seam between a cylinder head and a cylinder block. For example, in an engine design with a separable cylinder head and cylinder block, it can be important to avoid the seam between the cylinder head and the cylinder block because interfering with the seam could compromise sealing, structural integrity, or both. The internal combustion engine 100 that uses the uniblock 102, as compared to conventional engines, allow for many additional advantages, including better lubrication, better balance, better heat management, and smaller and lighter engines for any given power input.

Uniblock

Figure 6:
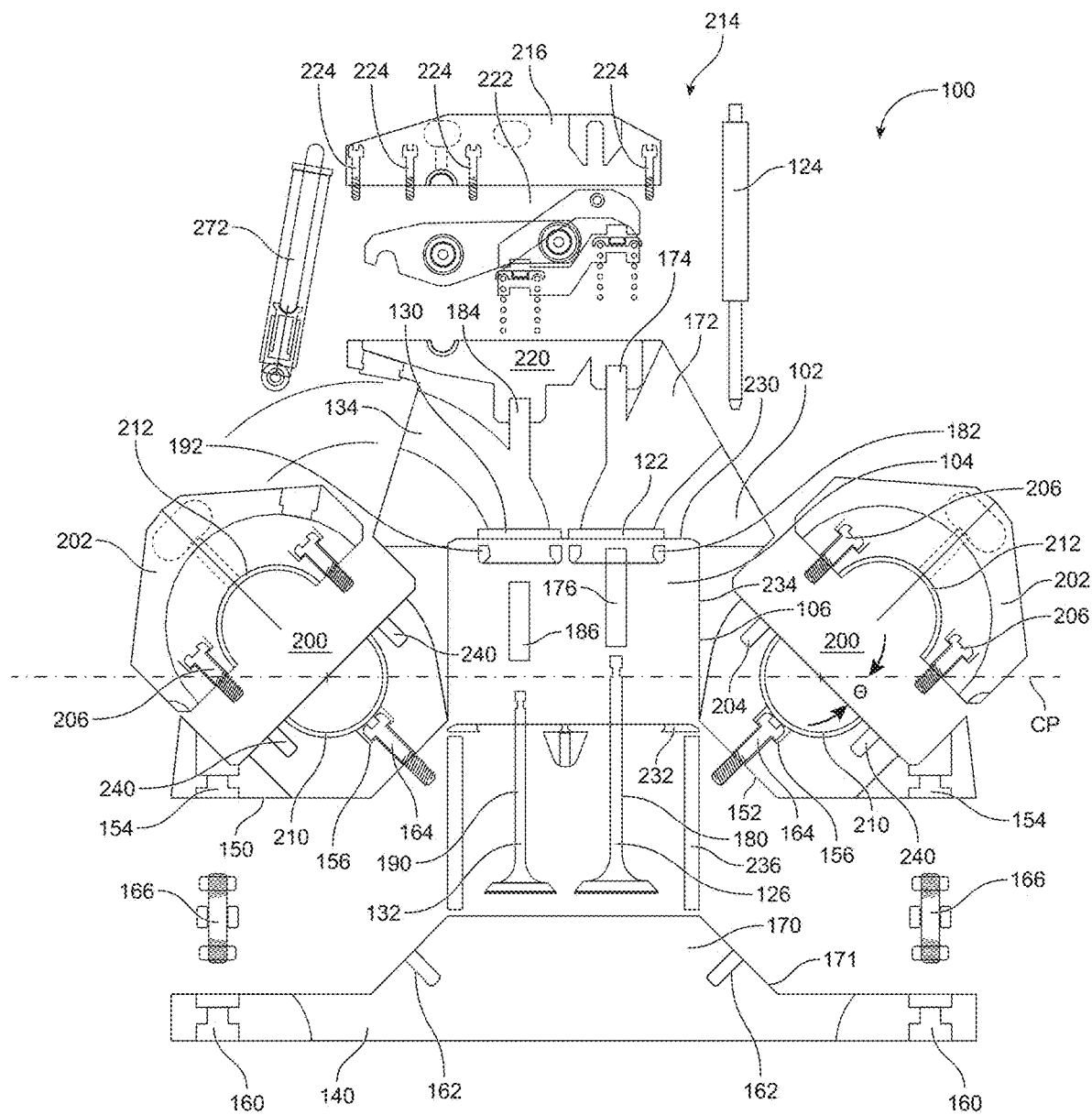
FIG. 6 illustrates an exploded view of at least a portion of an inline configuration of the internal combustion engine employing a uniblock.

With reference now to FIG. 6, the internal combustion engine 100 of FIG. 1 is illustrated in an exploded schematic view. The uniblock 102 can be formed using any suitable technique and using any suitable materials. For example, materials can be chosen for particular use cases. In some configurations, the uniblock 102 can be manufactured from various metals and/or alloys, including but not limited to aluminum or aluminum alloys, which can reduce weight of the internal combustion engine 100 using the uniblock 102 relative to conventional engines having similar horsepower output. As another example, the uniblock 102 can be manufactured from iron, for example but without limitation, which can offer increased strength, reduced cost, or both.

When viewed in a cross-section taken normal to the axis of rotation of the two crankshafts 112, the uniblock 102 can have a generally triangular shape. Such a generally triangular shape is shown, for example, in FIG. 1 and in FIG. 6. An outer face of the uniblock 102 where the crankshafts 112 are positioned can have an angle θ between 0 degrees and 90 degrees relative to the plane CP defined through the central axis of the cylinder bore and parallel to the axes of rotation of the two crankshafts 112. In some configurations, the angle θ is between 20 degrees and 70 degrees. In the illustrated configuration, the angle θ is 45 degrees. As a result of this generally triangular construction, forces can be directed toward the center of the uniblock 102. The generally triangular shape of the illustrated uniblock 102 also provides suitable strength and/or enables ease of production. Advantageously, the generally triangular shape of the uniblock 102 can provide an advantage in the relationship between the stroke volume and the engine volume.

The geometry of the uniblock 102 can enable multiple ways of implementing constructions featuring two pistons 110 that are arranged in opposed relationships. In the illustrated configurations, the axis along which the pistons 110 reciprocate does not intersect with the either of the two crankshafts 112. In an "opposed balanced" construction, both of the two pistons 110 can be at top dead center at the same time. In such a construction, because the pistons 110 move along the same central axis, forces are better balanced. In an "opposed compact" construction, the pistons 110 can offset each other with one piston 110 being at top dead center when the other piston 110 is at bottom dead center. In both cases, and depending on the number of pistons, primary, secondary, and/or rocking forces may be substantially or completely canceled, which can improve the overall balance of the internal combustion engine 100 using the uniblock 102. According to some configurations, in the opposed balanced constructions, the primary, secondary, and/or rocking forces can be canceled with any even number of the pistons 110, including two pistons 110, while the opposed pistons 110 operate in a synchronized manner such that they are at the same point in the cycle at the same time. According to some configurations, an "opposed compact" construction can provide a significant space advantage.

In some configurations, an "opposed compact" construction can utilize captive free pistons, which may offer improved space and/or weight savings as compared to an opposed compact construction that is not using the captive free piston construction for a given engine stroke volume. In some configurations, the captive free piston may provide benefits such as, for example, reducing forces that go into connecting rods and/or crankshafts. For example, during an expansion stage of a cycle of one piston, forces can be transmitted to the opposing piston, which is in a compression stage of a cycle. In some configurations, the captive free piston engine according to some configurations herein can have improved balance as compared to some other engines.

In some configurations (e.g., dual crankshafts or quad crankshafts in the case of a captured free piston design), the internal combustion engines can result in a highly balanced configuration due to, not only the counterrotating nature of the dual crankshafts, but also the balanced motions of pairs of connecting rods.

As introduced above, inline constructions also are contemplated. According to some configurations, an inline construction can have a downward stroke (e.g., from top dead center to bottom dead center) that is a greater percentage of a cycle than an upward stroke (e.g., from bottom dead center to top dead center). Such an approach can result in a power stroke that is more than half of the cycle, which can occur in both two-stroke and four-stroke engine constructions. For example, there can be more degrees of power per cycle. In the two-stroke engine variant, this can enable continuous power and/or substantial power overlap even if only two cylinders are used.

Preferably, if there are multiple cylinder bores 106, which may be positioned side-by-side, then center to center spacing between the cylinder bores 106 can be between about 10% and about 20% (e.g., from 10% to 20%) of the diameter of the cylinder bores 106. In some configurations, the center to center spacing of the cylinder bores 106 can be greater than 20%. In some configurations, the spacing between the cylinder bores 106 can be less than 10%. In some configurations, the spacing can be between about 5% to about 10%. The spacing between the cylinder bores 106 can provide space between cylinder bores 106 for cylinder liners, crank bearings, cam bearings, and so forth. When calculating the percentage of the diameter of the cylinder bore 106, the diameter is calculated as narrowed by any cylinder liner.

Figure 7:
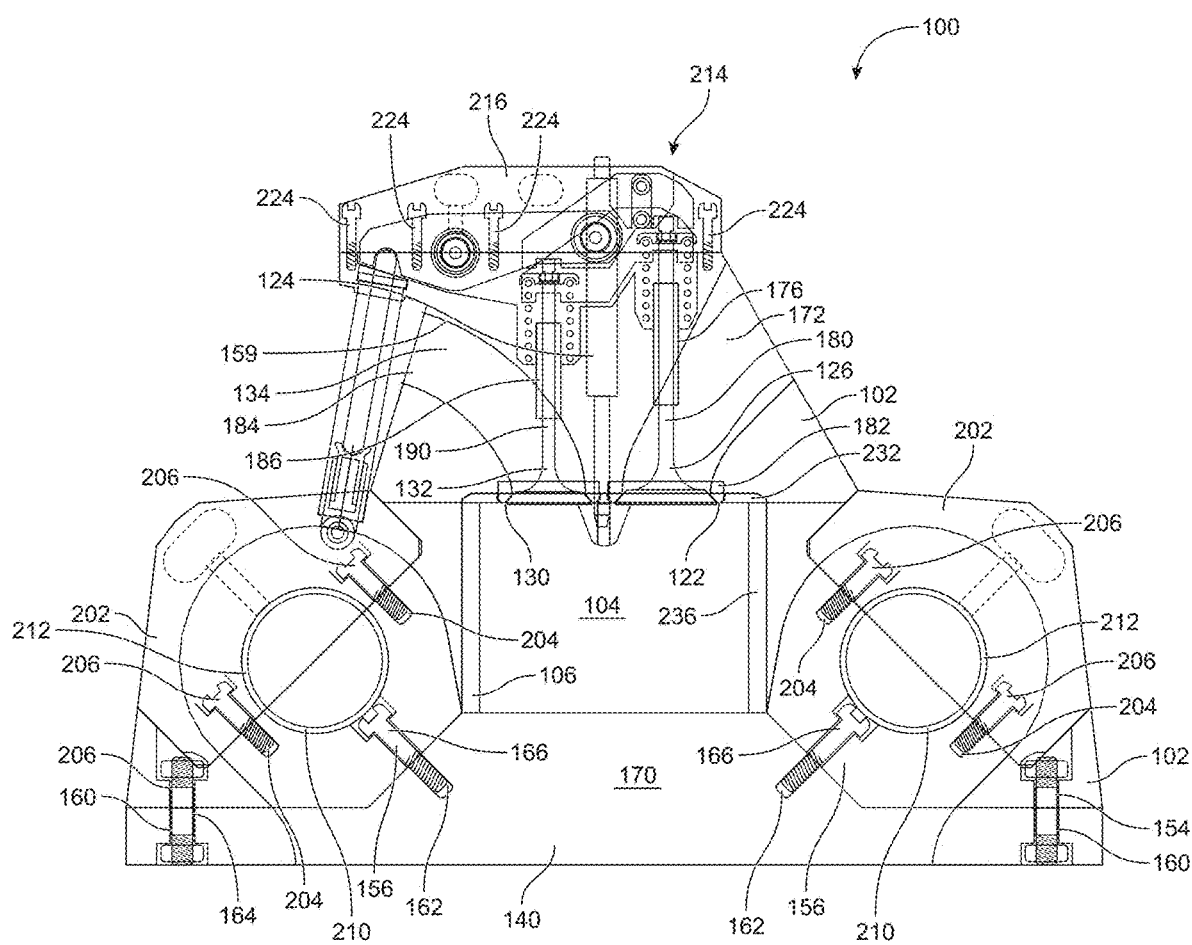
FIG. 7 shows the internal combustion engine of FIG. 6 in an assembled state.

FIG. 6 illustrates an exploded view of an inline configuration of the internal combustion engine 100 using the uniblock 102 and FIG. 7 illustrates the internal combustion engine 100 of FIG. 6 in an assembled state. The internal combustion engine 100 can be a two-stroke engine.

As illustrated, the uniblock 102 can be mounted to a baseplate 140. A mounting region 150 of the uniblock 102 can be positioned on the bottom of the uniblock 102. The mounting region 150 in the illustrated configuration comprises a central recess 152. The central recess 152 is recessed from the bottom of the uniblock 102 towards the combustion chamber 104. In some configurations, the central recess comprises upwardly angled sidewalls that terminate at the edge of the unlined cylinder bore 106. Such a configuration can reduce the overall size of the internal combustion engine 100 while providing adequate strength.

The mounting region 150 can comprise a plurality of outer mounting holes 154 and a plurality of inner mounting holes 156. The baseplate 140 can comprise a plurality of outer mounting holes 160 and a plurality of inner mounting holes 162. The outer mounting holes 154 of the uniblock 102 correspond in location relative to the outer mounting holes 160 of the baseplate 140. The inner mounting holes 156 of the uniblock 102 correspond in location relative to the inner mounting holes 162 of the baseplate 140. The outer mounting holes 154 of the uniblock and the outer mounting holes 160 of the baseplate 140 receive first fasteners 164. The inner mounting holes 156 of the uniblock 102 and the inner mounting holes 162 of the baseplate 140 receive second fasteners 166. The first fasteners 164 and the second fasteners 166 secure the uniblock 102 to the baseplate 140. In some configurations, the first fasteners 164 can comprise dowl studs and nuts. The dowl studs and nuts provide alignment precision and suitable clamping forces. In some configurations the second fasteners 166 can comprise bolts. Other types of fasteners can be used. The baseplate 140 comprises an embossed region 170.

The inner mounting holes 162 of the baseplate 140 are positioned in the embossed region 170. In the illustrated configuration, the embossed region has sloping side walls 171. The inner mounting holes 162 are positioned along the sloping side walls 171. In the illustrated arrangement, the axes of the inner mounting holes 162 are not parallel to the axes of the outer mounting holes. Advantageously, such a configuration improves the structural integrity of the connection between the baseplate 140 and the uniblock 102. For example, while the first fasteners 164 will be loaded primarily with tensile loads, the second fasteners 166 will also have a component of shear loading. This configuration improves the strength of the connection.

With continued reference to FIG. 6, the uniblock 102 comprises an intake passage 172. The intake passage 172 is positioned in an upper portion of the uniblock 102. The intake passage 172 extends downwardly and opens into the combustion chamber 104. In the illustrated configuration, the intake passage 172 has less curvature than the exhaust passage 134. In some configurations, the uppermost portion of the intake passage 172 is positioned on a side surface directly adjacent to the top surface of the uniblock 102. Such a configuration provides as vertical of an entry into the combustion chamber 104 as possible.

The lower end of the intake passage 172 terminates at the intake valve opening 122. One or more than one intake valve openings 122 can be provided. In configurations featuring multiple intake valve openings 122, the intake passage 172 can comprise multiple runners with each runner terminating at the respective intake valve opening 122. Other configurations also are possible.

The intake valve 126 controls flow through the intake valve opening 122. In the illustrated uniblock 102, an intake valve passage 174 extends between an upper region of the uniblock 102 and the intake passage 172. The intake valve passage 174 receives an intake valve guide 176. The intake valve guide 176 can be secured within the intake valve passage 174 in any suitable manner. The intake valve guide 176 is sized and configured to receive an intake valve stem 180 of the intake valve 126. As discussed above, an advantage of the uniblock 102 is that the intake valves 126 can be easily installed from the bottom of the uniblock 102.

The intake valves 126 can seal against intake valve seats 182. Because of the construction and configuration of the uniblock 102, the intake valve seats 182 can be integrally formed or a recess can be formed that receives the intake valve seats 182. The intake valve seats 182 can be secured in position in any suitable manner. In some configurations, the intake valve seats 182 are secured in position using additional components that will be described below.

The uniblock 102 also comprises the exhaust passage 134. The exhaust passage 134 originates at the exhaust valve opening 130 and extends upward and outward in the illustrated configuration. The exhaust passage 134 can be formed within the uniblock 102 in any suitable manner. One or more than one exhaust valve openings 130 can be provided. In configurations featuring multiple exhaust valve openings 130, the exhaust passage 134 can comprise multiple runners with each runner terminating at the respective exhaust valve opening 130. Other configurations also are possible.

The exhaust valve 132 controls flow through the exhaust valve opening 130. In the illustrated uniblock 102, an exhaust valve passage 184 extends between an upper region of the uniblock 102 and the exhaust passage 134. The exhaust valve passage 184 receives an exhaust valve guide 186. The exhaust valve guide 186 can be secured within the exhaust valve passage 184 in any suitable manner. The exhaust valve guide 186 is sized and configured to receive an exhaust valve stem 190 of the exhaust valve 132. As discussed above, an advantage of the uniblock 102 is that the exhaust valves 132 can be easily installed from the bottom of the uniblock 102.

The exhaust valves 132 can seal against exhaust valve seats 192. Because of the construction and configuration of the uniblock 102, the exhaust valve seats 192 can be integrally formed or a recess can be formed that receives the exhaust valve seats 192. The exhaust valve seats 192 can be secured in position in any suitable manner. In some configurations, the exhaust valve seats 192 are secured in position using additional components that will be described below.

The side surfaces of the uniblock 102 support the two crankshafts 112. In the illustrated configuration, at least one pocket 200 is positioned on each side surface of the uniblock 102. While the pockets 200 are used in the illustrated configuration, other arrangements also are possible. Each of the pockets 200 can be enclosed by a corresponding crankshaft cap 202. While the illustrated crankshaft cap 202 is sized and configured such that the crankshaft cap 202 protrudes above the corresponding side surface of the uniblock 102, other configurations are possible. In some configurations, the crankshaft cap 202 and the uniblock 102 are structured such that the uppermost surface of the crankshaft cap 202 is flush with the surrounding surfaces of the uniblock 102. The illustrated crankshaft cap 202 has a five-sided profile. In some configurations, the crankshaft cap 202 can have an arcuate shaped profile or a box shaped profile.

Each of the pockets 200 comprises at least one mounting hole 204. A fastener 206 is received by each of the at least one mounting hole 204. The fastener 206 passes through an opening (not shown) in the corresponding crankshaft cap 202. The fastener 206 secures the crankshaft cap 202 to the uniblock 102. A sealing gasket (not shown) can be positioned between the crankshaft cap and the uniblock 102.

The uniblock 102 defines saddles 210. The saddles 210 receive appropriate bearings to support the two crankshafts 112. In locations that correspond to the saddles 210, the crankshaft caps 202 comprise top caps 212. Together, the saddles 210 and the top caps 212 secure the two crankshafts 112 in position relative to the uniblock 102. In some configurations, the top caps 212 can be formed separately from the crankshaft caps 202 and the crankshaft caps 202 can simply enclose the two crankshafts 112.

In the illustrated construction, a valve train 214 is positioned above the combustion chamber 104. The valve train 214 in the illustrated construction is a mechanical system that controls the opening and closing of the intake valves 126 and the exhaust valves 132. The valve train 214 is mainly positioned within a chamber 220 defined by a valve train cover 216 and a recesses 222 defined within the upper surface of the uniblock 102. Fasteners 224 can be used to secure the valve train cover 216 to the uniblock 102. A sealing gasket (not shown) can be positioned between the valve train cover 216 and the unblock 102.

As will be discussed in greater detail below, the cylinder bore 106 can be lined. In some configurations, a top end 230 of the cylinder bore 106 can be lined with a top plate 232. In some configurations, the side wall 234 of the cylinder bore 106 can be lined with a cylinder liner 236. The cylinder liner 236 and the top plate 232 can be integrated or separately formed. As will be described, the cylinder liner 236 can abut the top plate 232 and hold the top plate 232 adjacent to the top end 230 of the cylinder bore 106.

Figure 8:
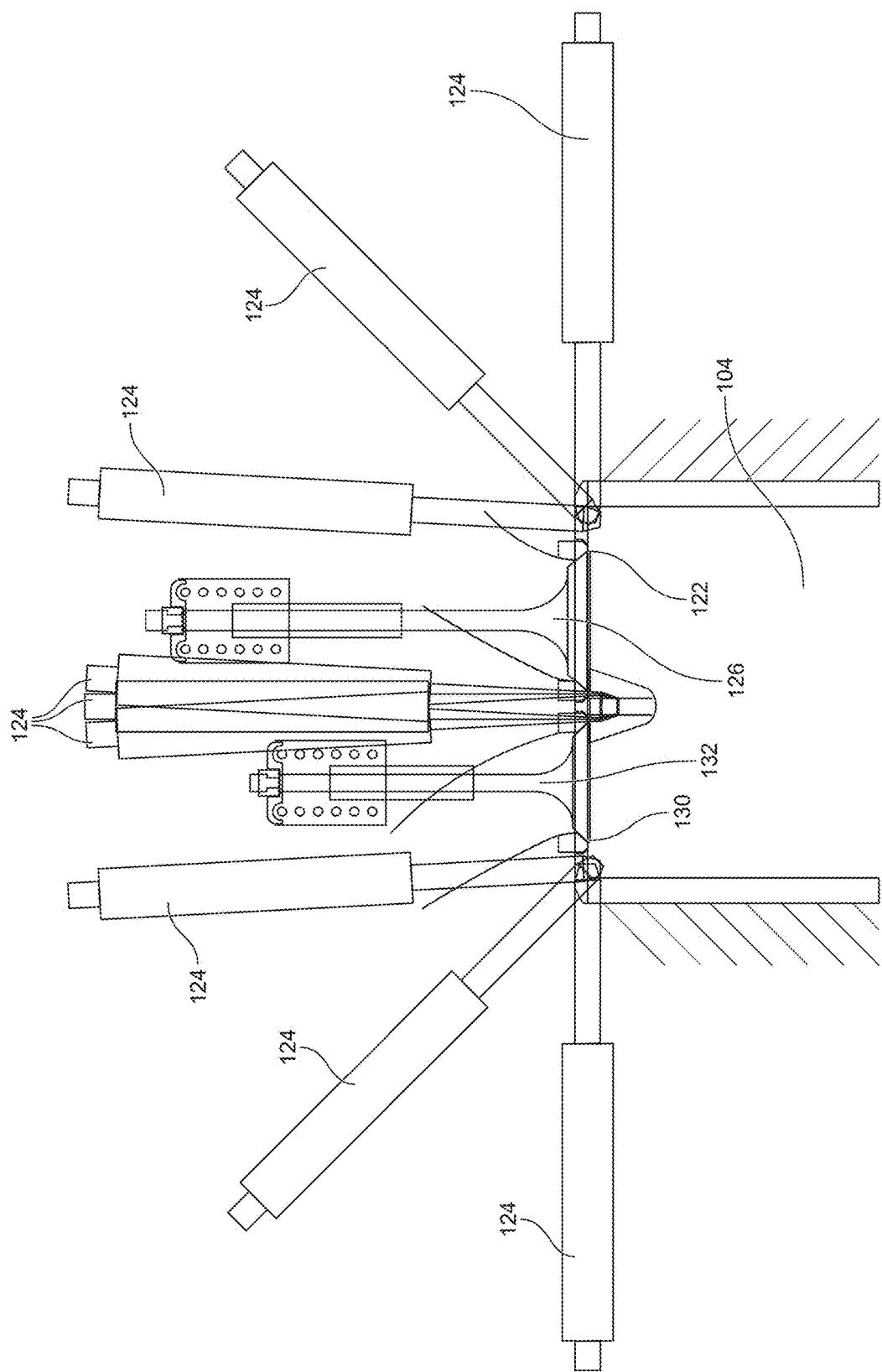
FIG. 8 illustrates a partial schematic view illustrating a variety of injector positioning facilitated by another construction of the internal combustion engine employing a uniblock.

FIG. 8 is a schematic representation of a portion of the uniblock 102 that includes the combustion chamber 104. As discussed directly above, the intake valve opening 122 can be sealed or opened by actuation of the intake valve 126. The exhaust valve opening 130 can be sealed or opened by actuation of the exhaust valve 132. Disposed between the intake valve 126 and the exhaust valve 132 is the injector 124. The uniblock 102 enables greater freedom in the placement of the fuel injectors 124 and the spark plugs, for example, when compared to conventional engines. Because of the geometry of the uniblock 102, one or more of the fuel injectors 124 can be positioned in any desired location around the combustion chamber 104. Various possible positions are illustrated in FIG. 8. It will be appreciated that the placements illustrated in FIG. 8 are examples, and the number and/or placement of the fuel injectors 124, the spark plugs, and so forth can vary.

In some configurations, multiple fuel injectors, multiple spark plugs, or other components can be provided in the internal combustion engine 100 that uses the uniblock 102. For example, in some configurations, the internal combustion engine 100 that uses the uniblock 102 can be designed to operate using a variety of fuels. In some configurations, the internal combustion engine 100 that uses the uniblock 102 can be configured to run on any combination of gasoline, fuel oil, diesel, natural gas, biofuel, ethanol, hydrogen, or other suitable fuel type. In some configurations of the internal combustion engine 100 that uses the uniblock 102, separate fuel injectors can be provided for different fuels. In some configurations of the internal combustion engine 100 that uses the uniblock 102, a first fuel injector can provide a first fuel type (e.g., natural gas) and a second fuel injector can provide a second fuel type (e.g., ethanol).

While the internal combustion engine 100 that uses the uniblock 102 can employ multiple fuel injectors and multiple spark plugs, for example, to improve fuel flexibility, redundancy also can be provided. For example, when operating on gasoline, the internal combustion engine 100 that uses the uniblock 102 can include two or more spark plugs so that, should a spark plug fail, the internal combustion engine 100 that uses the uniblock 102 can continue operating with the non-failed spark plug. Similarly, the internal combustion engine 100 that uses the uniblock 102 can include two or more fuel injectors 124 so that the internal combustion engine 100 that uses the uniblock 102 can keep operating as long as at least of the one fuel injectors 124 is operational. Redundancy can allow for more flexible maintenance scheduling because the internal combustion engine 100 that uses the uniblock 102 can continue to operate even if one or more components fail.

Crankshafts

As discussed above, the illustrated internal combustion engine 100 that uses the uniblock 102 operates with two crankshafts 112. Examples of the two crankshafts 112 are illustrated in FIGS. 9 and 10. The throw T of the crankshaft 112 is defined by the distance between the central axis of a main journal 250 and the central axis of a crank pin 252. The stroke length (i.e., the travel distance of the piston 110) of the internal combustion engine 100 is defined as twice the distance of the throw T.

Crankshafts generally can be subjected to relatively large horizontal and/or torsional forces during operation. The pistons transmit forces to the crank pins through the connecting rods. If the crankshaft has long throws (e.g., in internal combustion engines that have long stroke lengths), the crankshaft can have large webs to help maintain the rigidity of the crankshaft. This can add significant weight to the crankshaft. To maintain balance, in some crankshafts, the webs also can include significant counterweights.

The two crankshafts 112 of the internal combustion engine 100 using the uniblock 102 can have shorter throws than those typically found in conventional engines. For example, a typical conventional crankshaft can have a throw such that the crank pin is fully or nearly fully outside of the radius of the main journal. The use of a shorter throw can reduce or eliminate the need for heavy counterweights and/or can improve rigidity of the crankshaft, which can allow for thinner webs to be used, among other advantages.

FIGS. 9 and 10 illustrate two examples of the crankshaft 112 that is used in conjunction with the uniblock 102. The crankshafts 112 of FIGS. 9 and 10 are arranged and configured in accordance with certain features, aspects, and advantages of the present disclosure.

With reference first to FIG. 9, the crankshaft 112 comprises the main journals 250, a plurality of crank pins 252, a plurality of webs 254, and a tapered end section 256. The crank pins 252 in the illustrated configuration can be significantly wider (e.g., between 1.1 times to 1.5 times wider, or in some examples, more than 1.5 times wider) than conventional crank pins found in typical crankshafts.

The elongated width of the crank pins 252 can offer several advantages. For example, the elongated width of the crank pins 252 can enable the use of connecting rods 116 that are wider than conventional. The elongated width of the crank pins 252 and the resulting increased width of the associated connecting rods 116 distributes the forces between the connecting rods 116 and the crankshaft 112 over a larger surface area, which can reduce wear on the surfaces of the crankshaft 112, the connecting rods 116, or both.

In some configurations, at least one end of the crankshaft 112 can comprise the tapered end section 256. In the illustrated configuration, both ends of the crankshaft comprise the tapered end section 256. The tapered end section 256 can be configured to receive a gear 260. The gear 260 can be secured to the tapered end section 256 with one or more key 262. Other configurations also can be used.

The gear 260 can have a central opening 264, as shown on the right end of the crankshaft 112 illustrated in FIG. 9. In the configuration illustrated in FIG. 9, the central opening 264 of the gear 260 is tapered. The taper of the central opening 264 preferably complements the outer tape of the tapered end section 256 of the crankshaft 112. The gear 260 can be secured to the crankshaft 112 using a nut 266. In some configurations, the nut 266 comprises a compression nut. Other suitable techniques can be used to secure the gear 260 to the crankshaft 112.

In some configurations of the internal combustion engine 100, one or more camshafts can be used to control actuation of one or more of the intake and exhaust valves 126, 132. In some such configurations, the crankshaft 112 can be configured to control the pushrod movement. In FIG. 9, the webs 254 comprise pushrod lobes 270. In some configurations, the pushrod lobes 270 can be integrally formed as a monolith with the webs 254. For example, in some configurations, the pushrod lobes 270 and the webs 254 can be cast or otherwise formed as a single component. In some configurations, the pushrod lobes 270 and the webs 254 can be separate components. For example, in some configurations, the pushrod lobe 270 can be a removable part relative to the web 254. The pushrod lobe 270 can be separated from the web 254. In such configurations, the pushrod lobes 270 can be secured to the webs 254 in any suitable manner. For example, fasteners, such as bolts for example but without limitation, can be used to secure the pushrod lobes 270 to the webs 254. Desirably, the pushrod lobes 270 can push against (e.g., push directly against or push indirectly against) a pushrod 272 (see FIG. 6) to actuate one or more valves 126, 132.

In some configurations, the crankshaft 112 of the internal combustion engine 100 does not include the pushrod lobes 270. In such configurations, the internal combustion engine 100 may use camshafts (not shown) to control the opening and/or closing of one or more of the intake and exhaust valves 126, 132. The crankshaft 112 illustrated in FIG. 10 is similar to the crankshaft 112 of FIG. 9 but the crankshaft 112 illustrated in FIG. 10 lacks the pushrod lobes 270. In such a configuration, the size and shape of the webs 254 more closely approximate the shapes of the crank pins 252.

While the crankshafts 112 depicted in FIGS. 9 and 10 illustrate the webs 254 as narrow relative to the crank pins 252, other configurations are possible. For example, in some configurations, the crank pins 252 can be narrower than illustrated, the web 254 can be wider than illustrated, or both. In some configurations, the internal combustion engine 100 that uses the uniblock 102 comprises connecting rods 116 that are relatively wide and/or that include a forked end, as will be described below. The width of the forked ends of the connecting rod 116 can vary relative to each other. In other words, multiple structures of the connecting rod 116 can be used with one crankshaft 112. Accordingly, the width of the crank pins 252, the width of the webs 254, or the width of both can be varied. In some configurations, the internal combustion engine 100 that uses the uniblock 102 may not use the forked connecting rods 116 and may instead use connecting rods that are configured in a more convention manner. Conventional connecting rods typically are narrower than the connecting rods 116 with the forked ends, which will be described below, although this is not necessarily the case.

In some configurations, the crankshaft 112 can include balance weights 274. The balance weights 274 can be part of the webs 254 or the balance weights 274 can be separate components relative to the webs 254. In some configurations, the balance weights 273 can be integrated into the webs 254 while the pushrod lobes 270 are a separate component relative to the webs 254. Each of FIGS. 11 and 12 illustrate the crankshaft 112 with balance weights 274 integrated into the webs 254. The crankshaft 112 of each of FIGS. 11 and 12 is similar to the crankshaft 112 of each of FIGS. 9 and 10, respectively. In FIG. 11, the crankshaft 112 comprises pushrod lobes 270 and balance weights 274. In FIG. 12, the crankshaft 112 has balance weights 274 but does not include pushrod lobes 270. While a variety of constructions showing integrated and separable webs 254, pushrod lobes 270, and balance weights 274 are presented, it is within the scope of certain features, aspects, and advantages of the present invention to have any combination of those components (e.g., integrated webs, lobes, and weights; integrated webs and lobes with separable weights; integrated webs and weights with separable lobes; integrated lobes and weights with separable webs; and separable webs, lobes, and weights).

In conventional crankshaft designs, a balance weight typically is located opposite a corresponding crank pin (e.g., 180 degrees from a crank pin). According to some configurations described herein, the balance weights 274 can be at an angle of less than 180 degrees from the crank pin 252 corresponding to the balance weight 274. The engine geometry and the relative position of the crankshafts 112 with respect to the crosshead 114, the piston 110, and/or other engine components facilitate this positioning of the balance weights 274.

Figure 13:
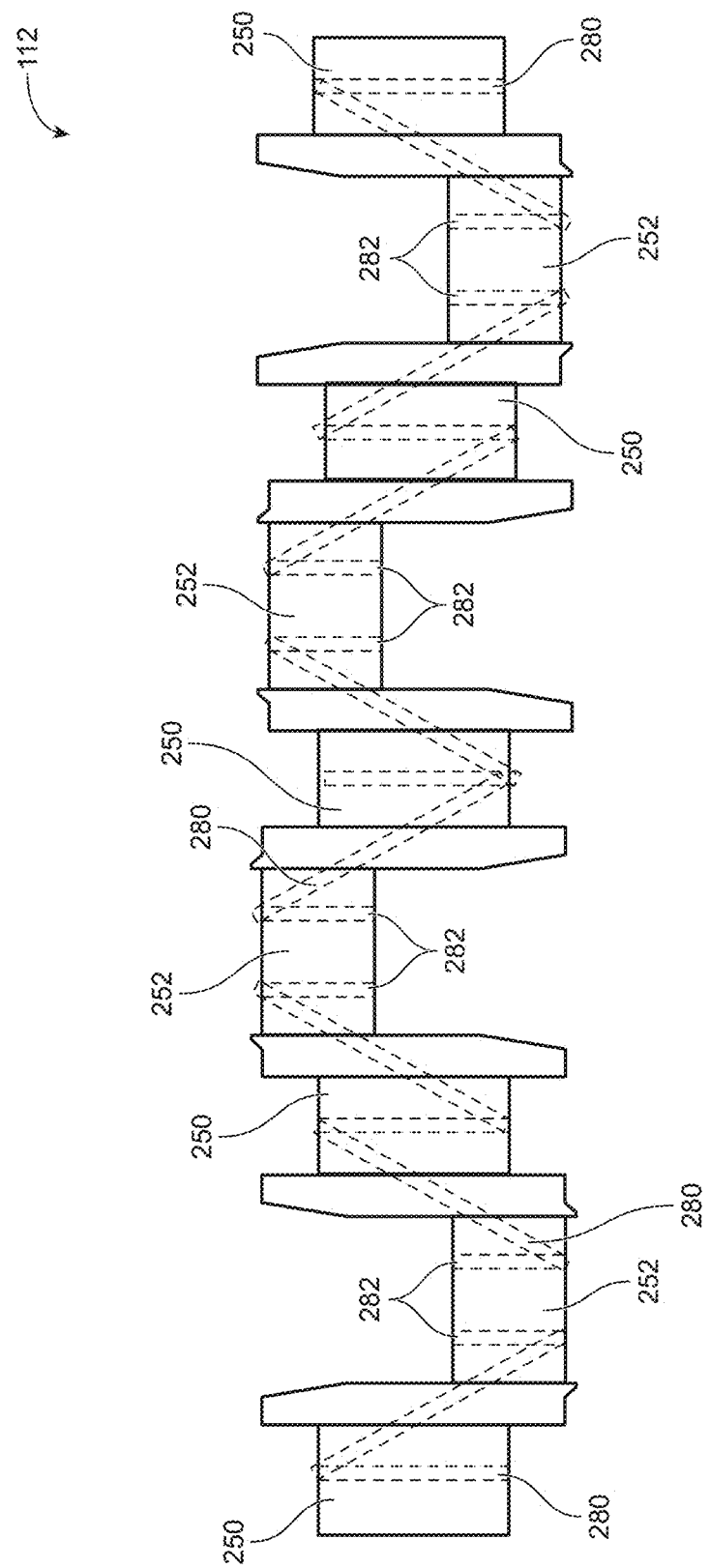
FIG. 13 illustrates examples of oil passages that can be positioned within the crankshafts of FIGS. 9-12.

In some configurations, the crankshaft 112 includes internal oil passages 280 that can be used for lubrication, cooling, or both. FIG. 13 illustrates the oil passages 280 positioned within the crankshaft 112. At the crank pins 252, the oil passages 280 can be open or partially open (i.e., the diameter of the orifice 282 of the opening is smaller than the diameter of the oil passage 280). The connecting rods 116 are connected to the crankshaft 112 at the crank pins 252. Oil can be provided to the connecting rods 116 at the crank pins 252 through the orifices 282.

In some configurations, the internal combustion engine 100 can comprise two crankshafts 112. In some configurations, the internal combustion engine 100 can have four crankshafts 112. In some configurations, each piston 110 of the internal combustion engine 100 can be associated with two crankshafts 112 (e.g., the piston 110 can be coupled to two crankshafts 112). In some configurations, the strokes of each of the pistons 110 can be asymmetric or symmetric. In some configurations, the relationship between the center point of each of the throws T of the crankshaft 112 can be from about 50% to about 90% of the stroke of the piston 110. This relationship is possible because of the location of the crankshafts 112 to either side of the path of the piston 110 during the stroke and because there are two crankshafts 112. In some configurations, the strokes of each of the pistons 110 can be linear. In some configurations, significant offsets can be defined between the cylinder bore 106 and the crankshafts 112. In some configurations (e.g., inline, opposed balanced, and/or opposed compact configurations), power strokes and/or other strokes can be up to about 200 degrees per revolution, which is more degrees of revolution than in most engines. Because the end of the power stroke as defined by power pressures no longer exerting on the pistons 110 due to exhaust, intake or scavenging events becoming significant, and since these exhaust, intake or scavenging events becoming significant can be adjusted in the internal combustion engine 100, some other power strokes can be shorter, for example about 90 degrees. The increased power stroke durations per power event can give added torque, increased rotational smoothness, increased power overlap, increased turbo charging efficiency, and increased overall efficiency. A reduced power stroke duration can be used when higher compression, coming from longer compression duration, and/or longer intake, exhaust or scavenging durations are desired, though efficiency may be reduced.

Connecting Rods

With reference again to FIG. 1, due to the geometry of the internal combustion engine 100 using the uniblock 102, the connecting rods 116 can operate primarily under tension instead of compression. During expansion movement of the pistons 110, the connecting rods 116 will be pulling on the crank pins 252 of the two crankshafts 112. During compression movement of the pistons 110, the connecting rods predominantly will be pulling the pistons 110 toward the combustion chamber 104. At transitions between pulling the crankshafts 112 and pulling the piston 110, there may be some lower levels of compressive loading on the connecting rods 116. In some configurations, most (e.g., about 70% or more or, in some examples, about 99%) of the forces on the connecting rods 116 can be tensile rather than compressive. The connecting rods 116 in the internal combustion engine 100 using the uniblock 102 can operate entirely or substantially entirely under tension in either two-stroke or four-stoke operation. The tensile loading can enable the connecting rods 116 to be made from lighter materials, including but not limited to carbon fiber composites, combinations of metal and carbon fiber windings, and so forth. In some configurations, such constructions (e.g., dual crankshafts 112 or quad crankshafts 112 in the case of a captured free piston design) can result in a highly balanced configuration due to, not only the counterrotating nature of the dual crankshafts 112, but also the balanced motions of pairs of connecting rods 116.

With reference to FIGS. 14-31, several configurations of the connecting rods 116 will be described. In some configurations (e.g., in some captive free piston constructions), the crosshead 114 (or the combination of the crosshead 114 and the piston 110) can connect to the two crankshafts 112 using one or more connecting rods 116. In the illustrated configuration, one connecting rod 116 connects to each of the two crankshafts 112 such that two connecting rods 116 are connected to the crosshead 114 (or the piston 110 and the crosshead 114 combination). The internal combustion engine 100 using the uniblock 102 can use any of the connecting rods 116 described herein.

As will be described, in some configurations, the connecting rods 116 can have a wishbone shape. Other shapes also are possible. The use of the forked or wishbone-shaped connecting rods 116 can have several advantages. For example, each of the connecting rods 116 can connect to the crankshaft 112 in two locations (e.g., at an opening in a first leg 300 and at an opening in a second leg 302) rather than at one location. Conventional connecting rods generally only connect in a single location.

Having two connecting locations can increase the total contact area between the crankshaft 112 and the connecting rod 116. The two connecting locations enable forces to be distributed over a larger area, which can result in reduced wear. In some configurations, the forked connecting rod 116 can provide improved stability because the increased contact surface area between the forked connecting rod 116 and the crankshafts 112 and/or the increased contact surface area between the forked connecting rod 116 and the piston 110 or crosshead 114 can limit undesirable rotations of the connecting rod 116. For example, increased contact area between the forked connecting rod 116 and the crankshaft 112 can limit rotation of the forked connecting rod 116 relative to the axis of the crankshaft 112.

Figure 14:
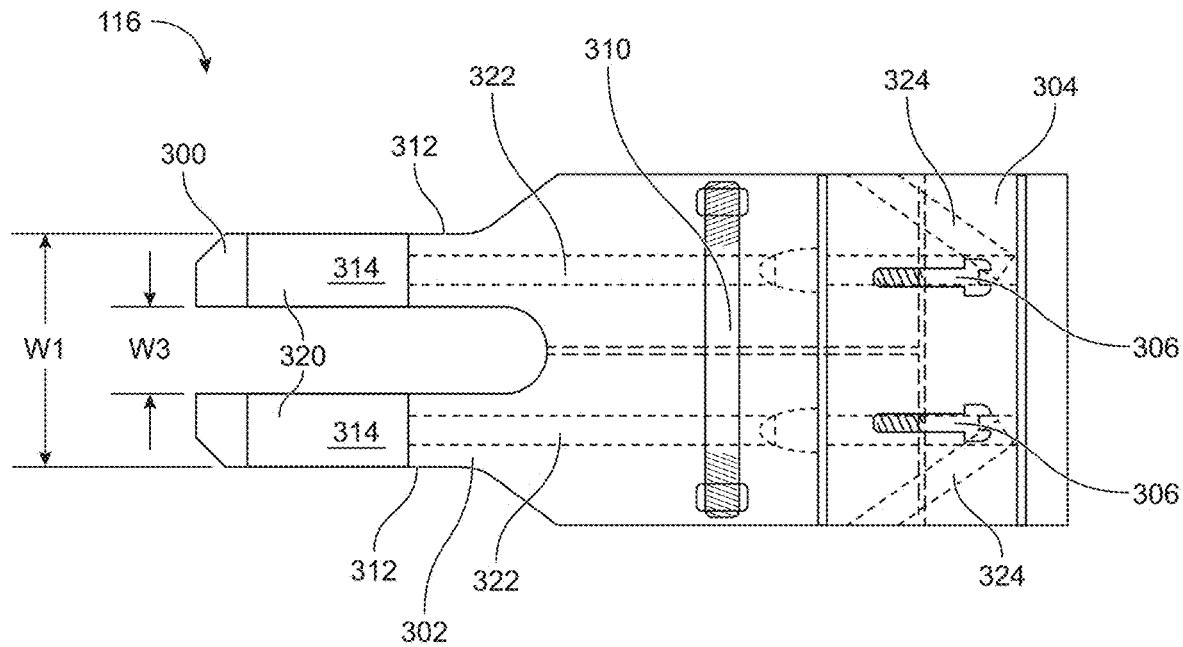
FIGS. 14 and 15 illustrate example connecting rods that can be used with the internal combustion engines employing a uniblock.

FIG. 14 illustrates an example of the connecting rod 116 that is arranged and configured in accordance with certain features, aspects, and advantages of the present disclosure. The illustrated connecting rod 116 can comprise three main portions: the first leg 300, the second leg 302, and a back cap 304. The first leg 300 and the second leg 302 can be connected to the back cap 304 using fasteners 306 (e.g., bolts). In some configurations, the first leg 300 and the second leg 301 can be connected to one another using a double-ended bolt 310. The first leg 300 and the second leg 302 can be secured together in any suitable manner.

The back cap 304 and the first leg 300 and the second leg 302 can be fitted to the crank pin 262 of the crankshaft 112 (see FIG. 22), and the opposite end can be fitted to a sliding pin 120. The sliding pin 120 can be T-shaped. The sliding pin 120 can be mechanically coupled to the crosshead 114 (see FIG. 30, for example).

FIGS. 16-19 illustrate various constructions of the connecting rods 116. As shown in FIGS. 16-19, the width of the connecting rods 116 can be altered depending upon the application. In addition, in some configurations, the actual shape of the connecting rods 116 can be altered depending upon the application. For example, in some configurations, the first leg 300 and the second leg 302 of the connecting rod 116 can be straight or linear (see FIG. 16). In some configurations, the first leg 300 and the second leg 302 of the connecting rod 116 can widen in a laterally outward direction (see FIG. 17). In some configurations, the first leg 300 and the second leg 302 of the connecting rod 116 can be machined as a single monolithic component (see FIG. 19). In other words, the first leg 300 and the second leg 302 of the connecting rod 116 can be manufactured as a single component rather than having each of the first leg 300 and the second leg 302 be a separate component that are later joined together. In some configurations, the first leg 300 and the second leg 302 of the connecting rod 116 can be machined as separate components (e.g., each leg of the connecting rod can be a separate component)—see FIGS. 16-18. In some configurations, the first leg 300 and the second leg 302 of the connecting rod 116 can be in contact with one another when the connecting rod 116 is in an assembled state. In some configurations, the first leg 300 and the second leg 302 of the connecting rod 116 may not be in contact with each other when the connecting rod 116 is in an assembled state (i.e., there may be a gap or an intervening member between the first and second legs 300, 302).

Figure 15:
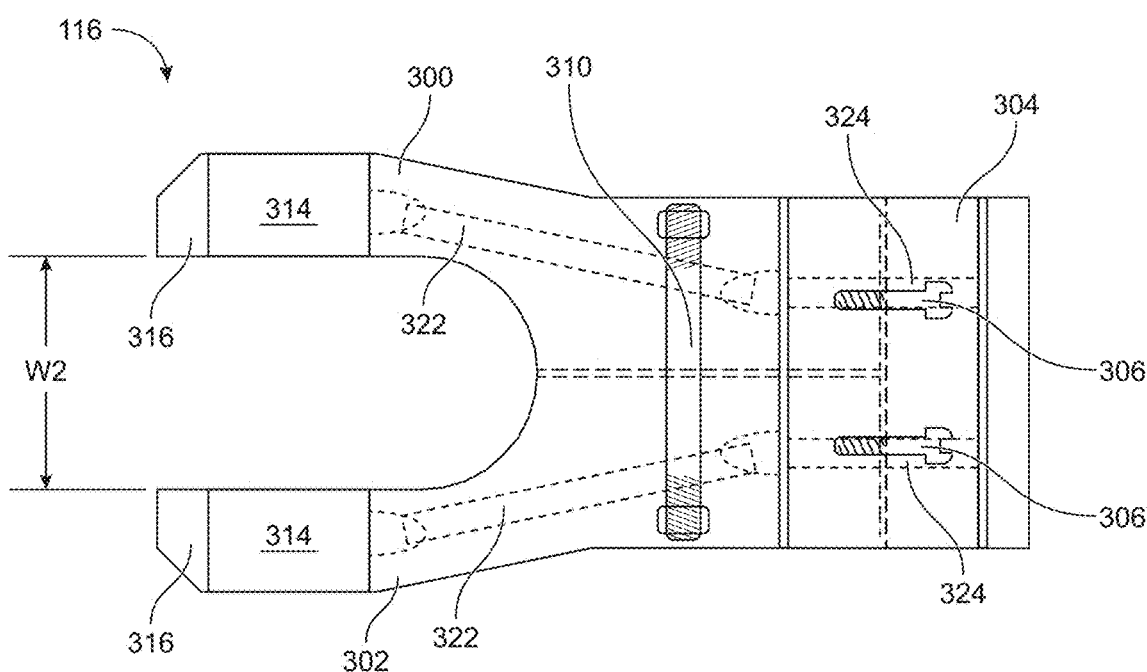
Figures 16, 17, 18, 19:
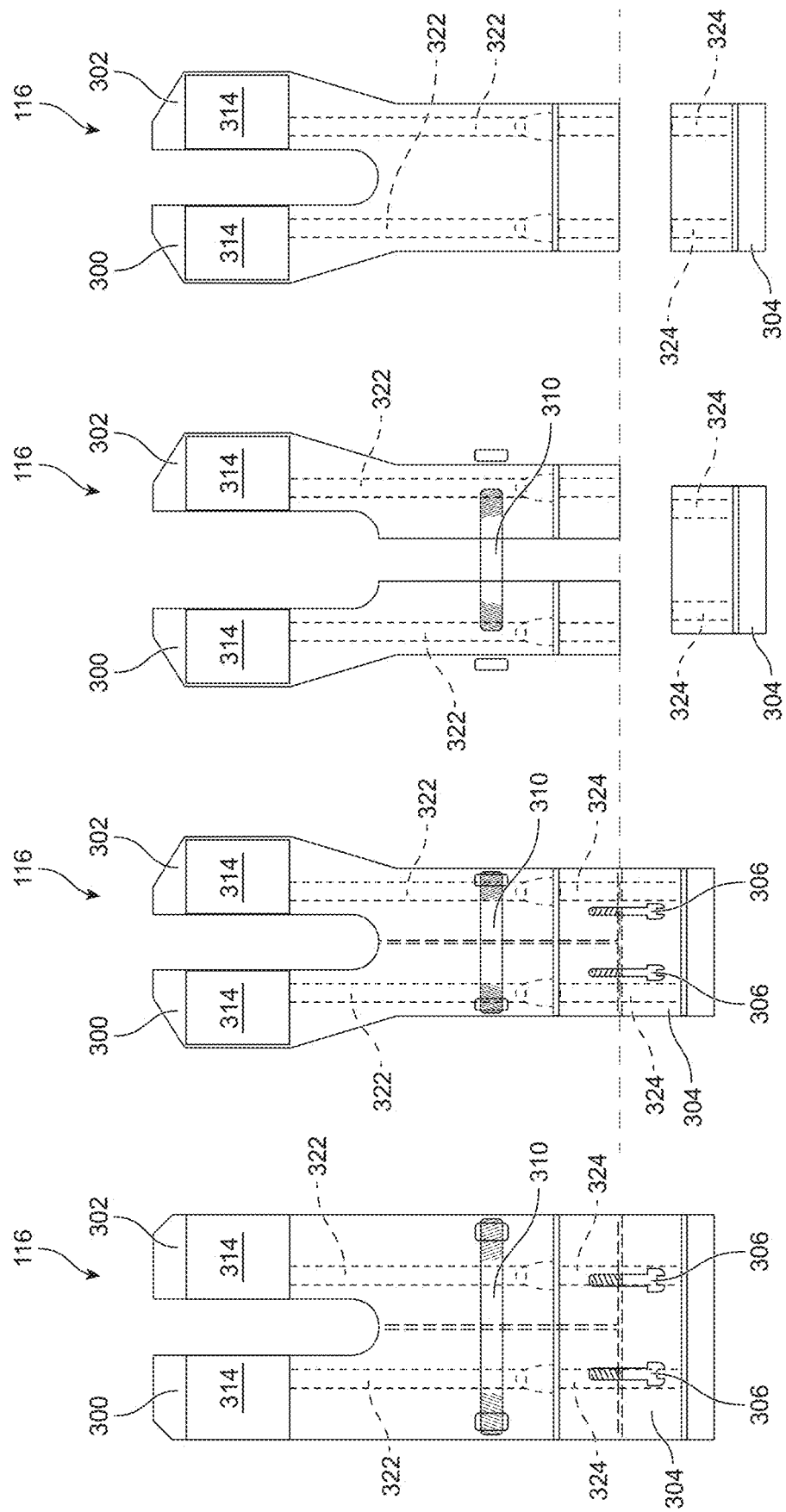
FIGS. 16-19 illustrate various constructions of connecting rods that can be used with the internal combustion engines employing a uniblock.

FIG. 15 illustrates another example of the connecting rod 116 that is arranged and configured in accordance with certain features, aspects, and advantages of the present disclosure. The connecting rod 116 illustrated in FIG. 15 is similar to the connecting rod 116 illustrated in FIG. 14. However, the first and second legs 300, 302 of the connecting rod 116 illustrated in FIG. 15 are spaced further apart, which defines a larger gap between the first and second legs 300, 302. In other words, the first and second legs 300, 302 in the connecting rod 116 shown in FIG. 14 are closer together than the first and second legs 300, 302 of the connecting rod 116 shown in FIG. 15. The illustrated internal combustion engine 100 that uses the uniblock 102 uses both of these constructions (i.e., the constructions shown in FIGS. 14 and 15) at the same time. The illustrated pairing of the wide forked connecting rods 116 and the narrow forked connecting rods 116 are used to join the two crankshafts 112 to the single crosshead 114 (or the combination crosshead 114 and piston 110).

As illustrated in FIG. 14 and FIG. 15, the narrow forked connecting rod 116 defines an outer dimension W1. The outer dimension W1 is defined by laterally outwardly facing surfaces 312 of the first and second legs 300, 302 adjacent to a pair of openings 314 in the first and second legs 300, 302. The wide forked connecting rod 116 defines an inner dimension W2. The inner dimension W2 that is greater than W1. The inner dimension W2 of the wide forked connecting rod 116 is defined by laterally inwardly facing surfaces 316 of the first and second legs 300, 302 adjacent to the pair of openings 314 in the first and second legs 300, 302. Because the inner dimension W2 is greater than the outer dimension W1, the first and second legs 300, 302 of the narrow forked connecting rod 116 can be accommodated between the legs 300, 302 of the wide forked connecting rod 116. The narrow forked connecting rod 116 also defines an inner dimension W3. The inner dimension W3 is defined adjacent to the pair of openings 314 by laterally inwardly facing surfaces 320 of the first and second legs 300, 302. The inner dimension W3 is sized and configured to receive a portion of the crosshead 114.

Figure 20:
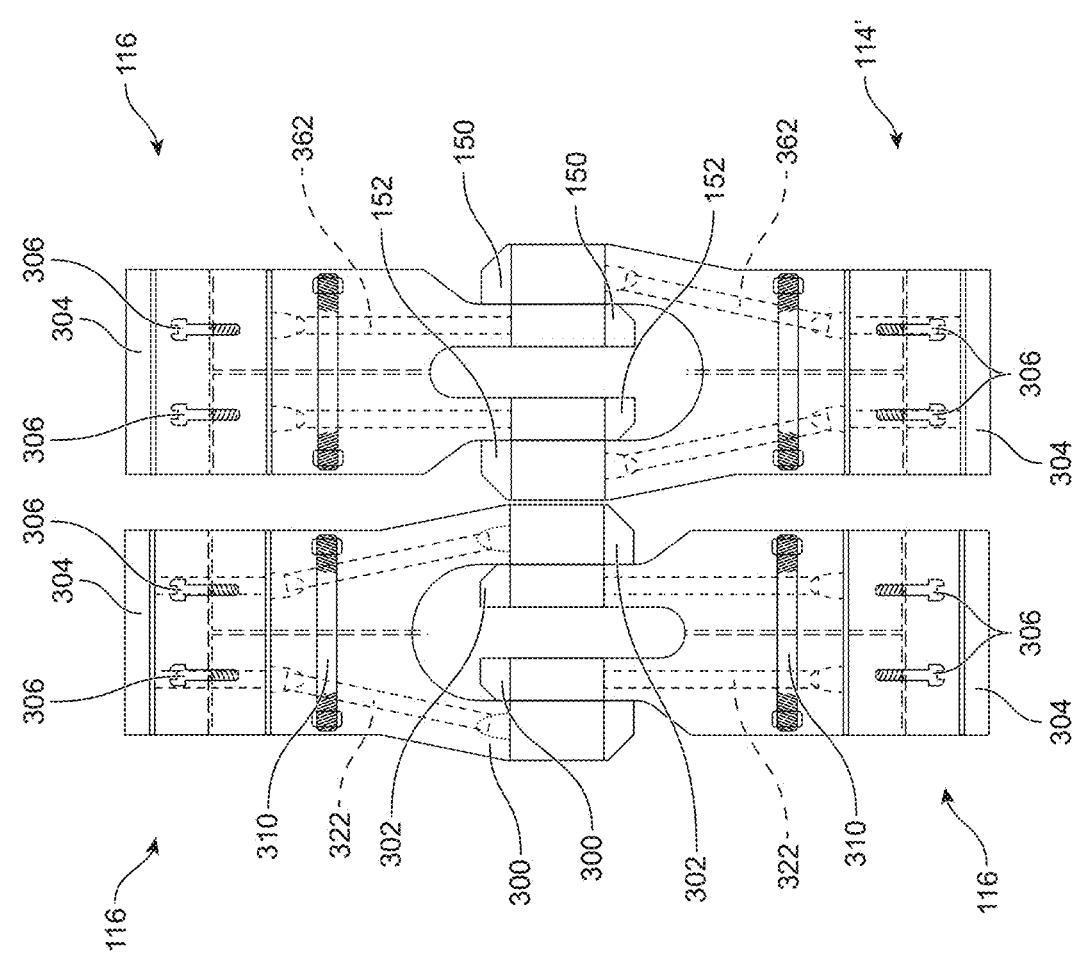
FIG. 20 illustrates the connecting rod of FIG. 14 engaged with the connecting rod of FIG. 15.

FIG. 20 illustrates four nested forked connecting rods 116. As illustrated, the first and second legs 300, 302 of the narrow forked connecting rod 116 can be received between the first and second legs 300, 302 of the wide forked connecting rod 116 in some constructions. In FIG. 20, the connecting rod 116 with the relatively narrow forked legs 300, 302 (e.g., the connecting rod 116 of FIG. 14) can be arranged within the connecting rod 116 with relatively wide forked legs (e.g., the connecting rod 116 of FIG. 15) such that the first and second legs 300, 302 of the connecting rods 116 face each other and can be mechanically coupled to each other using a pin (not shown) or other suitable mechanical structure passing through the openings 314 of each of the connecting rods 116.

FIG. 20 also illustrates a relative placement of the two types of forked connecting rods 116. As shown in FIG. 20, when arranged next to one another, the wide forked connecting rods 116 and the narrow forked connecting rods 116 can be alternated along the crankshafts 112, although other configurations are possible. For example, the narrow forked connecting rods 116 can be arranged in a line (e.g., secured to the first crankshaft 112) and the wide forked connecting rods 116 can be arranged in another line (e.g., coupled to the second crankshaft 112) and the two segregated sets of connecting rods 116 can be joined together. Desirably, the connecting rods 116 at the top of FIG. 20 can be connected to the first crankshaft 112 and the connecting rods 116 at the bottom of FIG. 20 can be connected to the second crankshaft 112.

Figure 21:
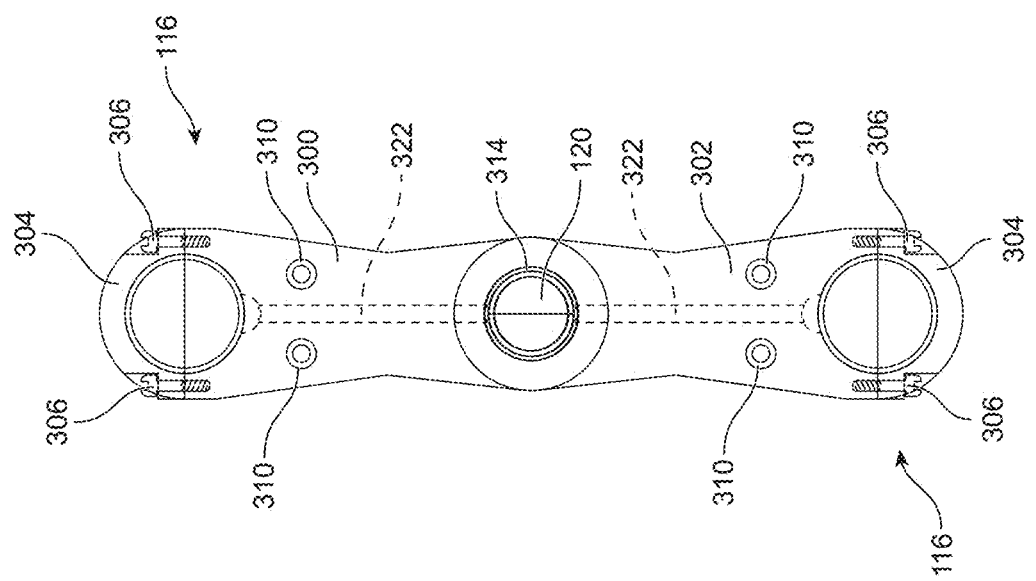
FIG. 21 illustrates an end view of the arrangement of FIG. 20.

FIG. 21 illustrates an end view of the arrangement of FIG. 20. The connecting rods 116 can be joined for pivoting at the sliding pin 120 such that the connecting rods 116 can pivot with respect to one another about the sliding pin 120. The sliding pin 120 can define a pivot point between the connecting rods 116. The axis of the sliding pin 120 defines the pivot axis of the joined connecting rods 116.

With reference again to FIGS. 14 and 15, in the illustrated configuration, each of the first leg 300 and the second leg 302 can comprise an oil passage 322. For example, the oil passage 322 can extend toward a distal end of the respective leg 300, 302 (i.e., where the legs 300, 302 joins the sliding pin 120) from the proximal end of the leg 300, 302 (i.e., where the legs 300, 302 meet the back cap 304). The oil passage 322 of the first leg 300 and the oil passage 322 of the second leg 302 can be in fluid communication with an oil passage 324 of the back cap 304. The oil passages 322, 324 are configured to deliver lubricant to the sliding pin 120 from the crankshaft 112. The lubricant is delivered to the oil passages 324 from the oil passages 280 that are formed in the crankshafts 112.

Figure 22:
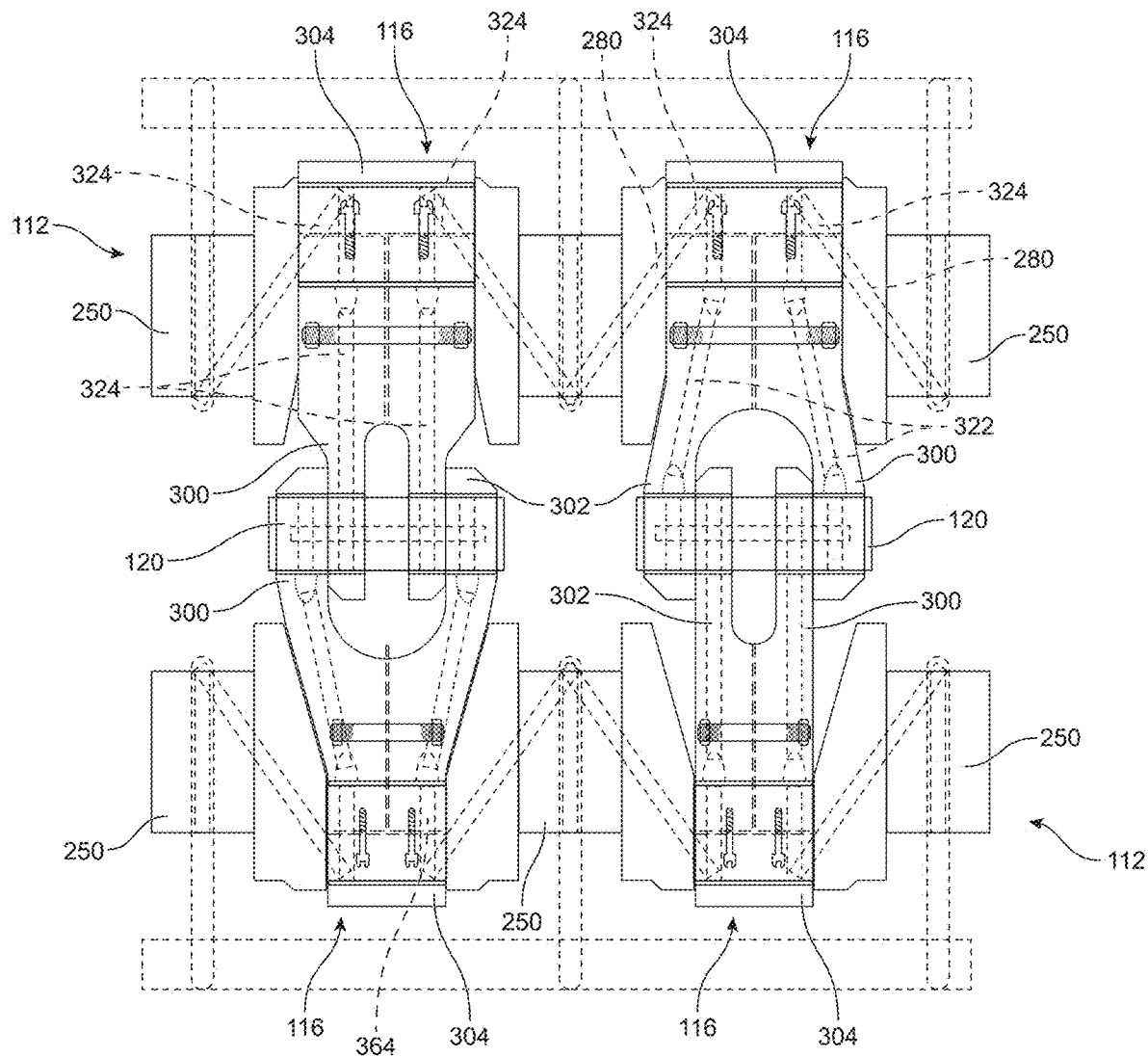
FIG. 22 shows two pairs of the connecting rods of 14 and 15 connected to two crankshafts.

FIG. 22 shows an example configuration in which two pairs of the forked connecting rods 116 are connected to the two crankshafts 112. As illustrated in FIG. 22, the crankshafts 112 can include the oil passages 280 that facilitate the flow of oil from the top caps 212 to the crankshaft 112. Because the passages 322 defined by the first and second legs 300, 302 and the back caps 304 receive one of the crank pins 252 of the crankshaft 112, oil can flow from the crankshaft 112 into the oil passage 324 of the back cap 304 to and through the oil passage 322 of the first leg 300 and the second leg 302, and to the sliding pin 120 of the crosshead 114. In some configurations, oil can flow from the crosshead 114 to the piston 110 and/or to any piston rings associated with the piston 110.

Figure 23:
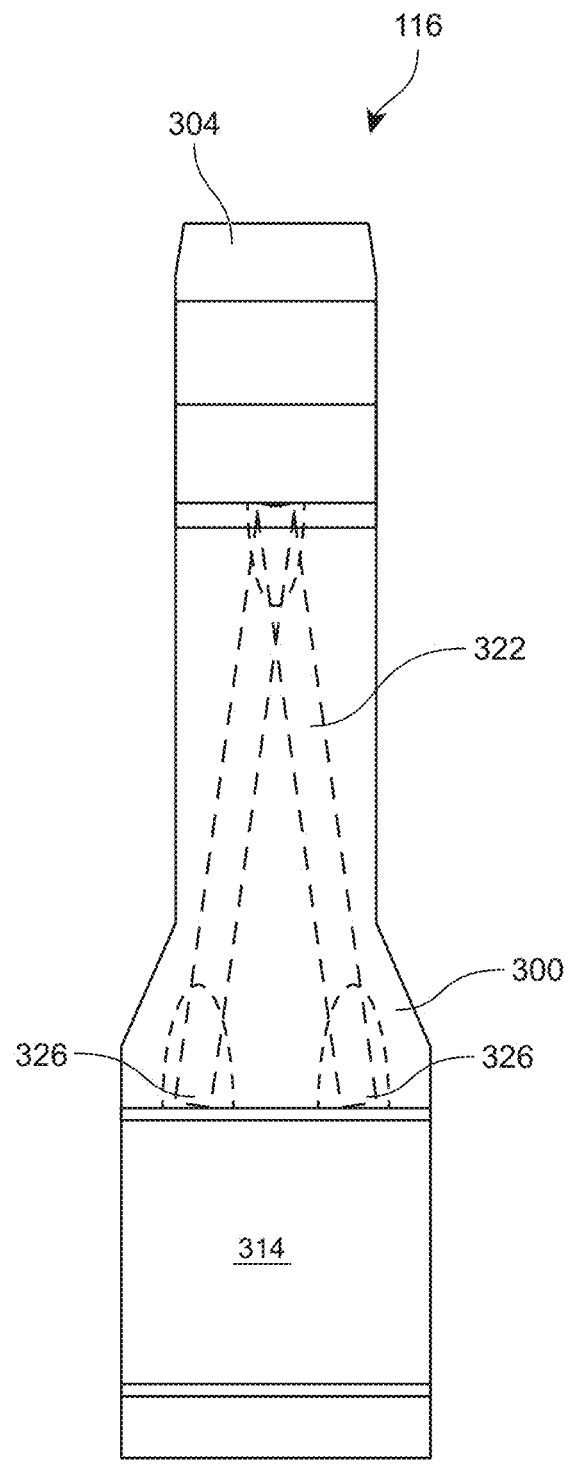
FIG. 23 illustrates an example of oil passages formed within a non-forked connecting rod.

FIG. 23 illustrates an example of the non-forked connecting rod 116. The non-forked connecting rod 116 illustrated in FIG. 32 shares some features of the other connecting rods 116 (e.g., multi-component construction and oil passages) but is not forked. As illustrated the non-forked connecting rod 116 comprises the first leg 300 and the back cap 304. The back cap 304 can be secured to the first leg 300 in any suitable manner. As illustrated, the oil passage 322 can comprise two branches that terminate in a pair of orifices 326. The pair of orifices 326 extend into the opening 314 that receives the sliding pin 120.

FIGS. 24-27 illustrate side views of a series of connecting rods 116 that are arranged and configured in accordance with certain features, aspects, and advantages of the present disclosure. As shown in FIGS. 24-27, the connecting rods 116 can have a variety of outer profiles. Note that the outer profiles that are illustrated in FIGS. 24-27 can be used with any of the connecting rods 116 discussed in this disclosure, including the narrow forked connecting rods 116, the wide forked connecting rods 116, and the non-forked connecting rods 116 described above. The profile of the connecting rod 116 can be selected to meet desired weight, rigidity, and/or other design parameters. FIG. 24 illustrates an outer profile with two linear side walls 330 that intersect at an angle or inflection line 332. FIG. 25 illustrates an outer profile with an arcuate wall 334. The arcuate wall 334 can have a consistent radius of curvature and can have a plurality of radii of curvature. FIG. 26 and FIG. 27 illustrate linear side walls 336. While FIG. 27 illustrates linear side walls 336 with no separate back cap 304, any of the other outer profiles also can be used without a separate back cap 304 and the configuration of FIG. 27 can be used with a separate back cap 304.

The multi-component connecting rod 116 can be bolted together using the fasteners 310. In some configurations, the connecting rod 116 may not comprise multiple separate pieces that are subsequently connected together. In some configurations, the connecting rod 116 can be machined as a single component. In some configurations, the crankshaft 112 can comprise multiple components that are secured together (e.g., using screws, bolts, dowels, compression fitting, and/or any other suitable attachment means). The connecting rods 116 can be slid onto the crank pins 262 of the crankshaft 112 prior to assembly of the crankshaft 112, thereby enabling the connecting rods 116 to comprise a single component.

As discussed above, the connecting rod 116 illustrated in FIG. 7K comprises a single monolithic structure. The connecting rod 116 of FIG. 27 includes one or more oil passages 322 to facilitate the flow of oil through the connecting rod 116 but the connecting rod 116 can be manufactured as a single component. Such an approach may be desirable, for example, to reduce the likelihood of failure of the connecting rod 116. For example, the multi-part connecting rod 116 may be more likely to fail at points where the parts are attached to one another.

In some configurations, the connecting rod 116 can be primarily under tension during operation of the internal combustion engine 100 using the uniblock 102. In such configurations, compressive strength of the connecting rod 116 can be much lower compared to conventional engine configurations. Accordingly, in some configurations, the connecting rod 116 can comprise a carbon fiber material. For example, in some configurations, carbon fiber windings can be used in the construction of the connecting rod 116. Carbon fiber can have several advantages for use in the connecting rod 116, such as high stiffness, high tensile strength, high strength to weight ratio, low thermal expansion, and high heat tolerance.

Figure 29:
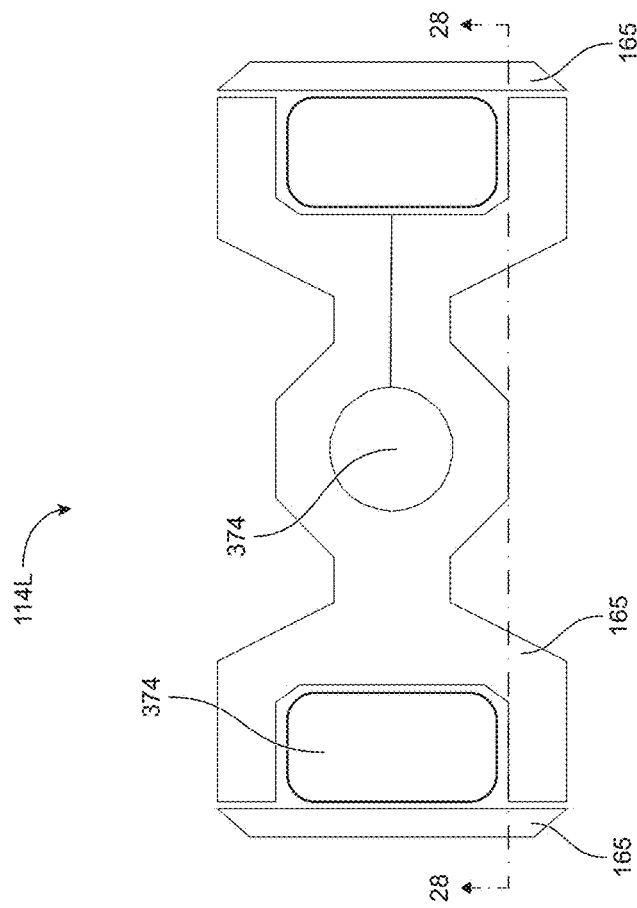
FIG. 29 is a sectioned view of the connecting rod of FIG. 28 taken along the line 29-29.
Figure 28:
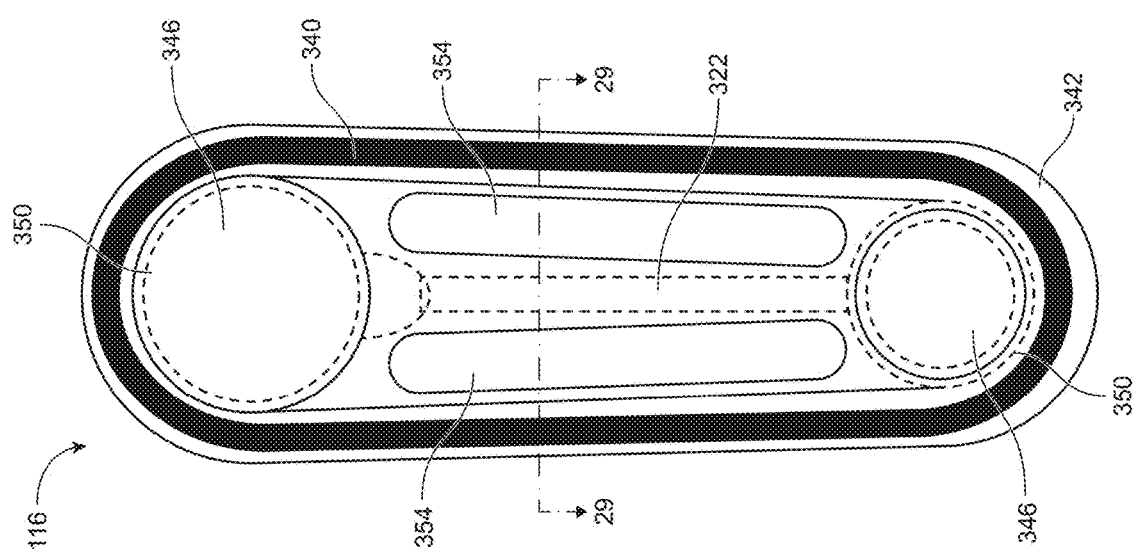
FIG. 28 is a side view of a connecting rod using carbon fiber.

FIGS. 28 and 29 illustrate an example of the connecting rod 116 that uses carbon fiber windings 340. FIG. 28 is a sectioned side view of the connecting rod 116 while FIG. 29 is a sectioned view looking down. While the section lines are not truly section lines, the lines help to orient the reader.

As shown in FIGS. 28 and 29, in some configurations, the connecting rod 116 can have a core formed of wound carbon fiber 340. The carbon fiber 340 can be wound around a shell 342. The shell 342 can be metal or any other suitable material. The shell 342 can be sealed using caps 344. While illustrated as a non-forked connecting rod 116 in FIGS. 28 and 29, it will be appreciated that such a construction could be adapted to other connecting rod configurations, such as forked connecting rods and the other configurations discussed in the present disclosure.

In some configurations, the carbon fiber 340 is wound carbon fiber, in which the carbon fibers are generally oriented in the same direction. The use of the wound carbon fiber 340 can provide benefits, such as increased strength and stiffness as compared with some other forms of carbon fiber. In some configurations, other forms of carbon fiber may be used. In some configurations, the wound carbon fiber 340 can be wrapped around the shell 342. In the illustrated configuration, the shell 342 comprises opposed surfaces 346. The opposed surfaces 346 can have any suitable configuration. In the illustrated configuration, each of the opposed surfaces 346 comprises at least a portion of a cylinder or a rounded surface 350 about which the wound carbon fiber 340 can be wound. In some configurations, each of the opposed surfaces 346 is a cylinder. In at least some configurations, the opposed surfaces 350 are radiused with different curvatures relative to each other. In some configurations, the opposed surfaces 346 have different radii from each other. The wound carbon fiber 340 is wound over the opposed surfaces 346. Multiple passes of the wound carbon fiber 340 are used to define the core. The caps 344 can be applied to seal the connecting rod 116 and cover the wound carbon fiber 340.

As illustrated in FIGS. 28 and 29, the connecting rod 116 can include oil passages 352. The oil passages 352 can operate in a manner similar to or the same as that of the oil passages shown in other configurations of the connecting rods 116. Other configurations are possible for carrying the lubricant or oil. Further, the illustrated connecting rod 116 includes surface recesses 354 that can further reduce the weight of the connecting rod 116. The surface recesses 354 can extend between the opposed surfaces 346. In some configurations, the surface recesses 354 can have radiused surfaces or can have angular surfaces. The surface recesses 354 remove material to decrease weight because the material is not needed for compressive strength, as discussed above. Other weight reduction structures and techniques also can be used keeping in mind the desire to have sufficient strength in tension and compression.

Figure 30:
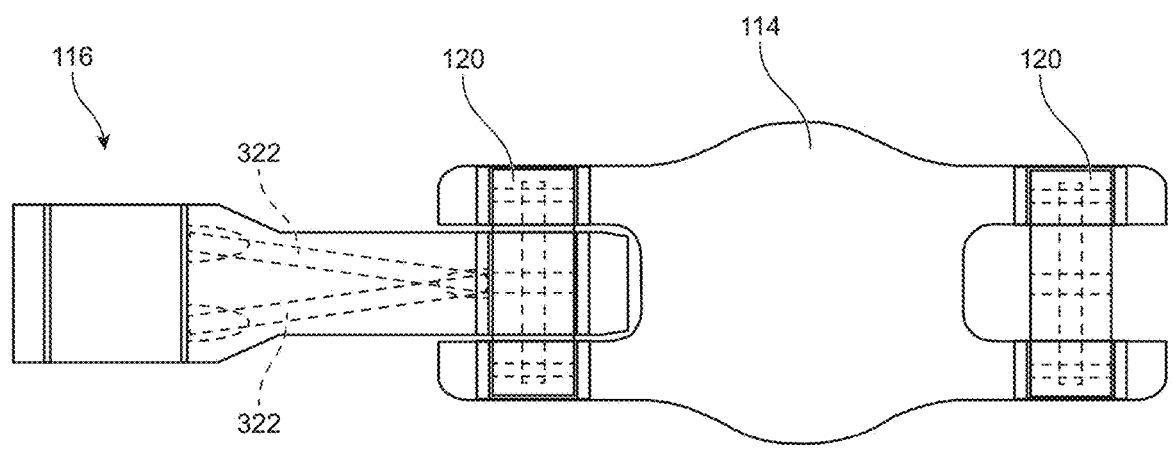
FIGS. 30 and 31 illustrate two examples of connecting rods attached to crossheads.
Figure 31:
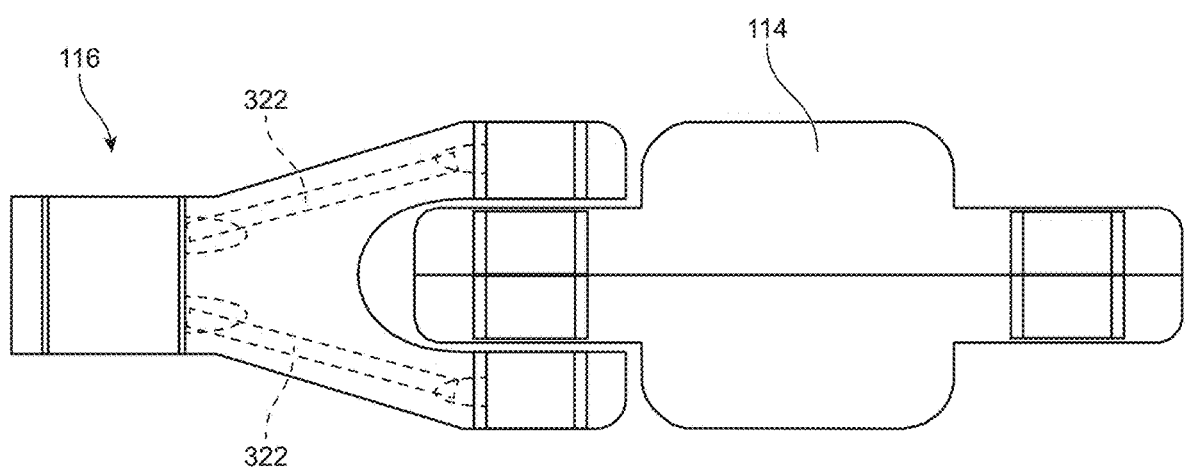

In many of the examples, the connecting rods 116 are forked. In some configurations, it can be desirable to use the non-forked connecting rods 116. For example, if the crankshaft 112 uses counterweights, using relatively thin connecting rods 116 is preferred. In some configurations, the non-forked connecting rods 116 can be used with the forked connecting rods 116. In some configurations, the crosshead 114 can be forked and a non-forked connecting rod 116 can be used. In some configurations, the crosshead 114 may not be forked and the forked connecting rods 116 can be used. FIGS. 30 and 31 illustrate the connecting rods 116 illustrated in FIGS. 23 and 15 attached to the crosshead 114. In FIG. 30, a non-forked connecting rod 116 is attached to a forked crosshead 114. In FIG. 31, the wide forked connecting rod 116 is connected to the non-forked crosshead 114. The connecting rods 116 can have any of the constructions set forth within this disclosure. The crossheads 114 are described in more detail below. While there can be advantages to using the forked structures, such as providing for smoother motion with less side to side or twisting forces, it is not necessary to use the forked structures. For example, in low power and/or low-cost engines, it may be desirable to use relatively simple engine components.

Crossheads and Crosshead Assemblies

As described above, the crosshead 114 can be connected to the connecting rods 116 using sliding pins 120. This is shown, for example, in FIGS. 30 and 31. Accordingly, the piston 110 also can be mechanically linked to the two crankshafts 112 through the crosshead 114.

The crosshead 114 also can be connected to (or form a part of) the piston 110. The crosshead 114 can be integrated into the piston 110. For example, the crosshead 114 can be formed as a monolith with one or more of the pistons 110 out of a single piece of material. In some configurations, the piston 110 and the crosshead 114 can be separate components. In some such configurations, the piston 110 can be mechanically coupled to the crosshead 114. In some such configurations, the piston 110 and the crosshead 114 can form a rigid structure. In some configurations, the crosshead 114 can be configured to have a variable size and/or can be configured to be articulable. For example, in some configurations, the crosshead 114 and the piston 110 can be configured to allow a range of articulation of the crosshead 114 that allows movement of the connection locations between the crosshead 114 and the connecting rods 116 relative to the connection locations between the crosshead 114 and the piston 110.

Figure 32:
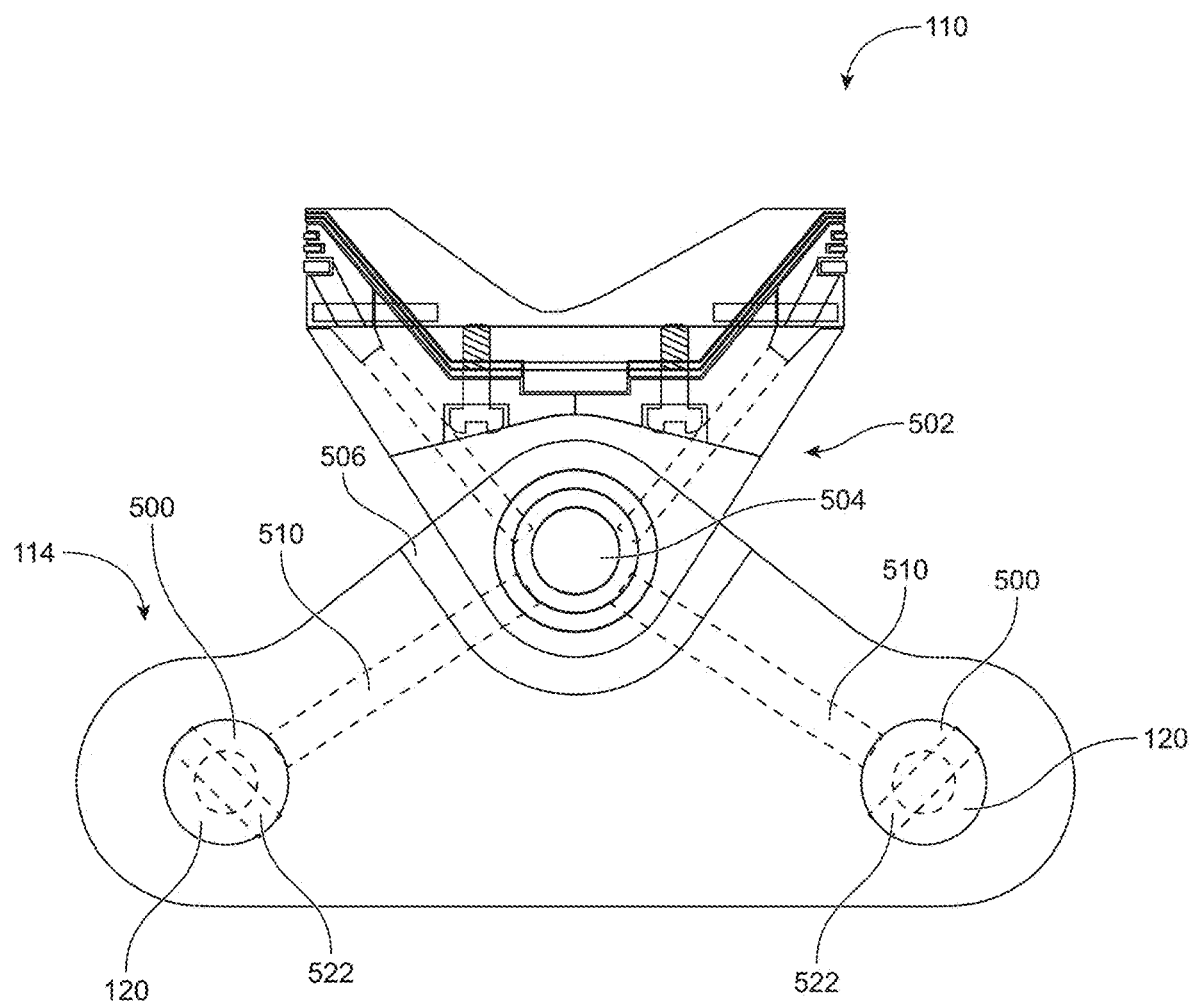
FIGS. 32 and 33 illustrate two examples of pistons attached to crossheads.
Figure 33:
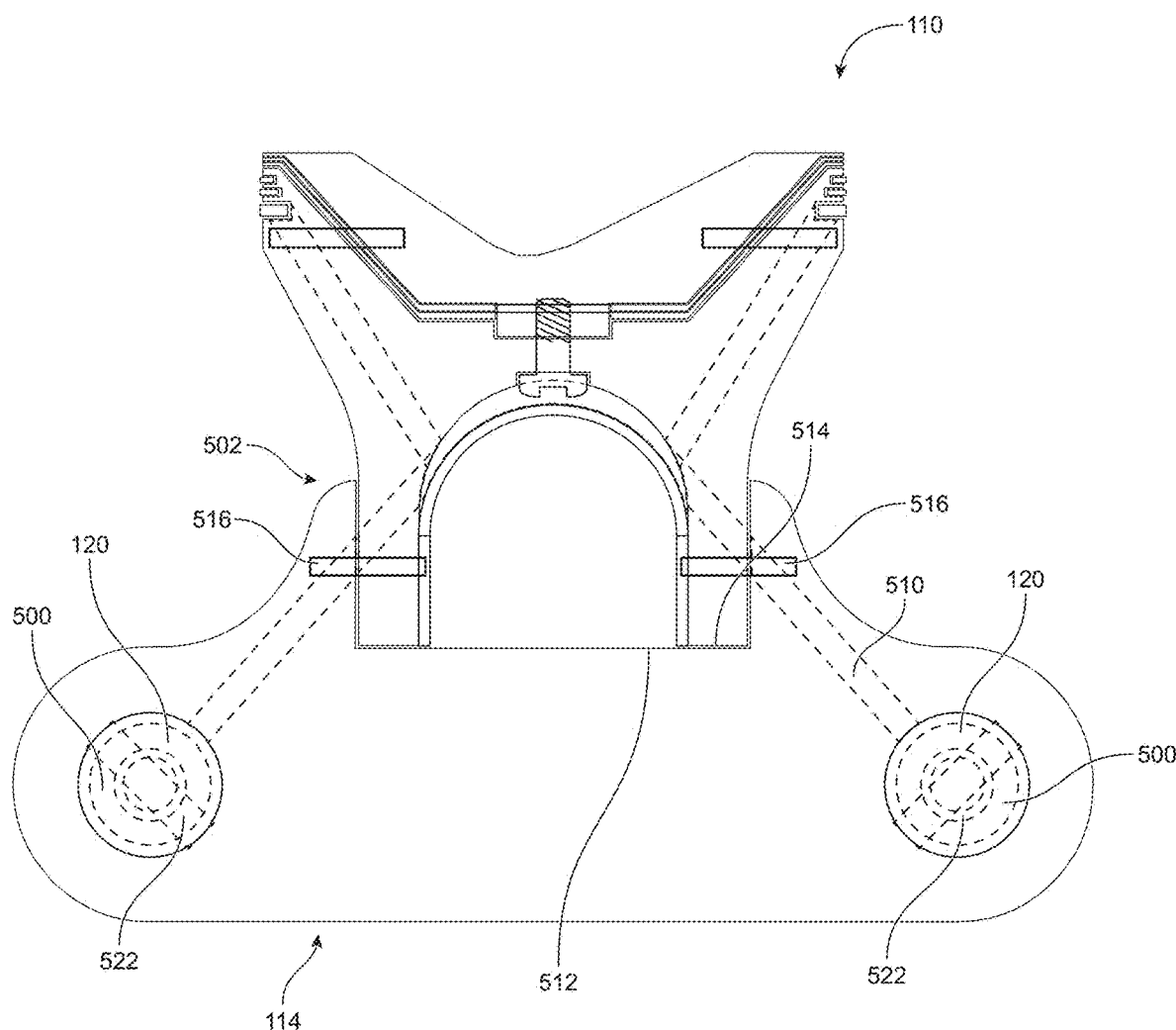

FIGS. 32 and 33 illustrate the crosshead 114 and the piston 110 as separate components that are mechanically joined. The crosshead 114 depicted in FIGS. 32 and 33 can be connected to a single piston 110. However, other configurations are possible. For example, the crosshead 114 can be connected to two or more pistons 110.

The crosshead 114 can include mounting holes 400. The crosshead 114 can be formed from a plate or flat material. The mounting holes 400 can extend through the plate or flat material. In the illustrated configurations, the mounting holes 400 are positioned laterally outward of the outermost surface of the piston 110. Other configurations are possible.

In the illustrated configuration, the mounting holes 400 are sized and configured to receive the sliding pins 120. In the configurations illustrated in FIGS. 32 and 33, the mounting holes 400 are used to connect the crosshead 114 to the connecting rods 116. For example, each of the connecting rods 116 can be connected to the crosshead 114 using the sliding pin 120 that passes through the connecting rod 116 and through the mounting holes 500 of the crosshead 114.

The crosshead 114 can include a piston attachment location 502. Desirably, the piston includes a recess or slot that receives the piston attachment location 502. In some configurations, the attachment location may be defined by the location of an attachment pin 504. The attachment pin 504 can be used to secure the piston 110 to the crosshead 114. The piston 110 can be attached to the crosshead 114 using any suitable attachment arrangement. In the illustrated configuration, the piston attachment location 502 is between the mounting holes 500. In the illustrated configuration, the piston attachment location 502 is vertically closer to the piston 110 than the mounting holes 500.

In some configurations, the piston 110 can pivot or articulate relative to the crosshead 114. The relative pivoting movement can occur about an axis defined by the attachment pin 504. The range of movement of the piston 110 relative to the crosshead 114 can be limited by a raised region 506 or other features of the crosshead 114. In the illustrated configuration, the raised region 506 is generally arcuate. Other configurations are possible.

In some configurations, the crosshead 114 can include one or more oil passages 510. The oil passages 510 can be fed lubricant from oil passages 522 that are formed in the sliding pins 120. Lubricant can be delivered to the piston 110 through the oil passages 510. Other configurations are possible.

FIG. 33 illustrates another example of the crosshead 114 and the piston 110. In contrast to the configuration illustrated in FIG. 32, the piston 110 of FIG. 33 can be affixed to the crosshead 114 in a manner that does not allow articulating or pivoting movement of the piston 110 relative to the crosshead 114. The piston attachment location 502 of the crosshead 114 illustrated in FIG. 33 can comprise a receiving portion 512. The receiving portion 512 of the crosshead 114 accommodates at least a portion of the piston 110. The receiving portion 512 can be, for example, a cavity or a recess. In some configurations, the receiving portion 512 can be a groove. In some configurations, the receiving portion 512 can be a cavity. Other configurations are possible keeping in mind a goal of inserting at least a portion of the piston 110 into the crosshead 114. In the illustrated configuration, a bottom wall 514 of the piston 110 sits on or adjacent to a surface of the receiving portion 512 of the crosshead 114, which faces the piston 110. Once inserted, the piston 110 can be secured to the crosshead 114 in any suitable manner. In some configurations, the piston 110 can be secured to the crosshead 114 using bolts, dowels, or the like. For example, in FIG. 33, the piston 110 is affixed to the crosshead 114 using dowels 516.

Figure 34:
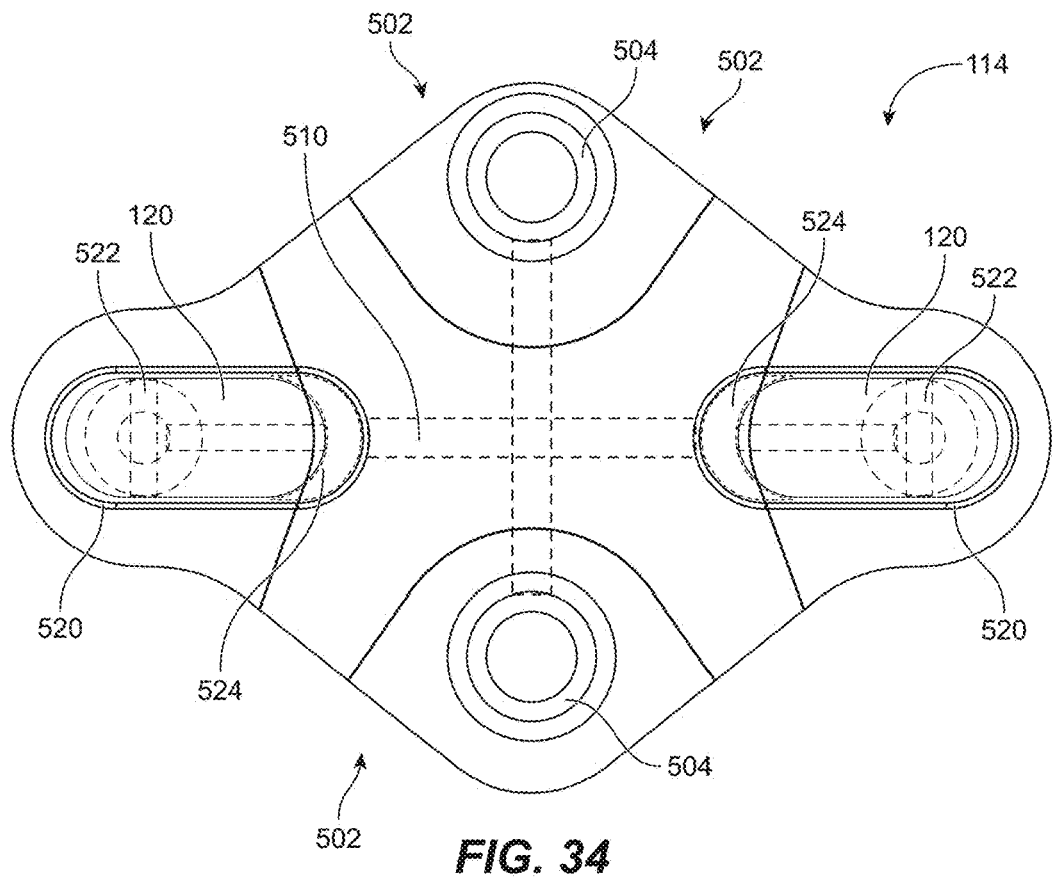
FIGS. 34 and 35 illustrate two articulable crosshead configurations.
Figure 35:
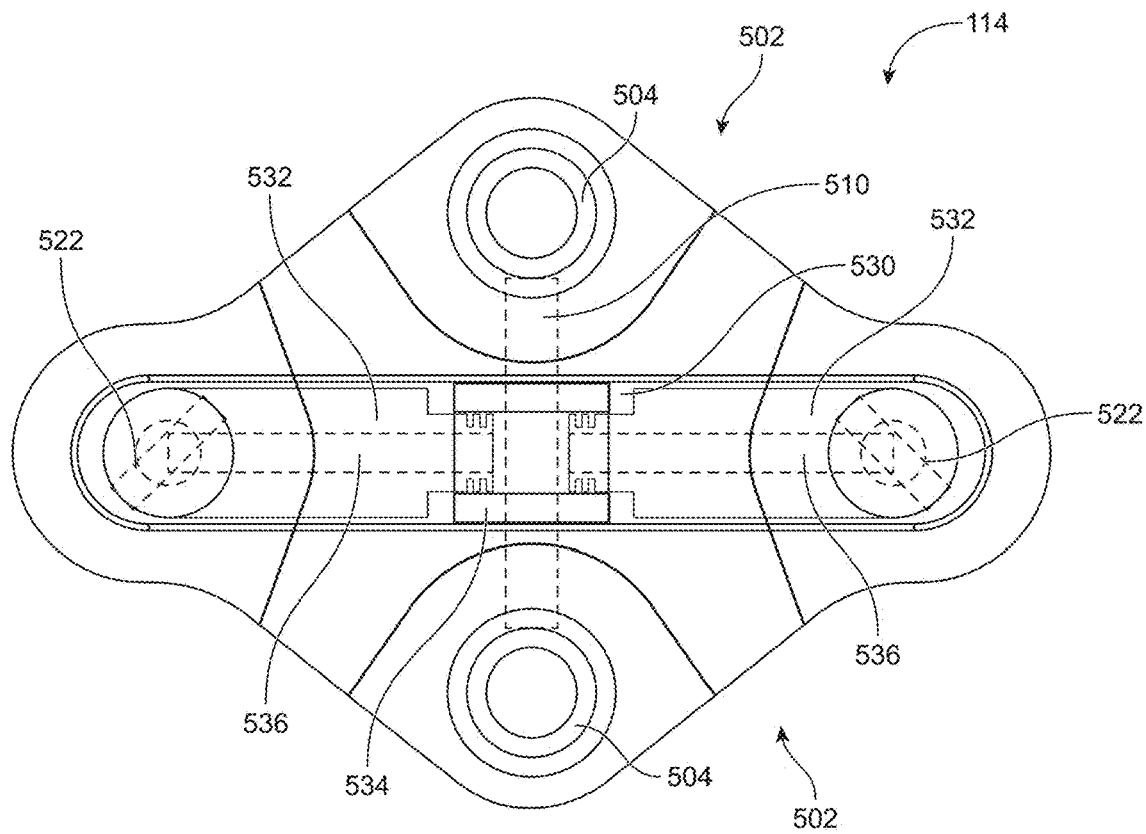

FIGS. 34 and 35 illustrate articulable configurations of the crosshead 114. The illustrated crosshead 114 is configured to connect to two opposing pistons (not shown). With reference to FIG. 34, the crosshead 114 can include two attachment locations 502. One of the two pistons can be attached to each attachment location 502 in an articulable manner. The attachment locations 502 can be defined by the attachment pins 504, for example but without limitation. The two attachment pins 504 can be opposed to each other.

Halfway between the two attachment pins 504, the illustrated crosshead 114 can comprise two openings 520. The two openings 520 can have any suitable configuration. In the illustrated configuration, the two openings 520 can comprise elongated holes. In some configurations, the two openings 520 can be slots. In some configurations, the two openings 520 can be oval-shaped slots. In some such configurations, the oval-shaped slots have a major axis that extends normal to a plane that passes through the centers of the two attachment pins 504.

The two openings 520 can be configured to receive the sliding pins 120. Each sliding pin 120 can slide laterally relative to the pistons within the respective opening 520. The sliding pins 120 can slide along the long axis of the opening 520. The sliding pin 120 provides a sliding connection between the connecting rod 116 and the crosshead 114. In some configurations, the sliding pin 120 comprises a circular pin that connects to the connecting rods 116 and a sliding force transferring central portion. In some configurations, the sliding transferring central portion can be flattened and/or can have a rectangular, oval, and/or the like shape.

In some configurations, the sliding pin 120 can comprise an inner oil passage 522. In some configurations, the opening 520 can define an oil reservoir in a gap 524 that is defined between the sliding pin 120 and the inner wall that defines the opening 520. In some such configurations, when the sliding pin 120 moves back and forth within the opening 520, oil can be driven from the gap 524 into the oil passage 510 in the crosshead 114. Lubricant can flow through the oil passage 510 to any attached pistons.

The configuration illustrated in FIG. 35 is similar in some respects to the configuration illustrated in FIG. 34. However, in the configuration illustrated in FIG. 35, the crosshead 114 comprises a single opening 530. The single opening 530 spans across the crosshead 114 relative to the attachment pin 504 for the piston. The single opening 530 extends across the crosshead 114 about halfway between the two attachment locations 502. The single opening 530 extends across the crosshead 114 about halfway between the axes of the two attachment pins 504.

The single opening 530 can have two couplings 532 disposed therein. The two couplings 532 are translatable along the single opening 530. The two couplings 532 can be secured or connected to a central retaining member 534. Each of the two couplings 532 can include an oil passage 536. In some configurations, oil can flow through the oil passages 536 into the central retaining member 534 and then into the oil passages 510.

Figure 36:
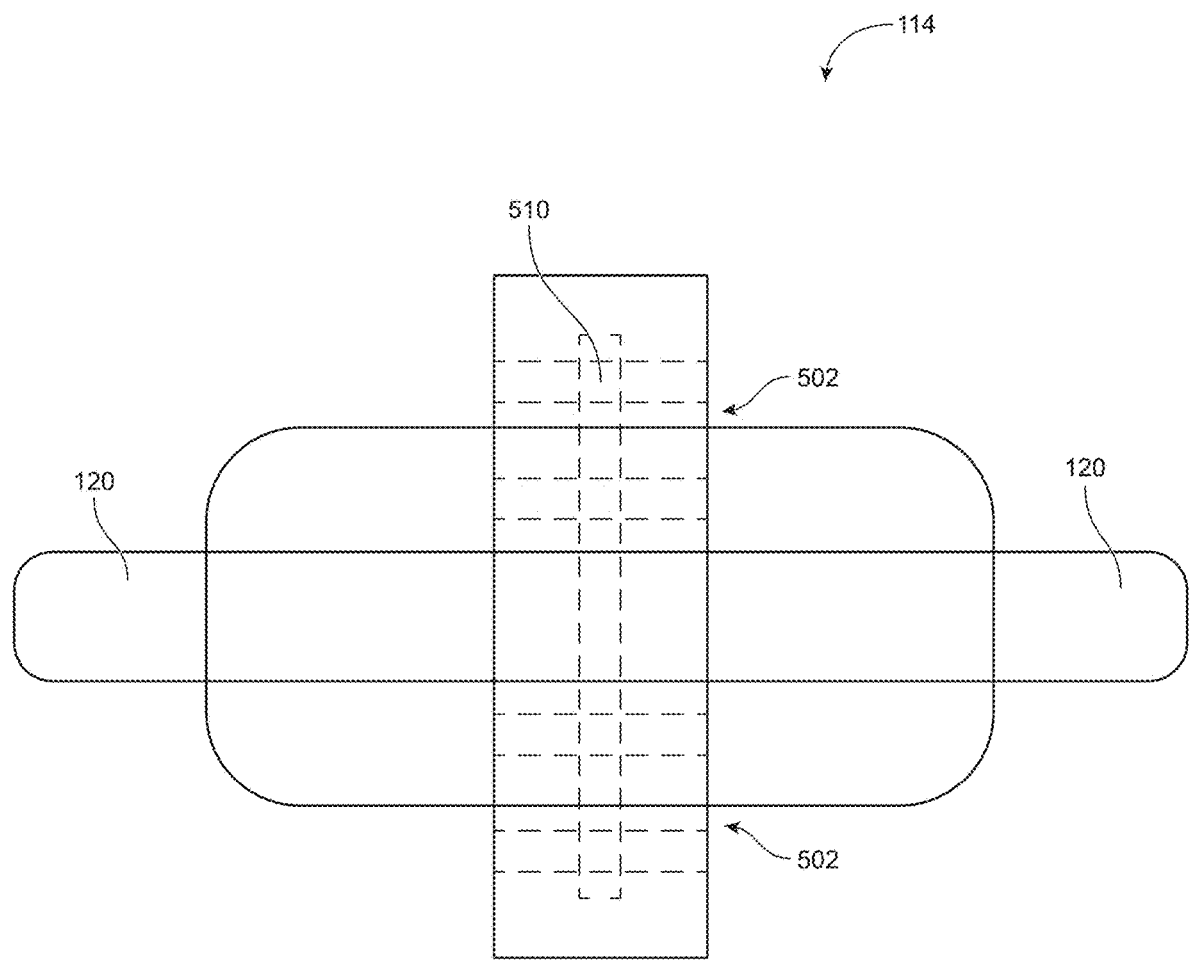
FIG. 36 illustrates a side view of an example of an articulated captured-free piston crosshead.

FIG. 36 illustrates a side view of both of the articulated captured-free piston crossheads 114 illustrated in FIGS. 34 and 35. The connecting rods that connect the crankshafts to the crosshead 114 can connect to the sliding pin 120. For example, the forked connecting rods can connect to the crosshead 114 on either side of the central member, shown extending horizontally in FIG. 36.

Figure 37:
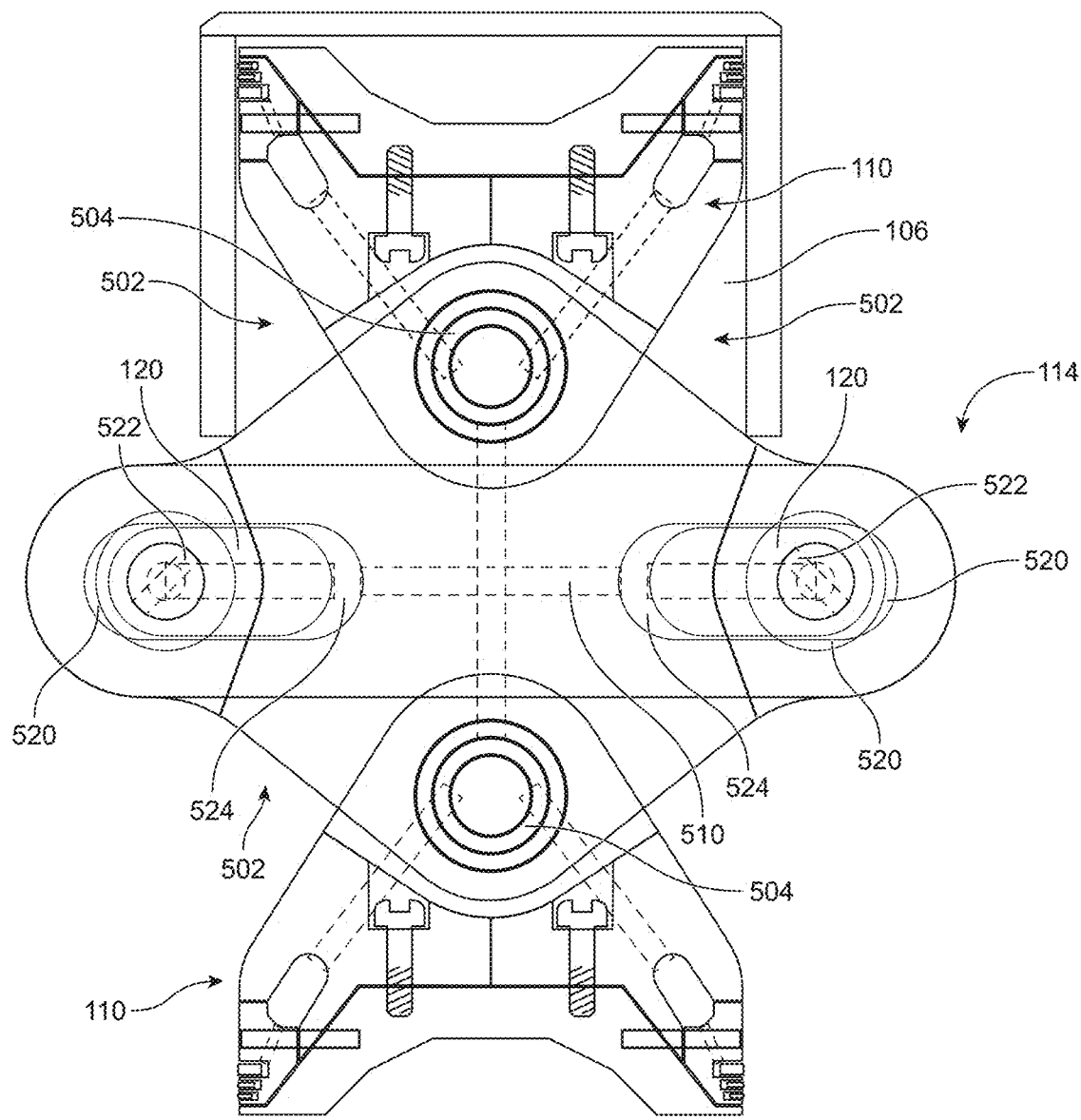
FIG. 37 illustrates the crosshead of FIG. 34 with pistons attached.
Figure 38:
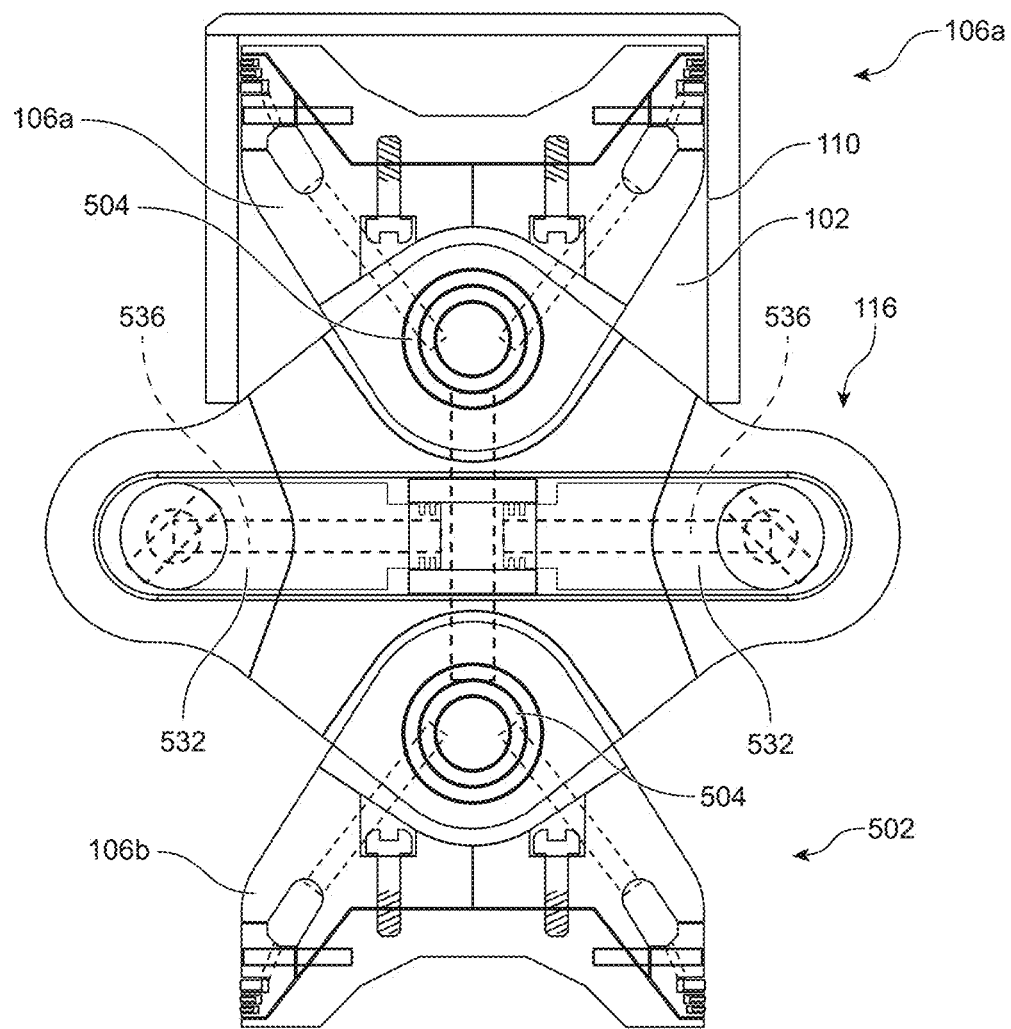
FIG. 38 illustrates the crosshead of FIG. 35 with pistons attached.

With reference now to FIG. 37, the crosshead 114 of FIG. 34 is illustrated with pistons 110 attached to the crosshead 114. The crosshead 114 of FIG. 35 is illustrated with pistons 110 attached thereto in FIG. 38. The crosshead 114 is connected to the first piston 110 at the first attachment location 502. The crosshead 114 is connected to the second piston 110 at the second attachment location 502. The piston 110 can be disposed inside of the cylinder bore 106. The piston 110 reciprocates within the cylinder bore 106. The piston 110 is illustrated at or near top dead center in FIG. 37 and in FIG. 38.

Figure 39:
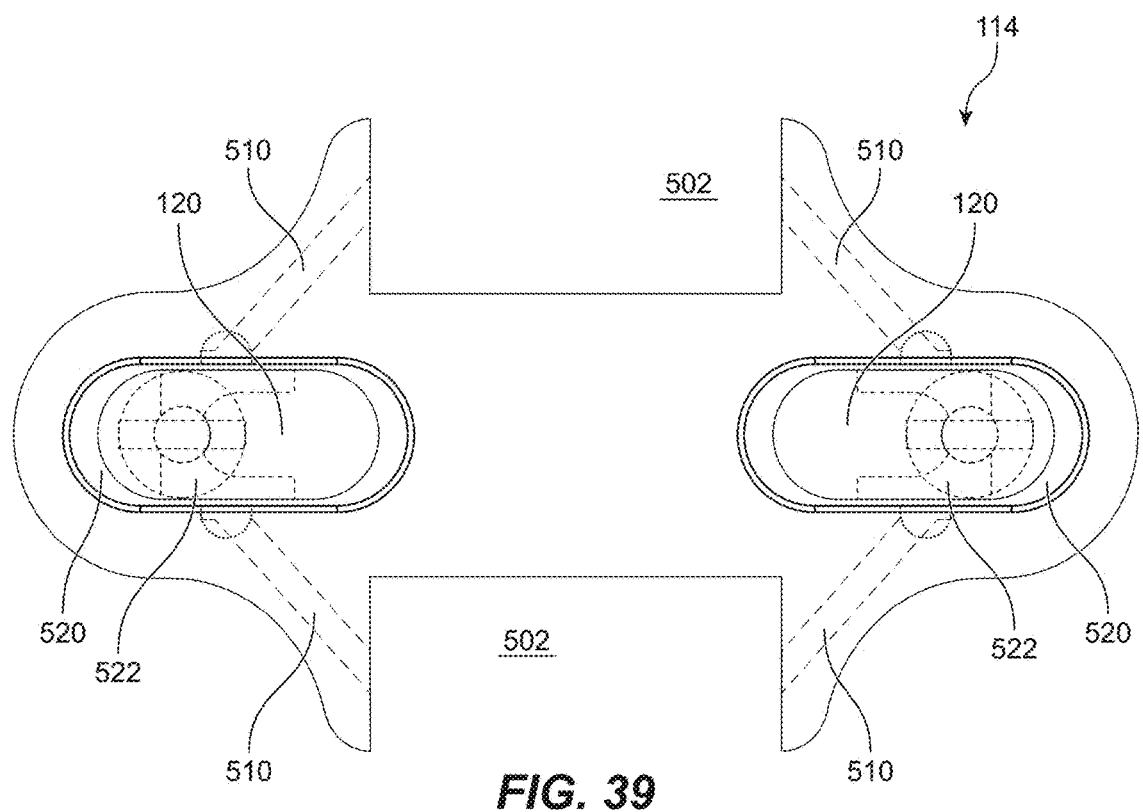
FIGS. 39 and 40 illustrate two configurations of non-articulating crossheads.
Figure 40:
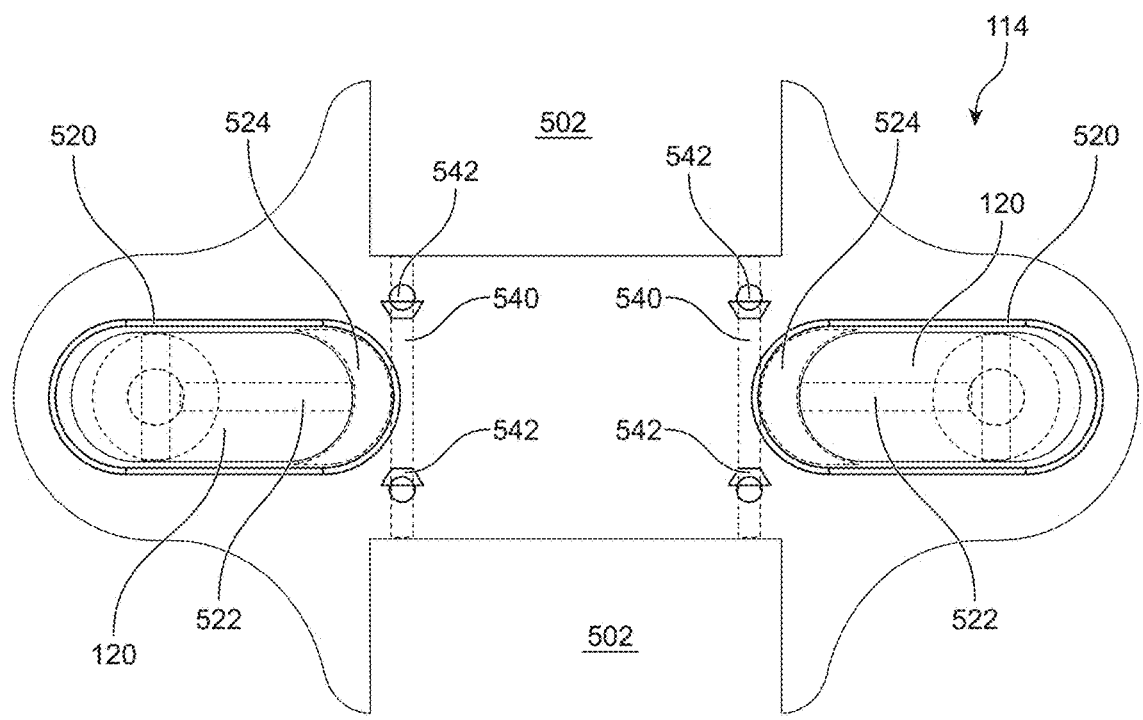
Figure 41:
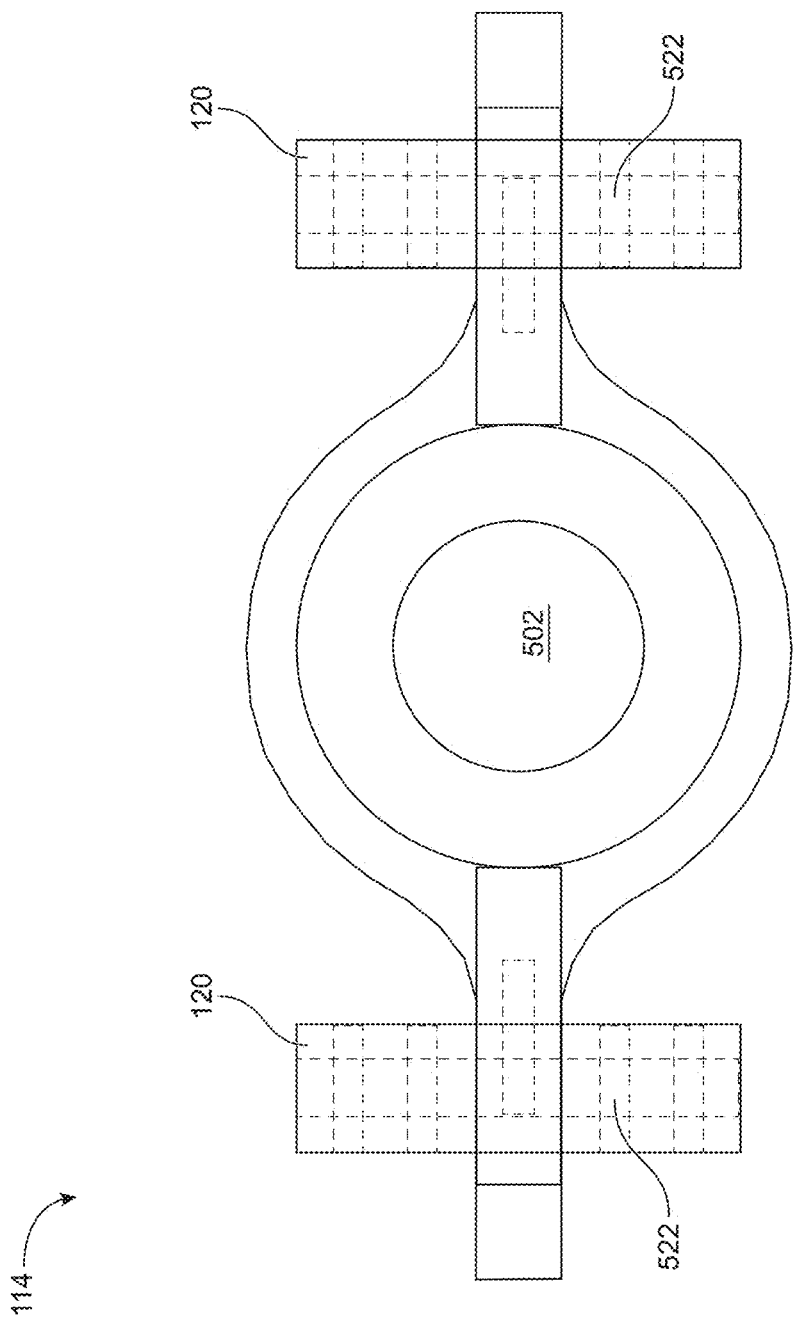
FIG. 41 illustrates a top plan view of the crossheads shown in FIGS. 39 and 40.

FIGS. 39 and 40 illustrate two configurations of the crossheads 114 configured to receive two pistons each. The illustrated configurations do not allow articulation of the pistons relative to the crossheads 114. FIG. 41 illustrates a top view of the crossheads 114 shown in FIGS. 39 and 40. As shown in FIGS. 39 and 40, the crossheads 114 can be configured to receive the pistons on opposite ends of the crosshead 114. With reference to FIG. 39, the crosshead 114 can comprise the elongate openings 520 described above. The elongate openings 520 are configured to receive the sliding pins 120. Each of the sliding pins 120 comprises the oil passage 522. The oil passage 522 can transmit oil such that oil can pass from the connecting rods into the oil passages 510 of the crosshead 114 and to the piston attachment locations 502. When assembled, the lubricant will flow to the pistons and any related piston rings. The sliding pins 120 can be fashioned such that the flow of oil is not disrupted or is not substantially disrupted when the sliding pins 120 reciprocate within the elongate openings 520 in response to movement of the connecting rods that are attached to the sliding pins 120. If desired, however, the elongate openings 520 and the sliding pins 120 can be configured so that there can be an interruption of flow.

The crosshead 114 illustrated in FIG. 40 is similar in some respects to the crosshead 114 illustrated in FIG. 39. Unlike the crosshead 114 illustrated in FIG. 39, in the crosshead 114 illustrated in FIG. 40, a pumping action can be used to facilitate the flow of oil. For example, the crosshead 114 illustrated in FIG. 40 includes the elongate openings 520. The elongate openings 520 receive the sliding pins 120. Each elongate opening 520 can define an oil reservoir 524. The oil reservoir 524 can contain a volume of oil. As the sliding pin 120 reciprocates back and forth within the elongate opening 520, oil can be forced from the oil reservoir 524 into the oil passage 540 of the crosshead 114. The oil reservoir 524 can be replenished by oil flowing through the oil passage 522 of the sliding pin 120. To prevent or reduce the likelihood of backflow, the oil passage 540 can include one-way valves (e.g., one-way ball valves) 542. Other suitable configurations also can be used to encourage one way flow. The one-way valves 542 can allow oil to flow from the crosshead 114 to the piston 110, which is disposed in the receiving portion of the crosshead 114 as discussed above. The one-way valves 542 preferably do not allow substantial backflow of oil from the piston 110 to the crosshead 114.

Figure 42:
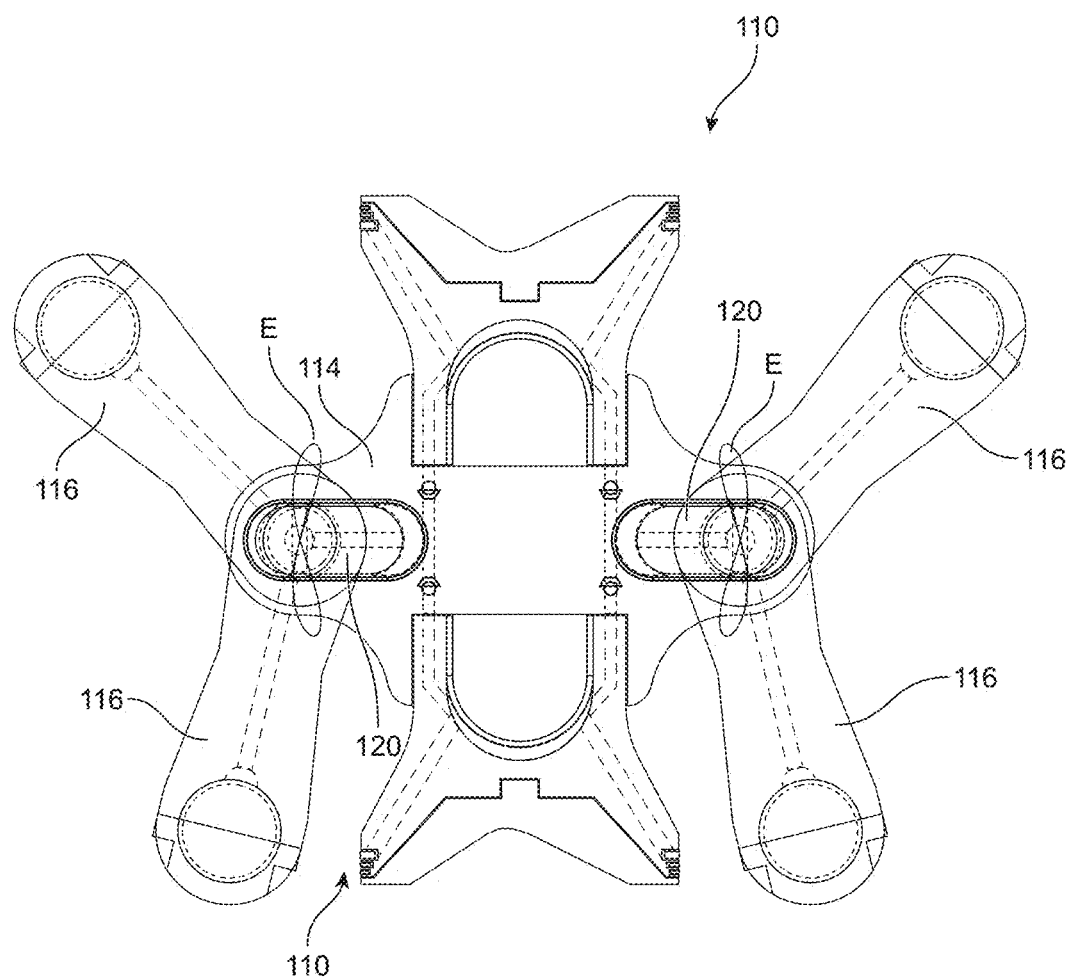
FIG. 42 illustrates the crossheads shown in FIGS. 39 and 40 with pistons and connecting rods attached.

FIG. 42 illustrates the crosshead 114 of FIG. 40 with the pistons 110 and the connecting rods 116 mounted to the crosshead 114. In some configurations, the movement of the connecting rods 116 as the pistons 110 move up and down within the cylinder bores can cause each of the axes of the sliding pins 120 to trace a figure eight-like pattern E. The bent-figure 8 pattern E is traced by the center point of the junction between the crosshead 114 to the two connecting rods 116. This pattern results from about a 10:1 ratio up & down relative to the lateral movement of the center point.

Figure 45:
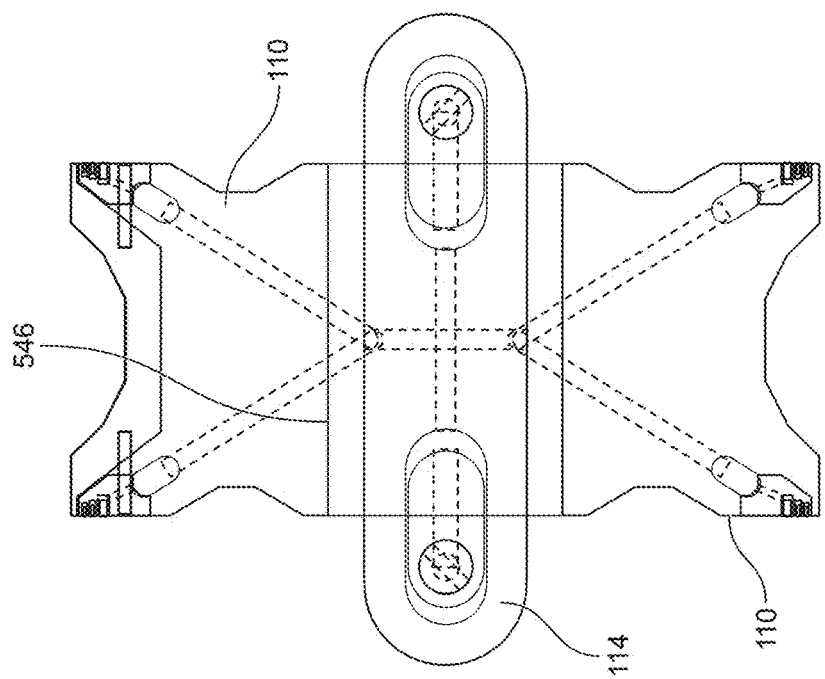
FIGS. 43-45 illustrate further configurations of additional combinations of crossheads and pistons that can be used with internal combustion engines using uniblocks.
Figure 44:
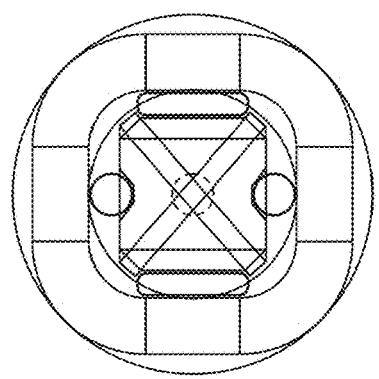
Figure 43:
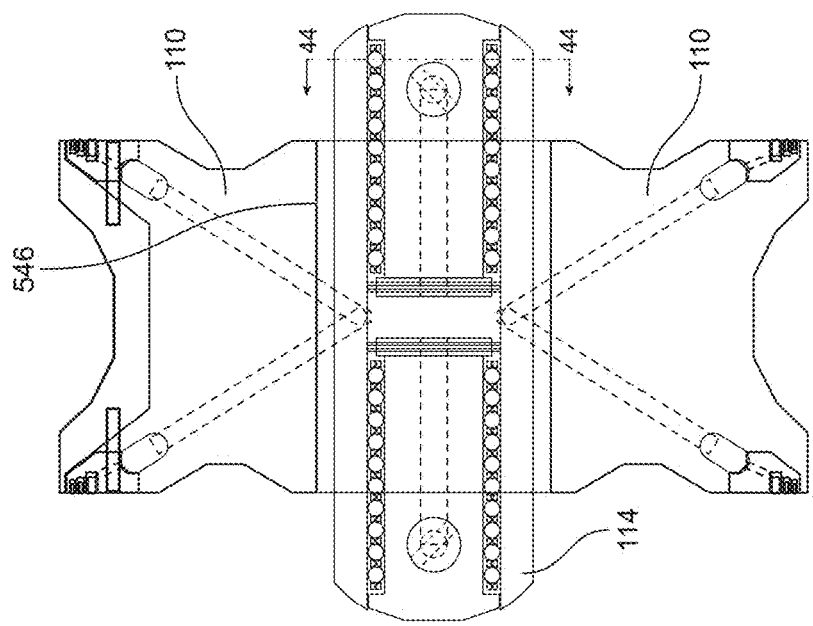

FIGS. 43-45 illustrate configurations of additional combinations of crossheads 114 and pistons 110. In the illustrated configurations, the crossheads 114 extend into a passageway 546 defined within conjoint pistons 110. Otherwise, the construction of FIG. 43 is similar in some respects to the construction of FIG. 38 while the construction of FIG. 45 is similar in some respects to the construction of FIG. 37. As discussed herein, some configurations of the internal combustion engine 100 using the uniblock 102 can include a captive free piston design. In the captive free piston configuration, the pair of pistons 110 can drive four crankshafts 112. In some configurations, linkages between the connecting rods 116 and the crosshead 114 can pass through the connecting rod 116 to connect the connecting rod 116 to the crosshead 114. In some configurations, a link can be a crosshead linkage T. In some configurations, the crosshead linkage T can slide along friction-reducing elements, such as thrust roller bearings, slip bearings, hydrodynamic film bearings, and/or the like. In some configurations, the sliding of the connecting rods 116 with respect to the crosshead 114 can be enabled within a defined range.

Figure 46:
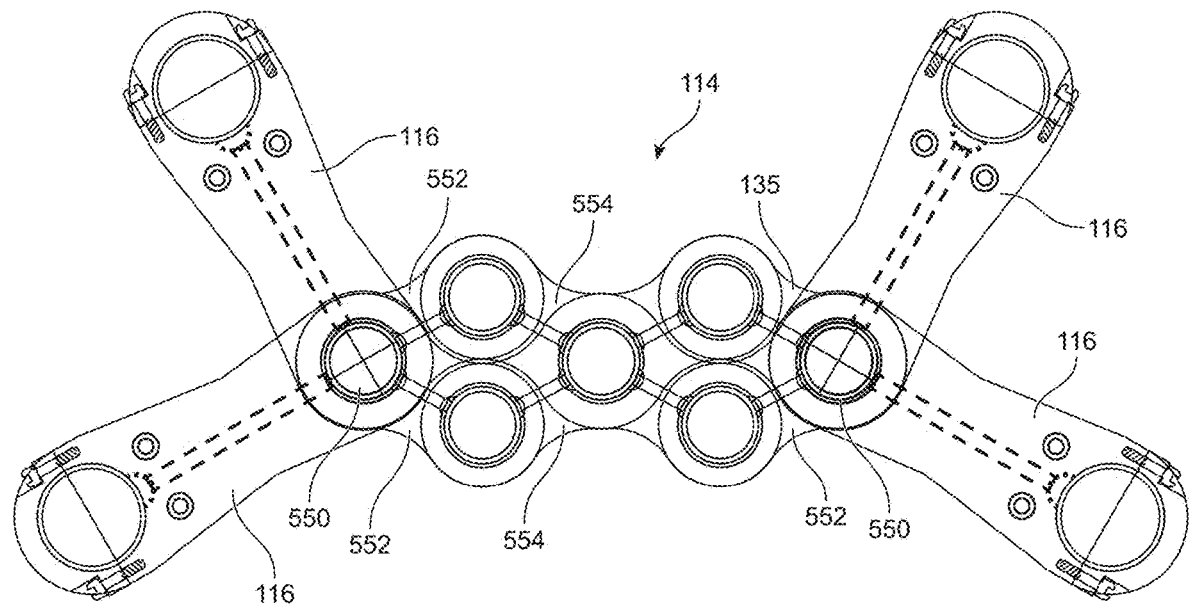
FIGS. 46 and 47 illustrate a crosshead having a cross-linked or an accordion-like structure in an expanded and a contracted state.
Figure 47:
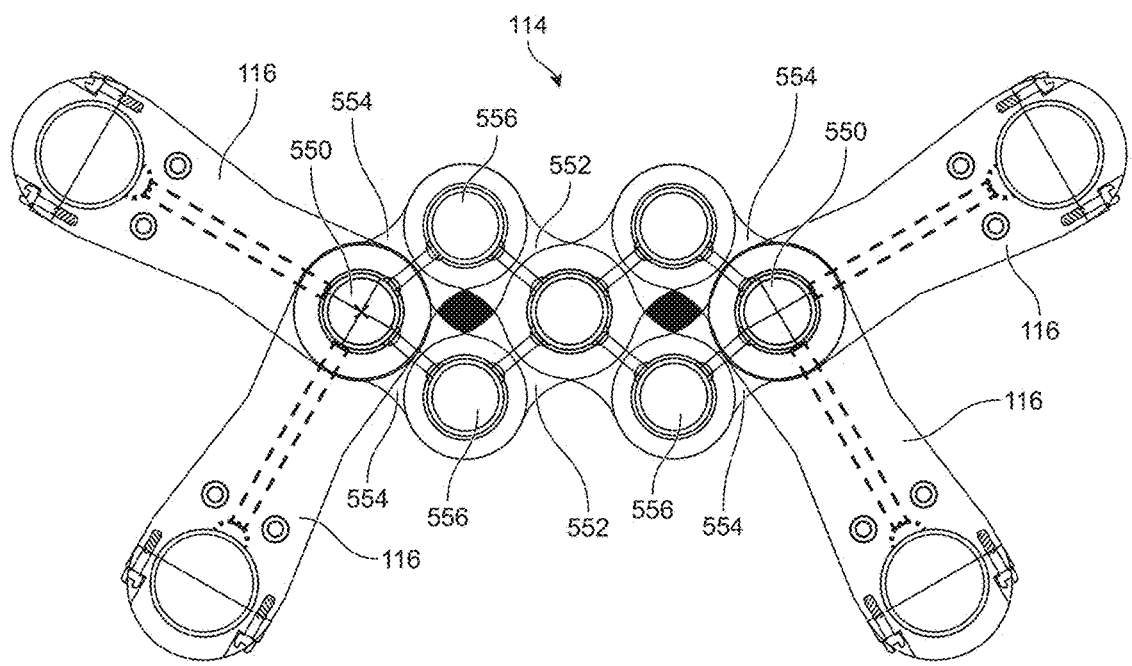

The constructions of the crosshead 114 described in the preceding discussion generally are rigid structures with sliding pins. However, other configurations are possible. FIGS. 46 and 47 illustrate an example of the crosshead 114 having a cross-linked or accordion-like structure. The illustrated crosshead 114 can scissor in and out, which widens and narrows the distance between the connections to the connecting rods 116 on each lateral side of the piston.

In FIG. 46, the crosshead 114 is illustrated in a vertically compressed, horizontally expanded state. In FIG. 47, the crosshead 114 is illustrated in an at least partially horizontally compressed configuration. In the position shown in FIG. 47, the crosshead 114 is not at a maximum width and/or is not at a maximum height.

In the illustrated configuration, the connecting rods 116 are connected to the crosshead 114 at pivot points 550. In some configurations, the pivot points 550 can be defined by the attachment pins 504 or other similar components. In the illustrated configuration, two connecting rods 116 can be connected to the first pivot point 550 and the other two connecting rods 116 can be connected to the second pivot point 550. The two pivot points 550 are on opposing sides of the crosshead 114 relative to the axis of the cylinder bore 106 or piston 110.

The crosshead 114 illustrated in FIGS. 46 and 47 is an assembly of several crosshead subcomponents in a manner that allows their pivoting movement with respect to one another. In some configurations, those assembled crosshead subcomponents can be connected by pins such that the subcomponents can pivot with respect to one another. In the illustrated configuration, the crosshead 114 is defined by a two-pivot subcomponent 552 and a three-pivot subcomponent 554 along with connecting pins 556.

Figure 48:
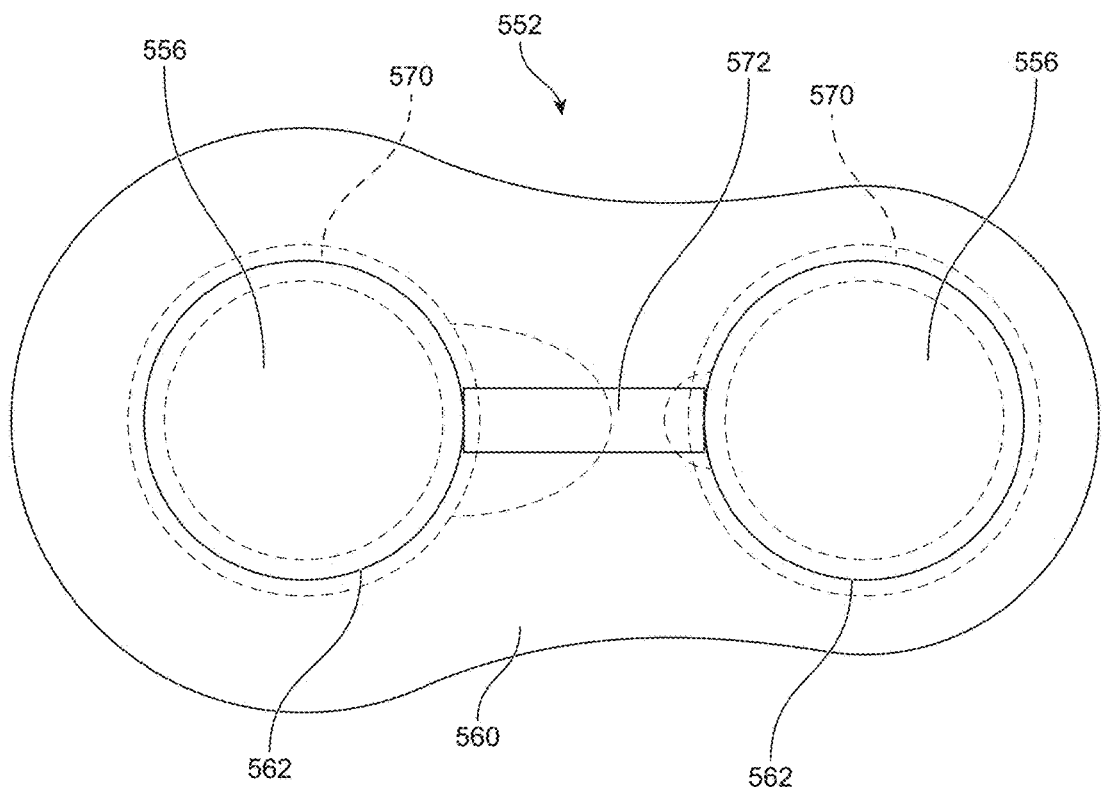
FIG. 48 is a side view of a link that is used in the crosshead of FIGS. 46 and 47.
Figure 49:
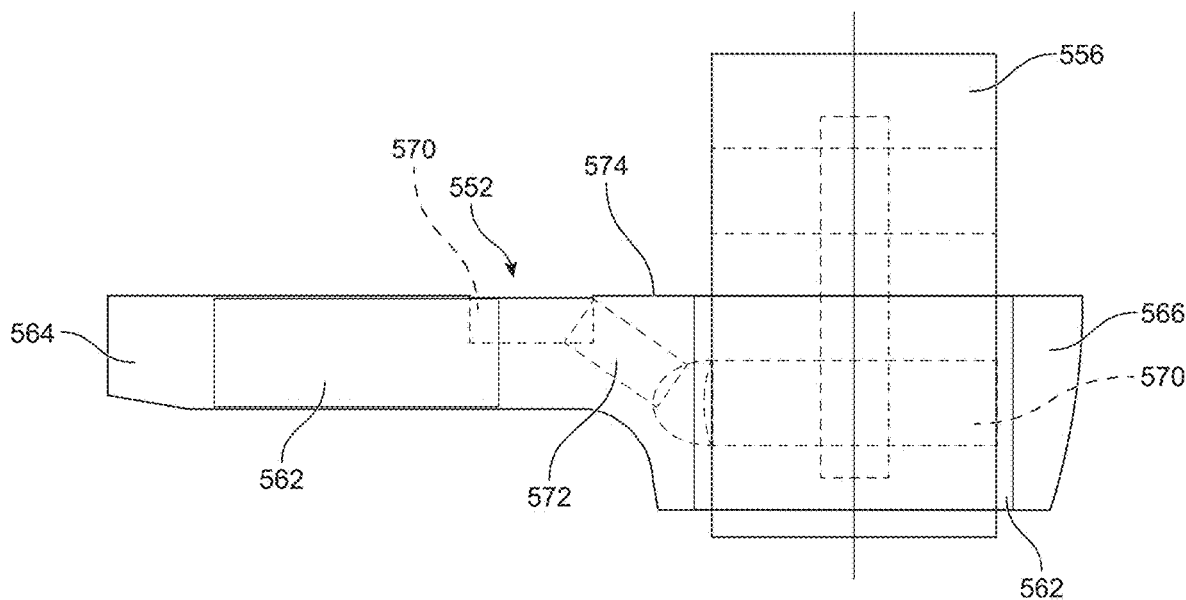
FIG. 49 is a top view of the link of FIG. 48.

FIGS. 48 and 49 illustrate the two-pivot subcomponent 552 according to some configurations. The two-pivot subcomponent 552 comprises a main body 560. The main body 560 defines two openings 562. The two openings 562 can be configured to receive the connecting pin 556. The connecting pin 556 can be used to couple the two-pivot subcomponent 552 to other subcomponents (e.g., to another two-pivot subcomponent 552 or to another three-pivot subcomponent 554).

The main body 560 of the two-pivot subcomponent 552 comprises a stepped construction. The stepped construction results in varying thicknesses. In the illustrated configuration, the main body 560 of the two-pivot subcomponent 552 comprises a thinner portion 564 and a thicker portion 566. The thinner portion 564 is about half of the thickness of the thicker portion 566. In some configurations, stacking two thinner portions 564 provides a thickness that is similar to the thickness of the thicker portion 566.

In addition, the main body 560 comprises curving or tapered sidewalls that help to reduce contact and wear with adjacent subcomponents. The profile of the two-pivot subcomponent 552 can be used to define an overall crosshead thickness and to limit the range of motion of the accordion-like structure of the crosshead.

As illustrated, one of the two openings 562 is defined through the thinner portion 564 of the two-pivot subcomponent 552. The other one of the two openings 562 is defined through the thicker portion 566 of the two-pivot subcomponent 552. Two circumferential lubricant passages 570 outline the two openings 562. The circumferential lubricant passages 570 can transfer oil between the connecting pins 556 and maintain a lubricated interface between the pins 556 and the two-pivot subcomponent 552.

In the illustrated configuration, a connecting passage 572 connects the two circumferential lubricant passages 570. The connecting passage 572 extends from the thicker portion 566 of the two-pivot subcomponent 552 towards a surface 574 of the thinner portion 564 of the two-pivot subcomponent 552. The surface 574 of the thinner portion 564 of the two-pivot subcomponent 552 will interface with the thinner portion of another subcomponent, whether that is a two-pivot subcomponent 552 or a three-pivot subcomponent 554. Accordingly, having the connecting passage 572 reach the surface 574 facilitates lubrication of the interface between the two connected subcomponents.

FIGS. 50 and 51 illustrate the three-pivot subcomponent 554. The three-pivot subcomponent 554 is similar to the two-pivot subcomponent 552 but includes three openings 562. The three openings 562 of the three-pivot subcomponent 554 review the pin 556 or another fastener. As with the two-pivot subcomponent 552, the three-pivot subcomponent 554 can include oil passages 572. The oil passages 572 can extend between the circumferential lubricant passage 570 that encircles the openings 562 and can enable the flow of oil through the crosshead 114 when in an assembled state. The oil passages 572 can be used to provide oil to lubricate the walls of the openings 562 and/or the pin 556 or other retaining mechanism disposed in the openings 562.

The three-pivot subcomponent 554 also comprises a thinner portion 564 and a thicker portion 566. The thinner portion 564 is disposed between two thicker portions 566 in the three-pivot subcomponent. As with the two-pivot subcomponent 552, the thinner portion 564 is about half of the thickness of the thicker portion 566.

Figure 52:
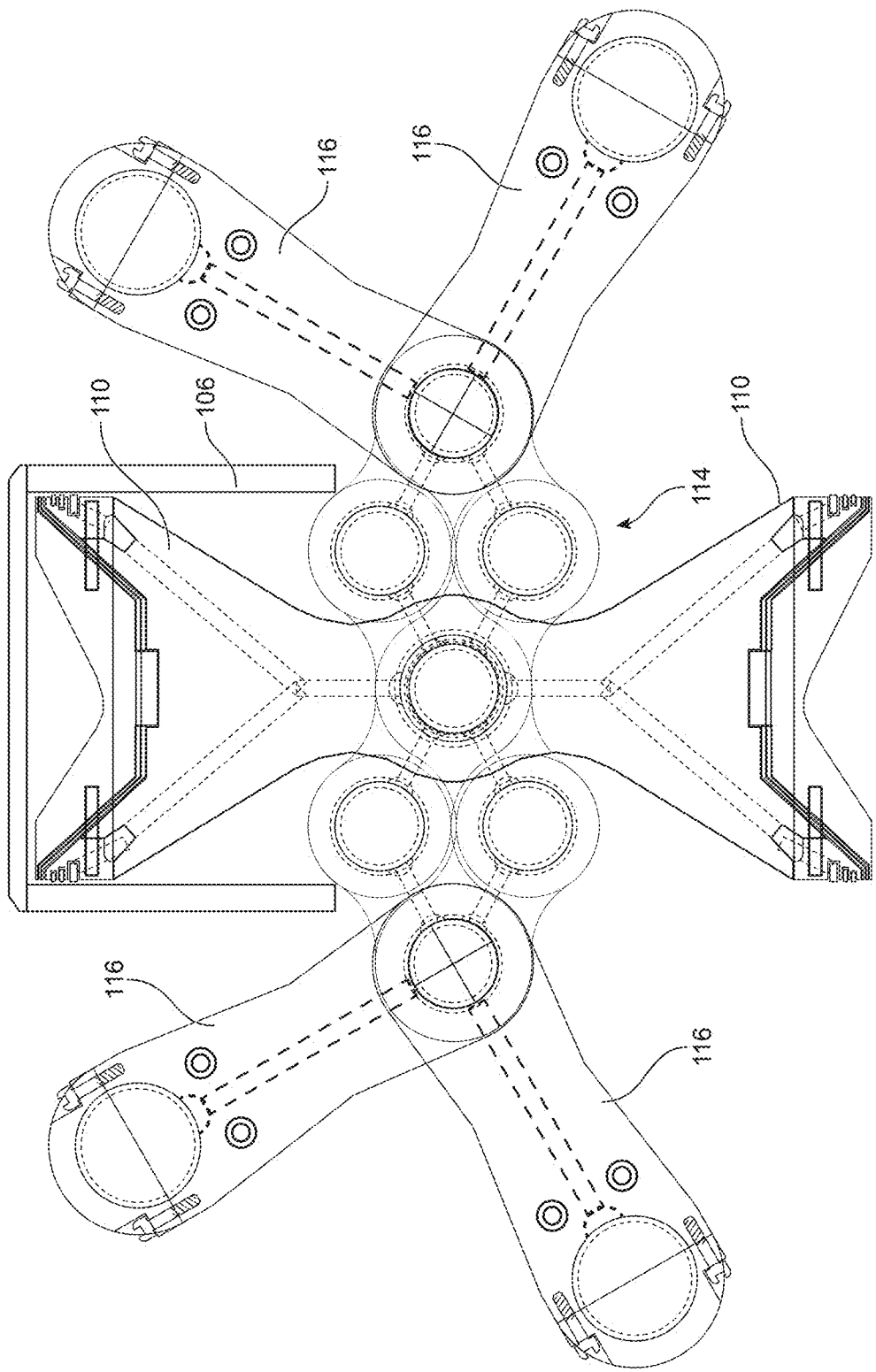
FIG. 52 illustrates the crosshead of FIGS. 46 and 47 with pistons and connecting rods attached.

The two-pivot subcomponent 552 and the three-pivot subcomponent 554 comprise radiused transitions and tapered sidewalls. As illustrated in FIG. 52, in some configurations, at least part of the crosshead 114 can enter into the cylinder bore 106. In other words, the bottom end of the cylinder bore 106 can define a plane and at least a portion of the crosshead 114 can be on a first side of that plane while a second portion of the crosshead 114 can be on a second side of that plane during at least some portion of the movement of the crosshead 114. Such a configuration provides a compact construction to the internal combustion engine 100 that uses the uniblock 102. The outer edges of the subcomponents 552, 554 can be rounded, tapered, or otherwise shaped such that the crosshead 114 will be less likely to collide or otherwise interfere with the cylinder wall that defines the cylinder bore. In some configurations, the crosshead 114 can comprise differing numbers of the subcomponents than illustrated.

Figure 56:
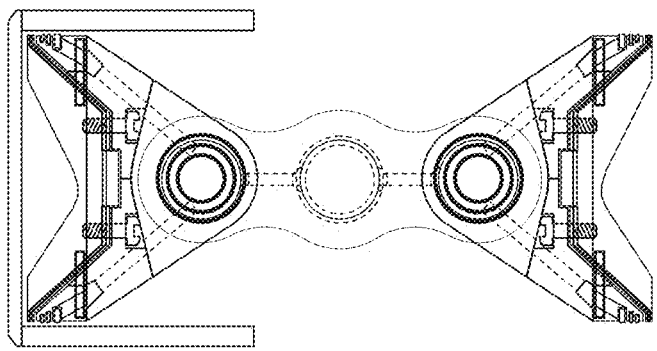
FIGS. 53-56 illustrate additional views of cross-linked floating crossheads.
Figure 55:
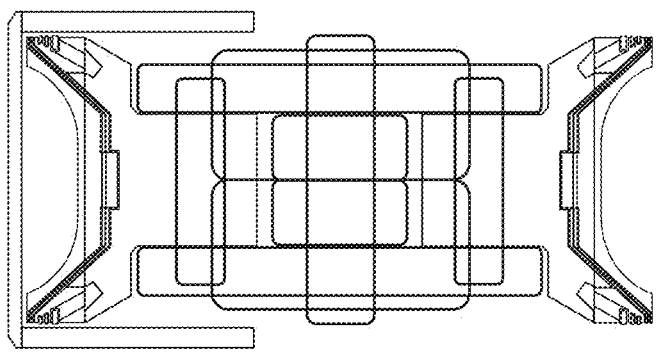
Figure 54:
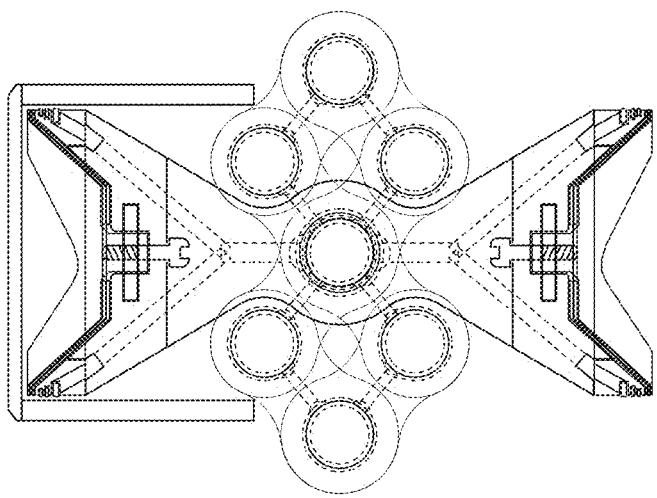
Figure 53:
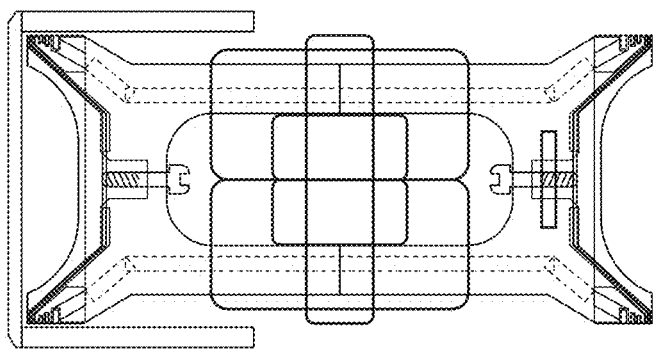

FIGS. 53-56 illustrate additional views of the cross-linked floating crosshead configuration of the crosshead 114. FIG. 53 illustrates a view of the X-linked/accordion, captured free piston with non-articulated pistons and floating crosshead. FIG. 54 illustrates a view of the X-linked/accordion, captured free piston with non-articulated pistons and floating crosshead. FIG. 55 illustrates a view of the X-linked/accordion, captured free piston with articulated pistons and floating crosshead. FIG. 56 illustrates a view of the X-linked/accordion, captured free piston with articulated pistons and floating crosshead.

As discussed herein, the path of a junction between the connecting rods 116 and the ends of the crosshead 114 as a captive free piston engine operates can define a path that approximates a skinny figure eight up and down (i.e., in the direction of piston travel). This path features about a 10:1 ratio up & down relative to the lateral movement of the junction. The height of the figure eight can be about the same as the length of the stroke of the piston 110 and the width of the figure eight can be about $\frac{1}{10}$ of the length of the stroke of the piston 110. The width of the figure eight (i.e., the lateral travel) can be balanced by lateral travel of corresponding connecting rods 116 on an opposite side of the crosshead 114. The lateral travel of the junction can provide sufficiently restricted motion and surface area to transfer forces from the piston 110 to the crankshafts 112 while having relatively low levels of lateral movement friction. In some configurations, there can be balanced lateral sliding of the junction (i.e., the crosshead 114 to the pivot point of the connecting rod 116). In some configurations, a set of lever arms (e.g., six lever arms) can function as an "accordion" crosshead (also referred to as a crosslinked floating crosshead). The crosslinked floating crosshead can transfer forces without sliding to connecting rod pivot points through rotational movement of each lever arm with respect to the other lever arms without sliding motion. The use of rotational rather than sliding forces in addition to the use of bearings can reduce friction and unwanted vibration and can increase efficiency and durability.

Pistons and Piston Assemblies

As discussed above, certain features, aspects, and advantages of the present disclosure relate to the construction of the pistons 110. The pistons 110 can have certain advantages, including improved thermal properties, decreased friction, and decreased mass, for example but without limitation. The choice of the type of piston and the advantages afforded by that choice can depend upon the specific engine design and implementation. Each of the pistons described herein can be used with the internal combustion engine 100 that uses the uniblock 102. Nevertheless, the pistons 110, while described in the context of the internal combustion engine 100 that uses the uniblock 102, can be used in other engine constructions.

The pistons 110 can be used in the captive free piston engine constructions described in the present disclosure. The captive free piston engine construction can involve a pair of pistons that can translate linearly without significant side loading and/or with forces going from piston to piston in each pair without the forces going directly into connecting rods and/or crankshafts, which can reduce piston and/or piston ring to cylinder wall friction and/or friction in other components, such as pistons, crossheads, connecting rods, and/or crankshafts. In some configurations, the captive free piston engine construction can result in forces not contributing to work output, such as that for compression, exhaust, and/or scavenging, being transmitted from one piston to the opposed piston. Accordingly, there can be reduced crankshaft forces producing reduced crankshaft friction and reducing crankshaft, connecting rod, and corresponding connecting pin wear, and/or greater engine efficiency and durability. The reduction of forces that need to go through the crankshafts allows for the crankshafts to be made from lighter and less-expensive materials.

Conventional piston designs often include a piston skirt that extends downward from the top of the piston. The piston skirt can be in contact with or near the walls of a cylinder bore when installed in an engine. The piston skirt can help to prevent or limit motion of the piston in directions other than along the axis of the cylinder. For example, the piston skirt can limit lateral movement of the piston and rotating of the piston. Piston skirts can have several drawbacks. For example, contact between the piston skirt and the cylinder wall can increase friction, thereby reducing efficiency. As another example, the piston skirt can add weight to the piston, which can also decrease efficiency. According to at least some of the configurations described herein, the piston may not include a piston skirt, or may include a short piston skirt. Such configurations can be possible because of engine designs that ensure little or no side to side or rocking movements of the piston.

Figure 57:
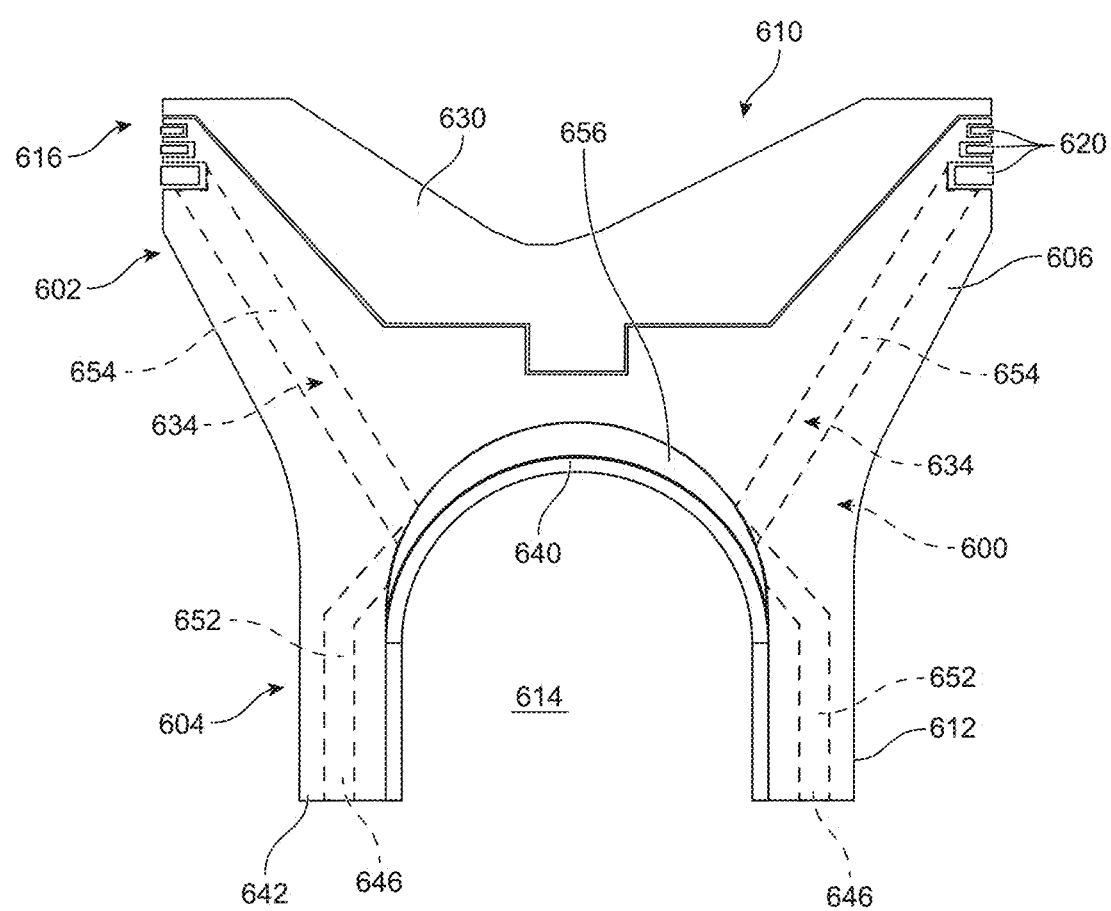
FIG. 57 illustrates a cross-section view of an example piston and piston top plate.

FIG. 57 illustrates a cross-section view of an example piston 110 according to some configurations. The various parts of the piston 110 can be 3D printed, cast, forged, and/or machined. In some configurations, different parts of the piston 110 can be formed of different materials to achieve certain thermal and/or mechanical advantages.

As shown in FIG. 57, the piston 110 can include a piston body 600. The piston body 600 can comprise an upper portion 602 and a lower portion 604. In the illustrated configuration, the upper portion 602 comprises an outer wall 606 that encircles an upper recess 610. In some configurations, the outer wall 606 of the upper portion 602 comprises a frustoconical region. In some configurations, the outer wall 606 of the upper portion 602 comprises a cylindrical region. The lower portion 604 can comprise an outer wall 612 that encircles a lower recess 614. The outer wall 612 of the lower portion 604 can be generally cylindrical in certain configurations.

At a top end 616 of the of the outer wall 606 of the upper portion 602 of the piston 110 is a cylindrical region. The cylindrical region can comprise one or more grooves formed in the cylindrical outer wall. One or more piston rings 620 can be positioned within the one or more grooves. The piston rings 620 can be configured to slide along the wall of the cylinder bore 106. The piston rings 620 can provide sealing of the combustion chamber 104. While three piston rings 620 are shown in FIG. 57, the number of piston rings 620 can be determined based upon the application and construction of the internal combustion engine 100. For example, there can be as few as one or more than five piston rings 620.

A piston top plate 630 is positioned on an upwardly facing surface of the piston body 600. The piston top plate 630 can be affixed to the piston body 600 in any suitable manner. The piston top plate 630 can be optional. The piston top plate 630 replaces the conventional piston crown with a component that reduces heat conduction from the combustion gases into the piston body 600. In some piston top plates 630, a particular material layer may be totally encased in or covered by another material to enable a less machinable and more brittle material, such as a ceramic, to comprise a thicker layer that can better reduce heat transfer. The more brittle material can be protected by and can be encased in or covered with a more machinable and more ductile material, such as a metal alloy, for example but without limitation. Because some ceramic materials, such as those ceramics used in the insulating portions of spark plugs and other components, may have very high melting points once formed, they may be formed and then cast inside another material such as a low thermally conducting but machinable metal alloy in such a way as to allow the ceramic materials being completely encased and protected. In this manner, the piston top plate 630 can be formed of materials that reduce heat conduction from the combustion chamber 104 to the piston body 600.

Figure 58:
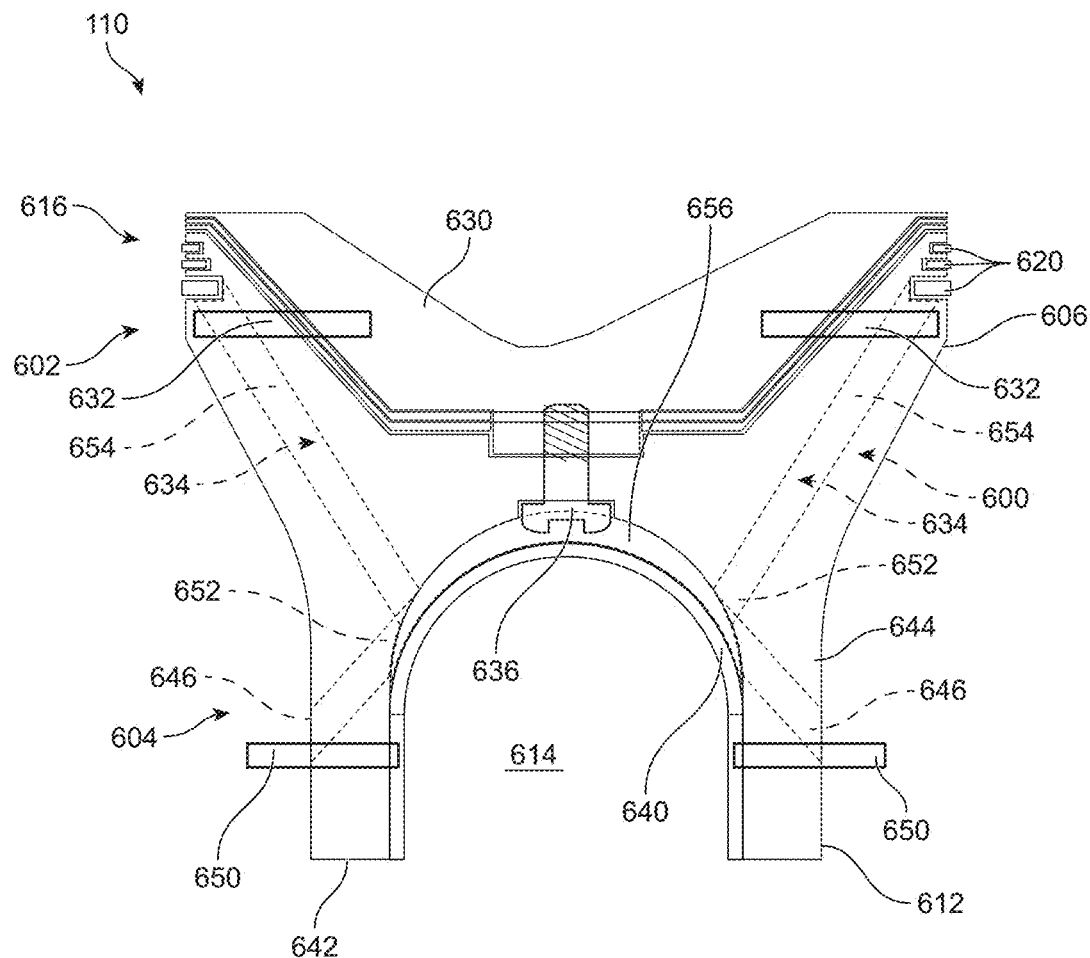
FIG. 58 illustrates a cross-section view of another example piston and piston top plate mechanically coupled to each other.

In some configurations, the piston top plate 630 can be affixed to the piston body 600 using one or more fasteners, such as bolts, pins, dowels or the like. For example, the piston 110 illustrated FIG. 58 illustrates one or more techniques by which the piston top plate 630 can be mechanically coupled to the piston body 600. For example, in FIG. 58, the piston top plate 630 can be connected to the piston body 600 by pins or dowels 632. The pins or dowels 632 can be positioned such that the pins or dowels 632 do not pass through any piston oil passages 634. Any suitable number of pins or dowels 632, including as few as one dowel or more than four dowels 362, can be used. The pins or dowels 632 can act as anti-rotation keys.

In the configuration illustrated in FIG. 58, the piston top plate 630 can be secured to the piston body 600 using a mechanical fastener 636 (e.g., a bolt). While the illustrated configuration features both pins or dowels 632 and the mechanical fastener 636, either can be used to the exclusion of the other. When in an assembled state, the head of the mechanical fastener 636 can be inside the lower recess 614 defined by the piston body 600 and a piston backside cap 640. For example, the mechanical fastener 636 can be inserted and then the piston backside cap 640 can be secured in position over the mechanical fastener 636.

In some configurations, the piston top plate 630 can be affixed to the piston body 600 without the use of fasteners. For example, in some configurations, the piston top plate 630 can be secured to the piston body 600 using an interference fit or any number of complementary engaging structures. In some configurations, the piston top plate 630 can be secured to the piston body 600 using an interference fit, which is shown in FIG. 57. Such configurations are possible because there are almost no shear forces on the interference fit joint. Because the combustion chamber 104 is at least partially defined by the piston top plate 630, the increased temperatures present within the combustion chamber 104 also may apply thermal expansion forces that increase the strength of the interference fit. With the piston top plate 630 generally subject to only downward forces (e.g., forces pushing the piston top plate 630 toward the piston body 600) during operation of the internal combustion engine 100, fastener-free approaches also can be used.

In some configurations, the piston top plate 630 can be cast into the piston body 600. For example, the piston body 600 can be machined and the material for the piston top plate 630 can be cast into the piston body 600. Casting may provide certain advantages related to heat conduction, for example but without limitation. As discussed herein, in some configurations, the piston top plate 630 can be formed of multiple materials. For example, the piston top plate 630 can include a first layer (e.g., a technical ceramic), a second layer (e.g., a stainless steel), a third layer (e.g., aluminum), and so forth. One or more of the layers of the piston top plate 630 can be cast into the piston body 600.

It can be important to maintain a lubricating oil film along the sidewall of the cylinder. In some configurations, the piston 110 can comprise an oil labyrinth to supply oil to the piston rings 620. As illustrated in FIG. 57, the piston body 600 contains piston oil passages 634. The piston oil passages 634 can transfer oil to the piston rings 620. There can be any number of piston oil passages 634, and the piston oil passages 634 can be fashioned in any desired diameter or shape. In some configurations, the piston oil passages 634 can be arranged in a periodic pattern around the circumference of the piston 110.

With reference to FIG. 57, the illustrated piston oil passages 634 can extend from a bottom surface 642 of the piston body 600 upward toward the piston rings 620. The piston oil passages 634 can be drilled, bored, or otherwise formed in the piston body 600. With reference to FIG. 58, the piston 110 is illustrated with a different set of oil passages 634. The piston oil passages 634 in FIG. 58 are open at a side surface 644 of the piston body 600 rather than at a bottom surface 642 of the piston body 600. The location of the inlets 646 of the piston oil passages 634 (i.e., whether bottom or side) depends upon the location of the source of oil for the piston 110. The inlets 646 to the piston oil passages 634 can be in fluid communication with the oil passages of the crosshead 114. Accordingly, in the illustrated configuration, there will be a correlation between the outlets from the oil passages of the crosshead 114 and the inlets 646 into the piston oil passages 634. The crosshead 114 and the piston body 600 can be secured together in any suitable manner. For example, FIG. 58 illustrates the presence of pins 650 that can be used to secure the two components together.

In the illustrated configuration, the piston oil passages 634 comprise two portions: a lower portion 652 and an upper portion 654. In the illustrated configuration, the upper portion 654 and the lower portion 652 of the oil passages 634 meet at a cavity 656 defined by the piston body 600 and a piston backside cap 640. The gap between the piston body 600 and the piston backside cap 640 can create the cavity 656. The cavity 656 can receive oil for distribution to the piston rings 620. The piston backside cap 640 can be fitted to the piston body 600 in any suitable manner. In some configurations, the piston backside cap 640 can be secured to the piston body 600 using an interference fit. In some configurations, the cavity 656 may be formed by boring, drilling, or otherwise removing material from the piston body 600 to form a cavity. In some configurations, the piston backside cap 640 and/or the cavity 656 may not be used.

In some configurations, oil can be supplied to the crankshaft top caps 212. A passage can extend from the crankshaft top caps 212 to supply the main journals 250 of the crankshaft 112. The main journals 250 can feed the crank main bearings. The crankshaft 112 can include passages that transfer oil from the main bearings to the crankshaft 112 to the end bearings of the connecting rods 116. The connecting rods 116 can feed oil to a bearing on the crosshead 114. The bearings of the crosshead 114 can feed crosshead passages, that either feed a crosshead to piston bearing or, in some constructions, where the crosshead and piston are one part and not articulated, can feed the piston lubricating oil labyrinth.

Figure 59:
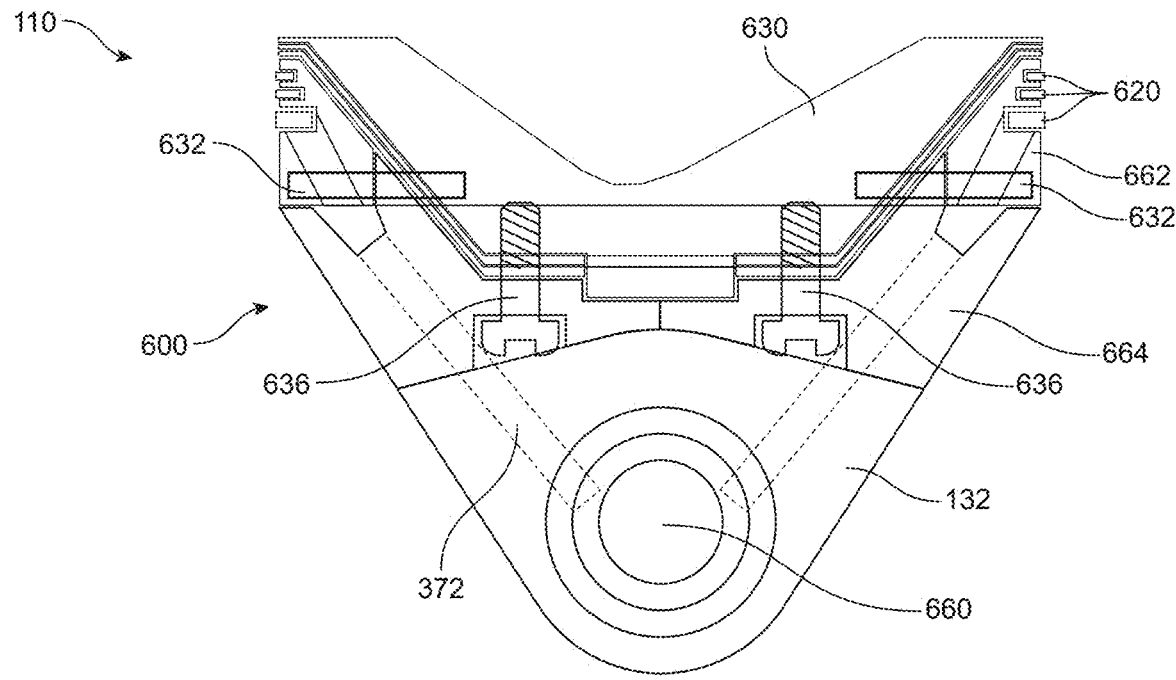
FIGS. 59 and 60 illustrate two views of an articulatable piston with an attached piston top plate.
Figure 60:
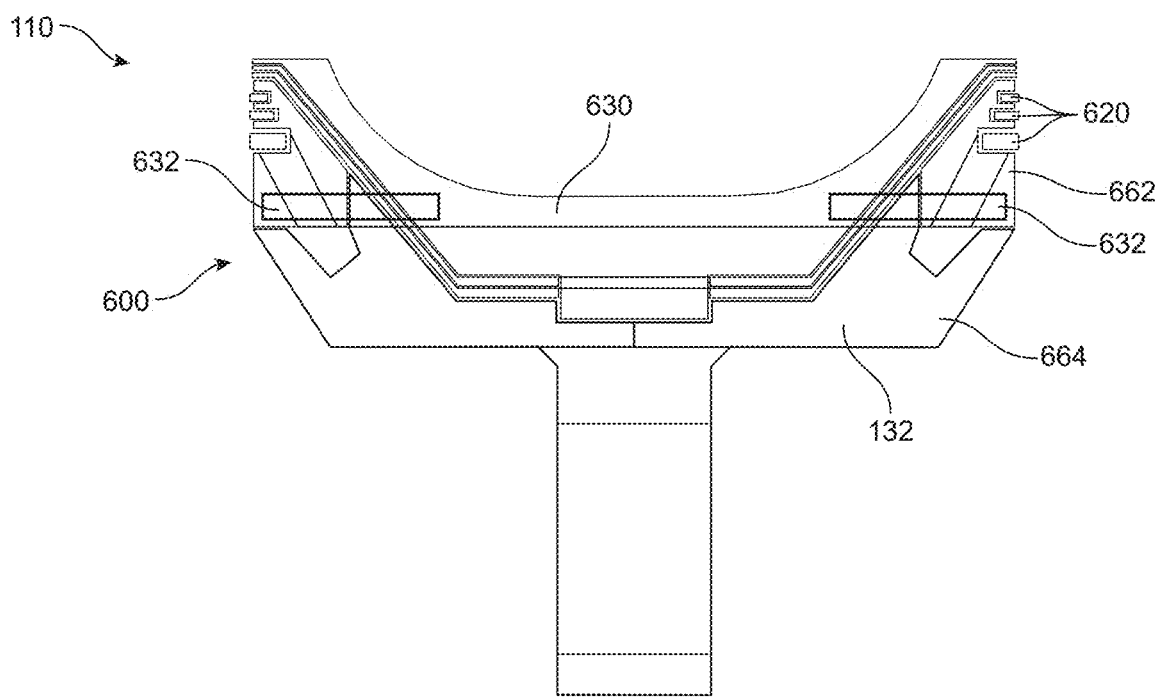

As described elsewhere, the piston 110 can be configured to articulate relative to the crosshead 114. FIGS. 59 and 60 illustrate an example of the piston 110 that has been configured to enable articulation. The piston 110 illustrated in FIGS. 59 and 60 comprises a two-piece piston body 600. FIG. 59 shows a side sectioned view of the piston 110 illustrated in FIG. 60. The piston 110 illustrated in FIGS. 59 and 60 can include features of the pistons of FIGS. 57 and 58, such as the oil passages, the bolts, or the dowels to secure the piston top plate 630 to the piston body 600, for example but without limitation.

The piston 110 illustrated in FIGS. 59 and 60 can be used with the articulated crosshead configurations illustrated herein. With reference to FIG. 60, the piston 110 can comprise a piston articulation point 660. The piston articulation point 660 can be configured to receive a dowel, pin, bolt, or other component suitable for securing the piston 110 to the crosshead 114.

With reference to FIGS. 59 and 60, the illustrated piston 110 comprises a multi-part construction. For example, the piston 110 can comprise the piston top plate 630 and the piston body 600 with the piston body 600 comprising the upper portion 662 and the lower portion 664. The upper portion 662 carries the piston rings 620. The upper portion 662 is positioned between the piston top plate 630 and the lower portion 664 of the piston body 600. The upper portion 662 and the lower portion 664 can be connected in any suitable manner. In some configurations, the pins or dowels 632 can be used to secure the upper portion 662, the lower portion 664, and the top plate 630 together. In some configurations, the top plate 630 and the lower portion 664 of the piston body 600 can be connected together by the mechanical fasteners 636 with the upper portion 662 of the piston body 600 sandwiched between the top plate 630 and the lower portion 664 of the piston body 600.

In some configurations, the piston top plate 630 can be formed from materials that have relatively low thermal conductivity, including but not limited to stainless steel, Invar, Inconel, ceramics, and/or composites. The upper portion 662 of the piston body 600 can be the same material or a different material. For example, the upper portion 662 of the piston body 600 can comprise cast iron or other materials. Materials for the upper portion 662 of the piston body 600 can be selected based on a variety of factors, such as cost and/or stability. The lower portion 664 of the piston body 600 can comprise a lighter material, such as aluminum. In some configurations, the components can be threaded together. In some configurations, the components can be stacked together. For example, because the piston 110 can operate substantially under compression, stacking can be a viable means for assembling the components together. In some configurations, the multi-part construction of the piston 110 can have lower thermal conduction (e.g., due to the use of materials in at least one layer that have relatively low thermal conductivity). For example, a material for the portion of the piston 110 that holds the piston rings 620, which can be in contact with or adjacent to the cylinder wall, can be selected to reduce or minimize thermal expansion. A material for a piston top plate 630 can be selected to minimize or reduce thermal conduction. In some configurations, the material for the piston top plate 630 in one or more of the piston top plate layers can include ceramics. In some cases, the ceramics can either be formed in solid shapes for the majority of the piston top plate shape or with holes that allow another material such as a metal alloy to encase and form around the porous ceramic to add protection to the ceramic.

According to some configurations, movements can be substantially or entirely linear through the cylinder bore 106. According to some configurations, forces can be substantially or entirely compressive. Linear movement and compressive forces can result in reduced vibration because there can be relatively small (or no) side-to-side forces. In some configurations, the piston top plate 630, a layer just below the piston top plate 630, or both may be secured to the piston body 600 using several chemical and/or mechanical methods including, for example and without limitation, any combination of interference fit, slip fit with chemical bonding, bolts, nuts, and/or dowels (e.g., with or without adding anti-rotation keys, although dowels will generally act as anti-rotation keys).

As shown in FIGS. 59 and 60, the exposed surface of the top plate 630 can be asymmetric. Such an asymmetrical configuration for the top plate 630 can be implemented in any of the other piston configurations described and/or shown in the present disclosure. The top plate 630 can be used to accommodate a baffle that may be included in the combustion chamber, for example on an upper surface of the combustion chamber, as described in more detail below.

In some configurations, the internal combustion engine 100 can have a relatively large stroke volume per cylinder volume due to the lack of piston rocking, which allows for short piston skirts, and due to the lack of cylinder side wall intake or exhaust ports. Because of this relatively high stroke volume to cylinder volume ratio, and due to other geometric advantages from having the two crankshafts 112 up alongside the cylinder bores 106 with shorter throws on the crankshafts 112 (e.g., as opposed to one crankshaft with crank throws that are 50% of the stroke length below the cylinder), the combustion volume can be relatively large compared to the engine block size when compared to conventional engine designs. For example, in a four-stroke configuration of the internal combustion engines 100 using the uniblock 102, the combustion volume can be the same as or about the same as the full stroke volume. In a two-stroke design, the combustion volume can be less than the stroke volume, for example due to scavenging. In some configurations, the two-stroke design can be configured to use poppet valve to poppet valve flow. In some configurations, though not necessarily, the piston stroke can be smaller than the piston bore. In typical conventional engines, scavenging can take up from about 12% to about 50% of the stroke volume, and typically from both expansion and compression. For example, in a typical conventional port to port or port to valve two-stroke engine, at least the port is partially open throughout at least part of the compression and expansion. According to some configurations herein, scavenging can occur entirely or almost entirely from one of compression or expansion. In some configurations, scavenging can occur during both expansion and compression. In some configurations, scavenging can occur entirely or almost entirely at or near maximum compression and/or maximum expansion, for example by controlling the timing and/or duration of the opening of intake valves and/or exhaust valves. This can have several advantages. For example, an engine can have continuously variable compression ratios (e.g., to optimize for higher power or higher efficiency). In some configurations, a compression ratio can be varied during operation. For example, when in an urban environment, the engine's performance characteristics can be modified to optimize for reducing emission rates, for example reduced particulates, soot, nitrous oxides, and/or other emissions.

The Baffle

Both incomplete scavenging and over scavenging can have negative effects on engine performance, can contribute to reduced efficiency, can cause increased waste heat production, and can result in increased particulate emission and the buildup of combustion byproducts, for example. If scavenging is incomplete, exhaust gases that remain behind can interfere with subsequent combustion cycles, which can lead to reduced power output, and reduced efficiency. Further, over scavenging can lead to inefficiency and increased particulate emissions.

The use of a baffle 670 can lead to certain advantages. For example, as scavenge air enters the combustion chamber 104 from the intake passage 172, the baffle 670 can force the scavenge air to make a more downward trajectory into the combustion chamber 104 because otherwise direct crossflow to the exhaust passage 134 can be redirected by the baffle 670. The baffle 670 can, additionally or alternatively, create a different flow while the piston 110 is compressing the air/fuel mixture within the combustion chamber 104. The baffle 670 can significantly improve scavenging.

Figure 61:
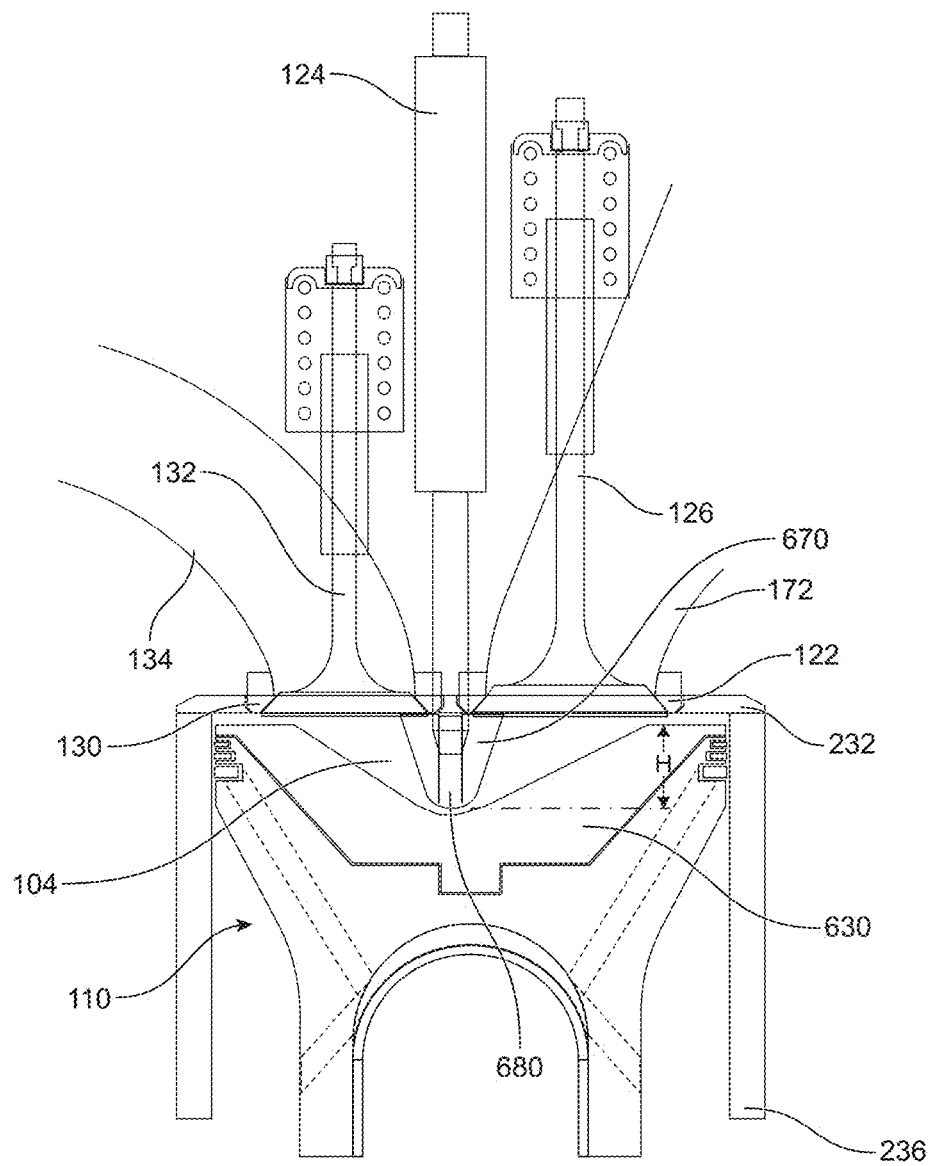
FIG. 61 schematically illustrates a side view of a portion of an internal combustion engine with a baffle extending into the combustion chamber.

In some configurations, the baffle 670 is the tongue-like structure illustrated in FIG. 61. The baffle 670 can extend downward from the top of the combustion chamber 104. The baffle 670 can extend downward into the combustion chamber 104. The baffle 670 can be especially beneficial when the internal combustion engine 100 with the uniblock 102 is being run as a two-stroke diesel, although the baffle 670 can be used in other modes of operations and/or with different fuels. In some configurations, the baffle 670 can be used during four-stroke operation or two-stroke operation, although typically the baffle 670 would either not be used, or, if used, the baffle 670 may have a shorter height when used for four-stroke operations than when used in two-stroke operations.

In some configurations, the baffle 670 can be retrofit into position. In some configurations, the baffle 670 can be integrally formed with the uniblock 102 or the cylinder top plate 232. If the baffle 670 is a separate component that is distinct from the cylinder top plate 232, the baffle 670 may be fixed or secured using one or more chemical and/or mechanical fasteners to either the cylinder top plate 232 or the upper wall of the combustion chamber 104 that is formed within the uniblock 102.

Figure 62:
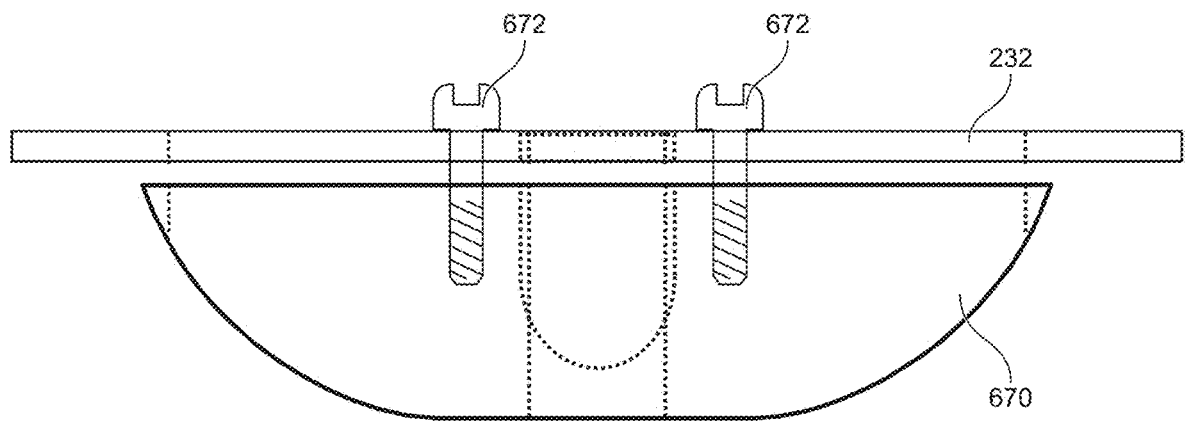
FIGS. 62 and 63 illustrate a piston top plate and a baffle with FIG. 62 showing a separable baffle and FIG. 63 showing a baffle integrated with the top plate.
Figure 63:
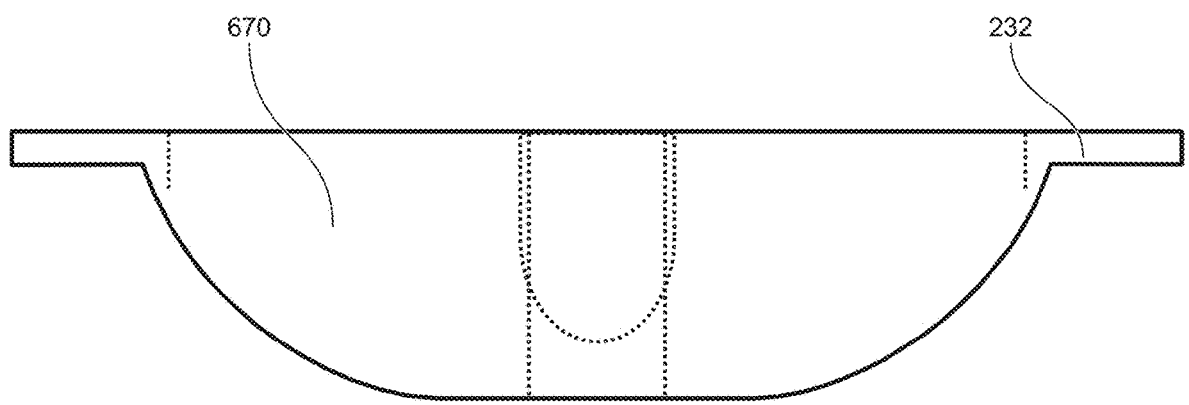

FIG. 62 illustrates a configuration in which the baffle 670 is secured to a cylinder top plate 232. In the illustrated configuration, bolts 672 or other mechanical fasteners, for example but without limitation, can be used to secure the baffle 670 to the cylinder top plate 232. In some configurations, the baffle 670 can be part of one or more layers of the cylinder top plate 232 (e.g., the baffle 670 can be defined of multiple layered materials, as discussed above with regard to other components). In some configurations, the baffle 670 can be formed from, or can comprise a layer of, Inconel or similar materials that have a very low thermal conductivity. As shown in FIG. 63, in some configurations, the baffle 670 can be integrally formed with the cylinder top plate 232 (or can be formed as part of the uniblock 102 in engine configurations that do not use the cylinder top plate 232).

With reference again to FIG. 61, in some configurations, the baffle 670 can have a height (e.g., the distance from a root to a crown of the baffle 670) that is the same as or greater than at least the lift height of the intake valve(s) 126 and/or exhaust valve(s) 132 in a two-stroke engine. In some configurations, the baffle 670 can have a height that is the same or less than the lift height of the intake valve(s) 126 and/or the exhaust valve(s) 132 in a four-stroke engine.

The taller baffle 670 can be beneficial for scavenging but can contact the piston top plate 630 of the piston 110. Thus, the piston 110 may not move as far upward toward the top of the combustion chamber 104 when reaching top dead center to avoid a collision between the piston top plate 630 and the baffle 670. In some configurations, the piston top plate 630 can be shaped to accommodate the baffle 670.

The piston top plate 630 can be shaped so that it does not collide with the baffle 670 when the piston is at top dead center. As shown in FIG. 61, the intake valve opening 122 and the exhaust valve opening 130 can be of different sizes. For example, the intake valve opening 122 can be larger than the exhaust valve opening 130. In some configurations, the intake valve opening 122 and the exhaust valve opening 130 can be the same size. In addition, due to the differing sizes of the intake valves 126 and the exhaust valves 132 in the illustrated configuration, the baffle 670 can be offset from the axial center of the cylinder bore 106 in one direction. In some configurations, the baffle 670 is aligned in one direction with the axial center of the cylinder bore 106 while being offset in another direction from the axial center of the cylinder bore 106.

Figure 64:
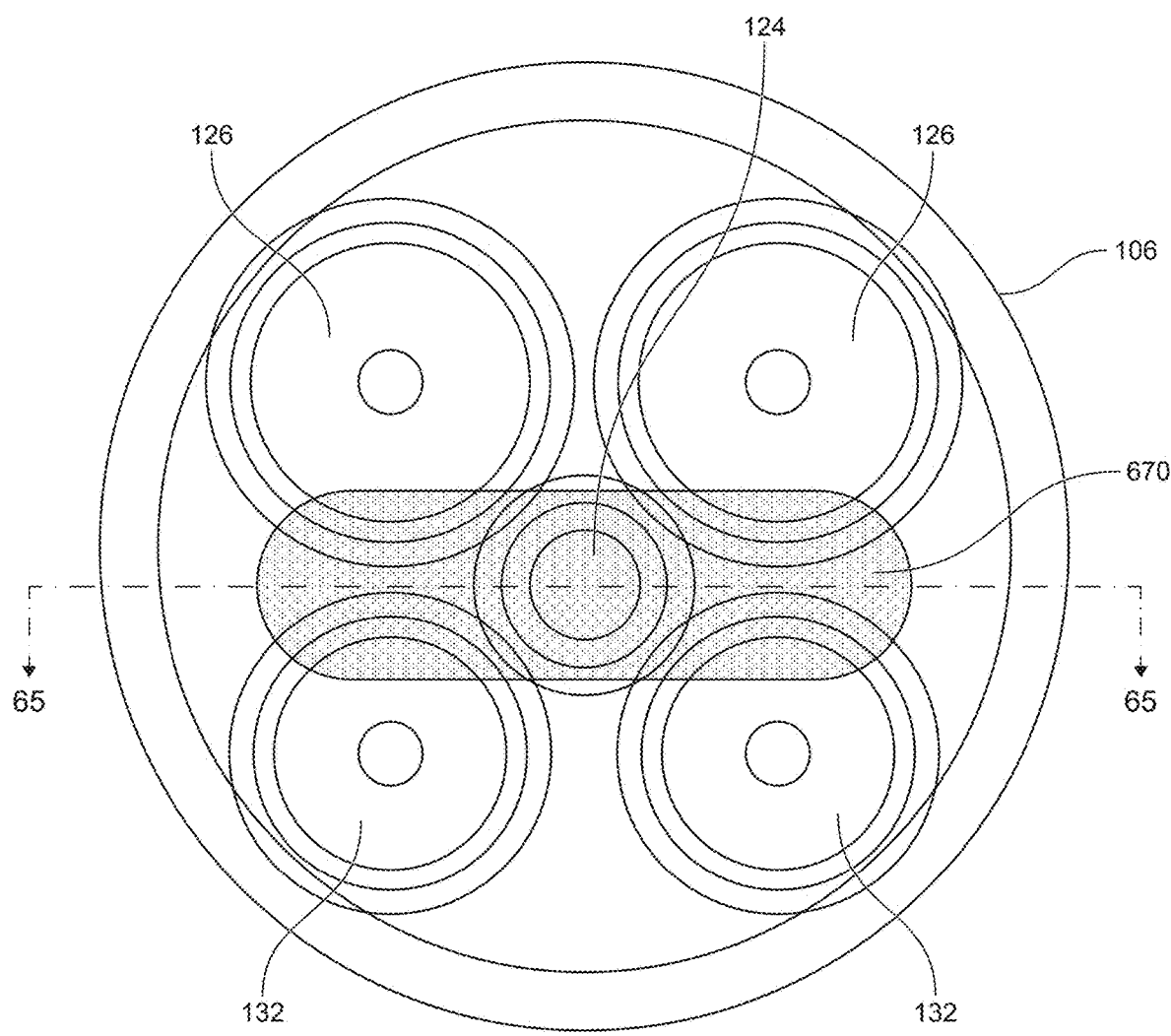
FIGS. 64 and 65 illustrate a bottom view and a side view respectively of a baffle relative to the valves and to the piston top plate.
Figure 65:
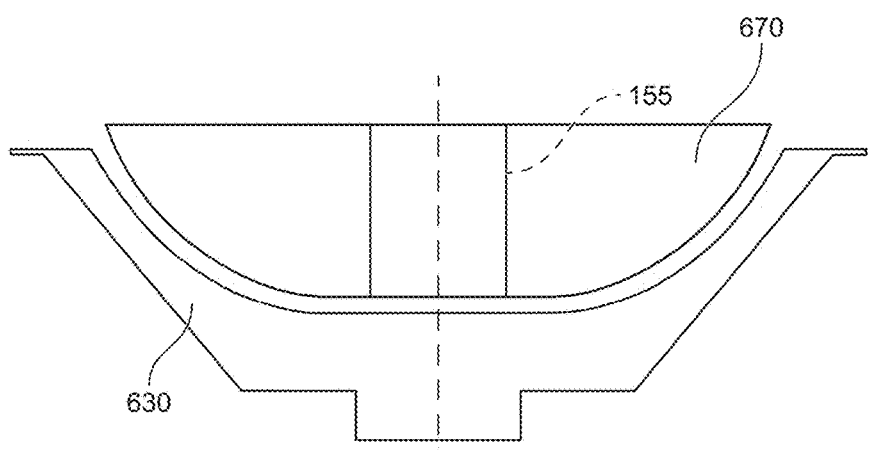

In some configurations, the piston top plate 630 and/or the top surface of a piston (e.g., the piston surface that is exposed to the combustion chamber) can include a complementary indentation or recess to accommodate the baffle 670. FIGS. 64 and 65 respectively illustrate a view from below the baffle 670 and a schematically sectioned side view of the baffle 670 and the piston top plate 630. As shown in FIG. 64, the baffle 670 can be elongated along an axis that is offset from the center of the cylinder bore 106. The baffle 670, however, is shown to be symmetrical about a plane that extends along the center axis of the cylinder bore 106. As illustrated, the intake valves 126 are disposed on one side of the baffle 670 and the exhaust valves 132 are disposed on an opposite side of the baffle 670. The side view illustrates that the piston top plate 630 can have a recess that generally conforms to the shape of the baffle 670. In the illustrated configuration, the recess defined within the piston top plate 630 is generally boat shaped. The boat shape can have curved or tapering lateral portions and a generally linear central portion. Other configurations are possible depending upon the shape of the baffle 670 and the shape of the piston 110 or the piston top plate 630.

Figure 66:
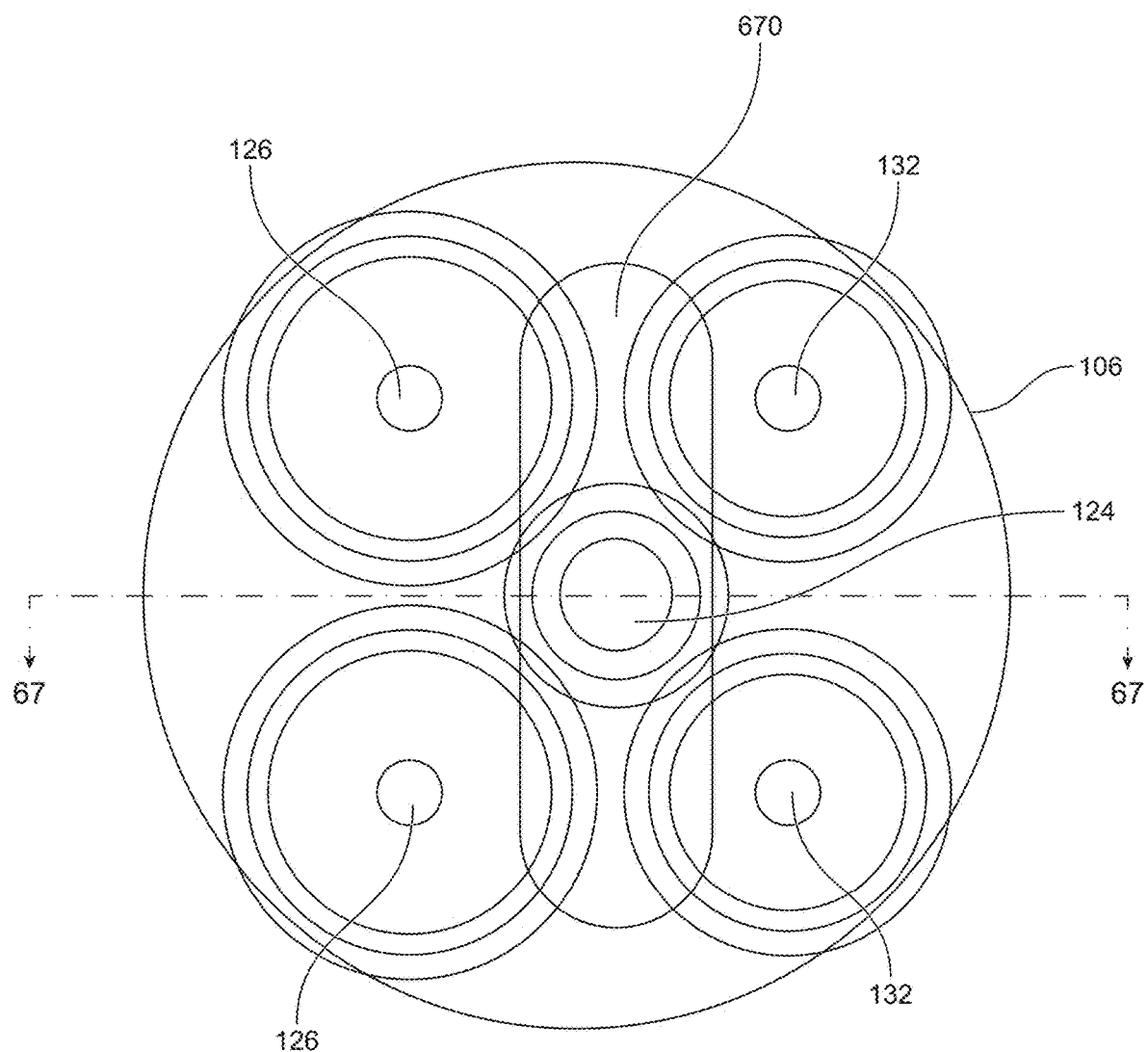
FIGS. 66-67 illustrate a bottom view and a schematic section side view of a baffle relative to the valves and to the piston top plate
Figure 67:
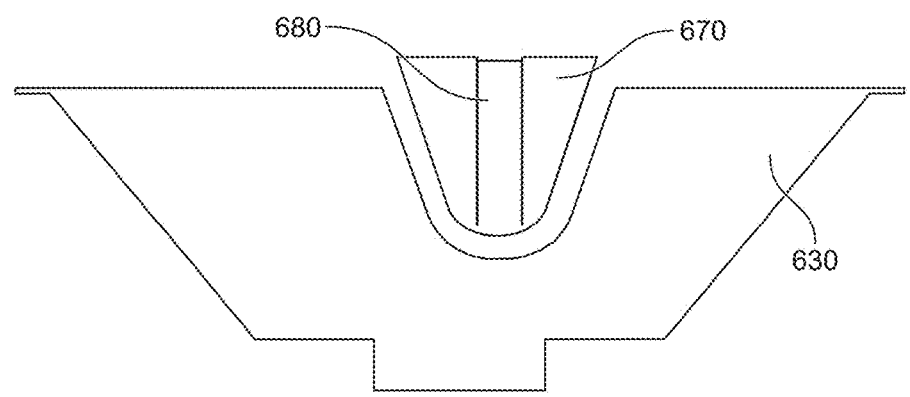
Figure 68:
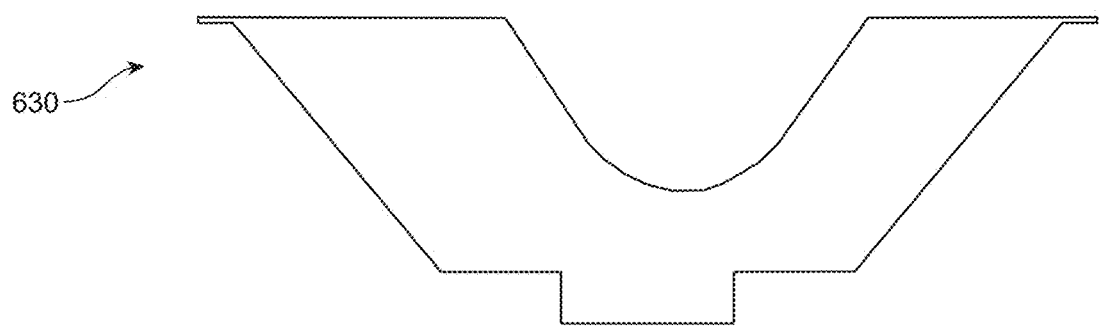
FIGS. 68-71 illustrate examples of piston top plates that can be used with baffles.
Figure 69:
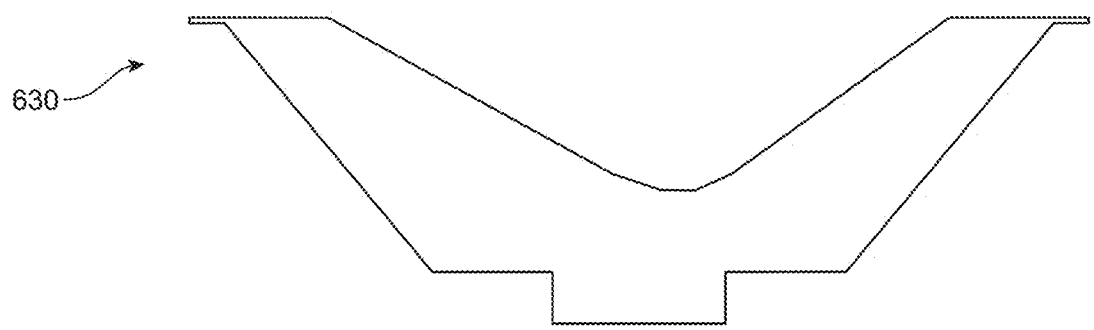
Figure 70:
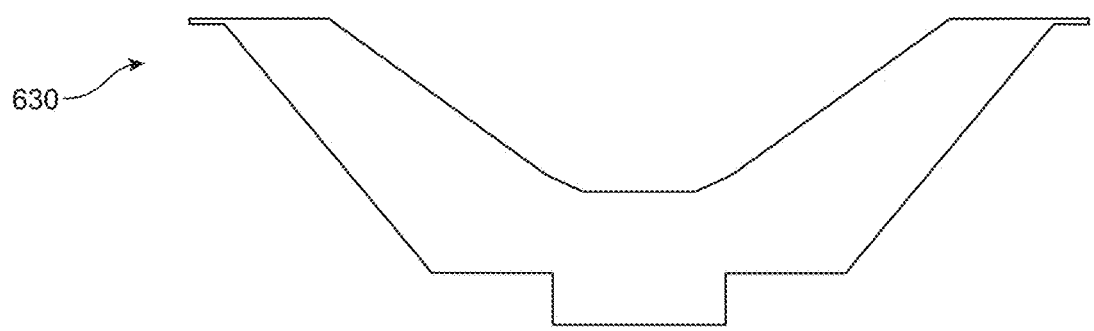
Figure 71:
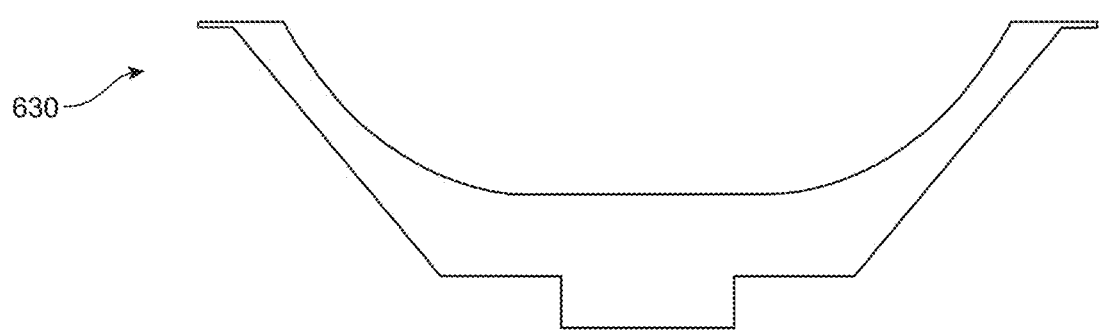

FIGS. 66 and 67 illustrate that the shape of the piston top plate 630 can generally conform to the shape of the baffle 670 along a second direction. In other words, when a section is taken through the baffle 670 in a direction normal to the length of the baffle 670, the baffle 670 and the recess in the piston top plate 630 can be complementary. In some configurations, the baffle 670 has a pair of generally linear side walls at the root which angle toward each other. The crown of the illustrated baffle 670 comprises an arcuate member that connects the two ends of the generally linear side walls. The pocket or recess formed within the cylinder top plate 630 can have a complementary shape. Other configurations are possible keeping in mind a desire to reduce the likelihood of collision between the piston top plate 630 and the baffle 670.

While the shape of recess or pocket in the piston top plate 630 can conform fairly closely to the shape of the baffle 670, other configurations are possible. For example, FIGS. 68-71 illustrate various examples of piston top plates 630 that can be used with the baffle 670 illustrated in FIG. 67. Different shapes for the recesses or pockets formed in the piston top plate 630 can effectively increase or decrease a volume of the combustion chamber 104 and/or can increase or decrease a maximum compression. For example, the piston top plate 630 illustrated in FIG. 68 can be used when high compression is desired, while the piston top plate 630 illustrated in FIG. 69, the piston top plate 630 illustrated in FIG. 70, and the piston top plate 630 illustrated in FIG. 71 may be used to achieve successively lower compression and/or greater combustion chamber volume.

In some configurations, the baffle 670 can cover from about 5% to about 40%, for example about 25%, of the curtain area of the intake valves 126 and/or the exhaust valves 132 when the intake valves 126 and/or the exhaust valves 132 is/are open. In other words, the baffle 670 can extend around about 5% to about 40% of the circumference of one or more of the intake valves 126 and/or the exhaust valves 132.

Figure 72:
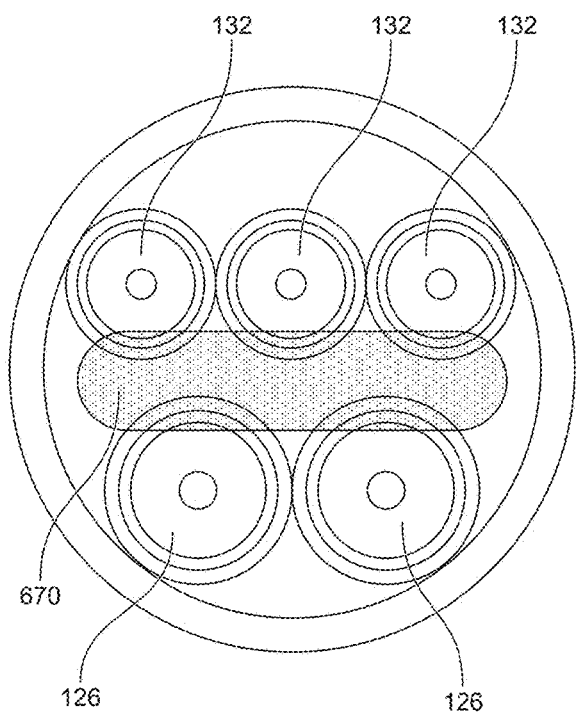
FIGS. 72-74 illustrate examples baffles with varying numbers of intake and exhaust valves.
Figure 73:
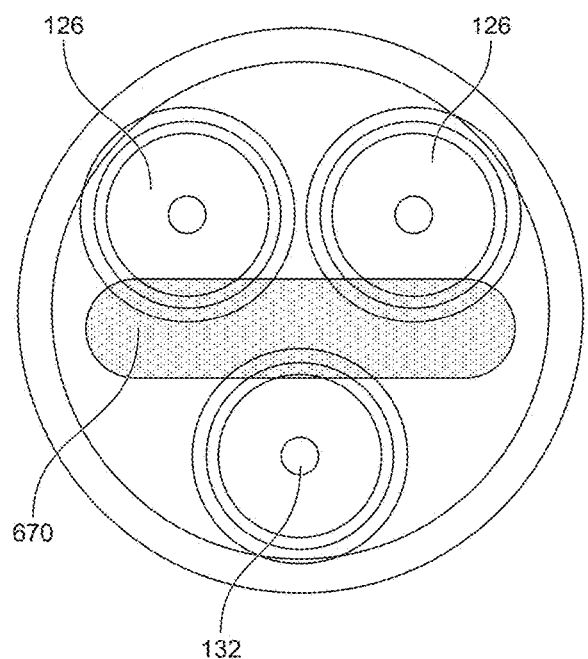
Figure 74:
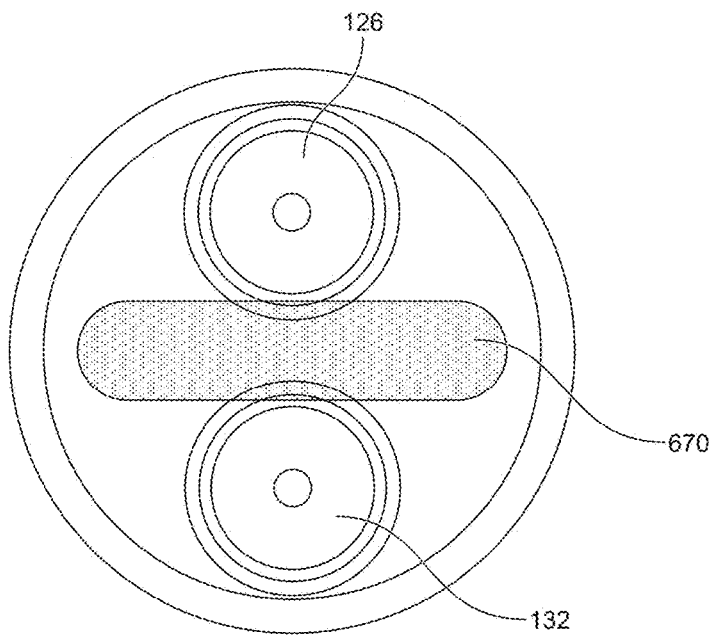

In some configurations, the baffle 670 can be positioned with one, two, or three exhaust valves 132 on a first side of the baffle 670 and with one, two, or three intake valves 126 on a second side of the baffle 670 where the second side of the baffle 670 is opposing the first side relative to the chord defined by the baffle across the combustion chamber 104. While two intake valve 126 and two exhaust valves 132 are depicted in FIGS. 64 and 66, the number of intake valves 126 and exhaust valves 132 can vary, and the number of intake valves 126 is not necessarily equal to the number of exhaust valves 132. FIGS. 72-74 illustrate example configurations comprising the baffle 670 with varying numbers of the intake valves 126 and the exhaust valves 132. For example, FIG. 72 illustrates the baffle 670 positioned between two intake valves 126 and three exhaust valves 132. FIG. 73 illustrates two intake valves 126 and one exhaust valve 132. FIG. 74 illustrates a two-valve configuration with the single intake valve 126 being positioned on one side of the baffle 670 and the single exhaust valve 132 can be positioned on an opposite side of the baffle 670. In other words, the baffle 670 can be positioned between the intake valves 126 and the exhaust valves 132 regardless of the numbers of each.

Figure 75:
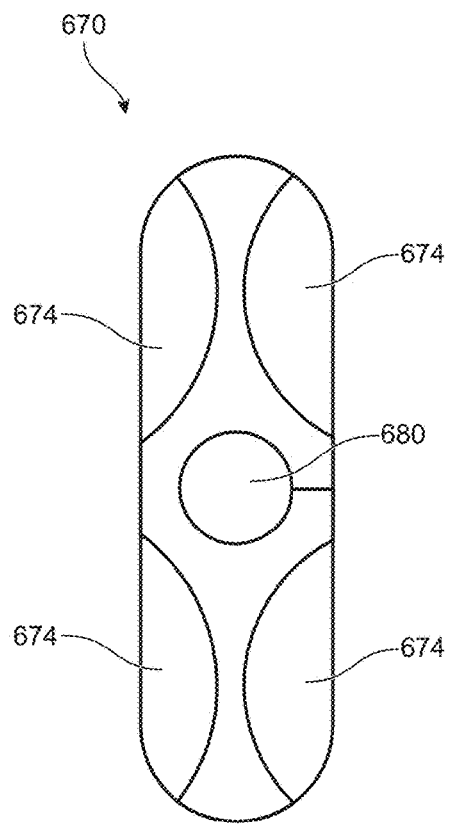
FIGS. 75 and 76 illustrate a baffle with valve-receiving recesses.
Figure 76:
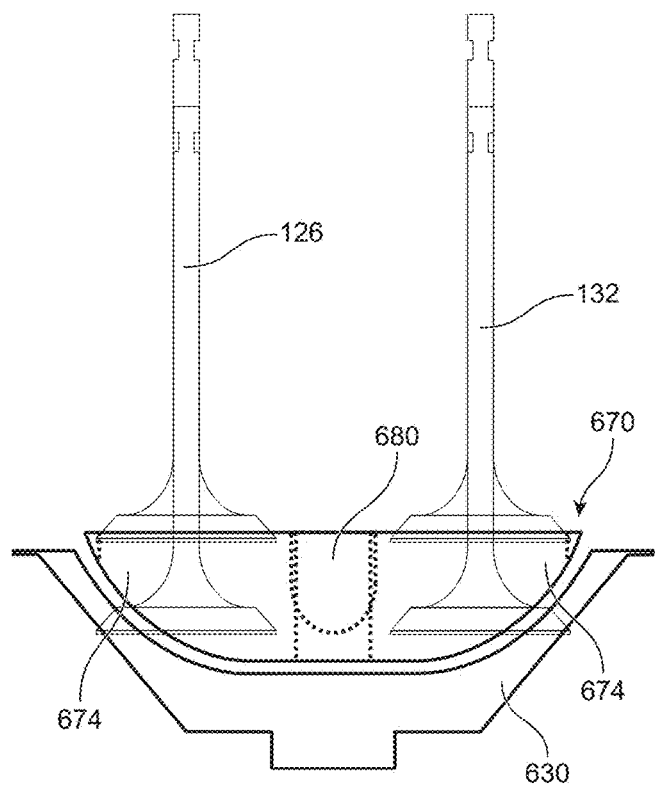

With reference to FIGS. 75 and 76, in some configurations, the baffle 670 can have cutouts or recesses 674 to accommodate one or more of the intake valves 126 and/or the exhaust valves 132. In some such configurations, the recesses 674 can accommodate the intake valves 126 and/or the exhaust valves 132 when in an open position and/or can accommodate the intake valve seats 182 and/or exhaust valve seats 192. In some configurations, the recesses 674 may extend from top to bottom of the baffle 670. In some configurations, the recesses 674 may extend over less than the total height of the baffle 670. For example, the recesses 674 may extend to a depth sufficient to allow the one or more of the intake valves 126 and/or the exhaust valves 132 to open a desired amount.

As shown, for example, in FIG. 61, the baffle 670 can include an opening 680. The opening 680 can be aligned with the fuel injector 124. The alignment with the fuel injector 124 enables fuel to be injected into the combustion chamber 104 through opening 680. In some configurations, there is only one opening 680. In some configurations, there are two or more of the openings 680 to enable multiple fuel injectors 124 to inject through the baffle 670. The opening 680 can be used to accommodate the fuel injector 124 or a sparkplug, for example but without limitation. As shown in FIG. 76, the opening 680 can extend fully through the baffle 670. In some configurations, at least a portion of the opening 680 is generally cylindrical. In some configurations, at least a portion of the opening 680 tapers towards the combustion chamber 104. In some configurations, at least a portion of the opening 680 expands towards the combustion chamber. In some configurations, at least a portion of the opening 680 can be threaded. In some configurations, at least a portion of the opening 680 can be smooth on the inner surface.

Thermal and Vibration Management

The efficiency of an internal combustion engine can be affected by many factors. For example, incomplete combustion and friction within the engine can diminish efficiency. One significant source of efficiency loss in an internal combustion engine can be the loss of heat from the combustion chamber through the walls of the combustion chamber, the piston, and the cylinder head. In a Carnot engine, the efficiency n is related to the cold reservoir ($T_C$) and hot reservoir ($T_H$) temperatures during the engine cycle by the relation $\eta \leq 1 - T_C/T_H$. Thus, to increase the maximum theoretical efficiency, the cold reservoir temperature can be decreased, the hot reservoir temperature can be increased, or both. In practice, the cold reservoir temperature is generally governed by environmental conditions in which the engine operates. Accordingly, an engine design may attempt to increase the hot reservoir temperature to achieve greater efficiency.

In some configurations, the combustion chamber 104 of the internal combustion engine 100 using the uniblock 102 can comprise surfaces having one or more layers. The one or more layers can be disposed in one or more surfaces that define the combustion chamber 104 (e.g., on the cylinder wall that defines combustion chamber 104, on the top of the cylinder next to the head region of the uniblock 102) and/or on other surfaces that are exposed to hot gases that are capable of doing work, including the wall of the exhaust passage 134, to reduce heat loss.

Constructing components with multiple layers can provide a variety of benefits. In some configurations, one or more layers can be used to achieve thermal benefits. In some configurations, one or more layers can be made of materials that are different from each other and/or one or more layers can be made from the same material. In some configurations, the one or more layers can be made from materials that are different from the materials used to form the uniblock 102 and/or the piston 110. In some configurations, one or more of the layers can be made from the same materials as the materials used to form the uniblock 102 and/or the piston 110, or any combinations of these materials. Even when the layers are made from the same materials as other layers in the same component, layers of the same material may conduct heat less well than a volume and shape of a continuous material due to, for example, thermal barriers created by interfaces between layers that may insert air or vacuum between the layers and separate some molecular contact within the primary materials.

In addition to, or as an alternative to, thermal management, layered structures can provide other benefits. For example, layered structures can reduce vibrations, or absorb vibrations. Layered structure can reduce sound transmission. For example, vibrations and shocks within an engine can pose challenges, especially when high compression ratios are used. Thus, it can be advantageous to include layers of material that can absorb or dampen such vibrations and shocks. In some configurations, multiple materials can be nested in a conical shape to reduce thermal and/or vibrational inputs to the rest of the block.

Various materials can be used for vibration management. For example, in some configurations, copper, lead, silver, or another relatively malleable metal, alloy, or solder can be used as one or more layer. In some configurations, a paste, putty, or other malleable/deformable compound can be used as one or more layer. For example, in some configurations, thermal/insulating pastes and/or thermal compounds can be used can be used as one or more layer. The thermal paste and/or thermal compound can facilitate thermal transfer and/or vibration isolation.

The layered structure may have several advantages and may also present several considerations. For example, while it can be beneficial to have a layered structure with different layers having different thermal conductivities, mechanical properties, and so forth, it can also be important to minimize mismatches in the thermal expansion coefficients (CTEs) of materials. For example, if two layers have very different CTEs, the materials can separate, crack, chip, fracture, and so forth when the layers are subjected to temperature swings. This can be especially problematic in applications where the layers will be subject to large temperature changes.

While two layers are depicted in each of the schematic illustrations of FIGS. 77-79, any number of layers can be used. Some configurations can use one layer, two layers, three layers, four layers, or more. In some configurations, one or more components may not be layered. For example but without limitation, in some engine configurations, the stroke length can be relatively small, and thus there may be limited benefit to using a layered structure to define the cylinder bore. In some configurations, different engine components can have differing numbers of layers.

In the configuration schematically illustrated in FIG. 77, the wall that defines the cylinder bore 106 comprises a plurality of layers. In some configurations, the wall can be integrally formed with the uniblock 102. In some configurations, the wall can be defined by a cylinder liner 236 that is formed separate of the uniblock 102 and inserted into the uniblock 102.

According to some configurations, the cylinder liner 236 can be used to improve at least one of thermal isolation, thermal transfer, vibration isolation, and vibration absorption. Various materials can be used to achieve desired thermal and/or vibrational properties. The cylinder liner 236 could be one metal, or two different metals, or three different metals. Different layers can be used. The layers can present, in cross-section, like an onion with different layers having one or more of a different thermal conductivity and/or different vibration absorption properties. The onion-like construction can comprise one part, two parts, three parts, or more, if desired. For example, the innermost layer (e.g., the layer that is exposed to the combustion chamber 104) can comprise a material that offers desirable thermal characteristics and that can maintain a lubricated surface. Other components, such as the piston top plate 630, for example but without limitation, can similarly be fabricated in a layered manner, as described in more detail herein.

In the configuration illustrated in FIG. 77, the cylinder liner 236 comprises a first cylinder wall layer 700. At least a portion of the first cylinder wall layer 700 can be exposed to the combustion chamber 104. A second cylinder wall layer 702 can be disposed between the uniblock 102 and the first cylinder wall layer 700. In some configurations, the uniblock 102 can be cast iron, an aluminum alloy, and so forth. In some configurations, the first cylinder wall layer 700 can have low thermal conductivity and can be readily lubricated.

In some configurations, the cylinder top plate 232 can comprise multiple layers. Such a construction is illustrated in FIG. 78. The first layer 704 of the cylinder top plate 232 and the first cylinder wall layer 700 can be different materials. The second layer 706 of the cylinder top plate 232 and the second cylinder wall layer 702 can be the same material or different materials.

In some configurations, Invar can be used as the inside layer of either or both of the cylinder liner 236 or the cylinder top plate 232 with grey cast iron on the outside of the Invar. The grey cast iron matches the thermal expansion of Invar more closely than stainless steel or aluminum, thus helping to avoid large differences in the CTEs of adjacent materials. In some configurations, a third layer of aluminum can be used on the outside. In some configurations, the cylinder liner 236 can use a nickel-iron alloy with a low coefficient of thermal expansion (e.g., Invar, which is an alloy consisting of approximately 36% nickel and approximately 64% iron), nickel-chromium-based alloys (e.g., Inconel), stainless steel, ductile grey cast iron, ferrous nickel-cobalt alloys (e.g., Kovar) and/or aluminum. Such cylinder liners 236 can decrease thermal transfer from the combustion chamber 104, thereby leaving more heat in the combustion chamber 104.

In lower cost internal combustion engines 100 with a uniblock 102, the uniblock 102 can be formed from aluminum with no cylinder liner or a cast iron block can be provided with a steel liner. With either the aluminum construction or the cast iron construction, the cylinder bore 106 could be coated with a ceramic or other form of thermal barrier to reduce friction and improve resistance to heat transfer. In some configurations, sleeves can be press fit inside one another.

According to some configurations of the internal combustion engine 100 using the uniblock 102, the cylinder liner 236 can be inserted from below because there is no head and block separation through which to access the cylinder bores 106. Such configurations enable the cylinder liner 236 to have more varied materials and material combinations than conventional engines while better managing thermal and/or mechanical stresses.

In some configurations, the internal combustion engine 100 with the uniblock 102 can comprise a separate cylinder top plate 232. The cylinder top plate 232 can be a separate component from the cylinder liner 236 such that the cylinder top plate 232 is pressed up by cylinder liner 236 or the cylinder top plate 232 can be integrally formed with the cylinder liner 236. In some configurations, the cylinder top plate 232 is secured in position using the cylinder liner 236. In some configurations, the top plate 232 can have a multiple layer construction similar to the cylinder liners 236, as described above.

As schematically illustrated in FIG. 78, the cylinder top plate 232 can comprise a plurality of layers. In some configurations, the plurality of layers can be integrally formed with the uniblock 102 instead of using the separate cylinder top plate 232. In some configurations, the plurality of layers can at least partially be defined by the cylinder top plate 232. The cylinder top plate 232 can comprise the first cylinder top plate layer 704 that is exposed to the combustion chamber 104. The second cylinder top plate layer 706 can be disposed between the first cylinder top plate layer 704 and the uniblock 102. The uniblock 102 can be formed of any suitable material, which can comprise cast iron, an aluminum alloy, for example but without limitation.

Figure 81:
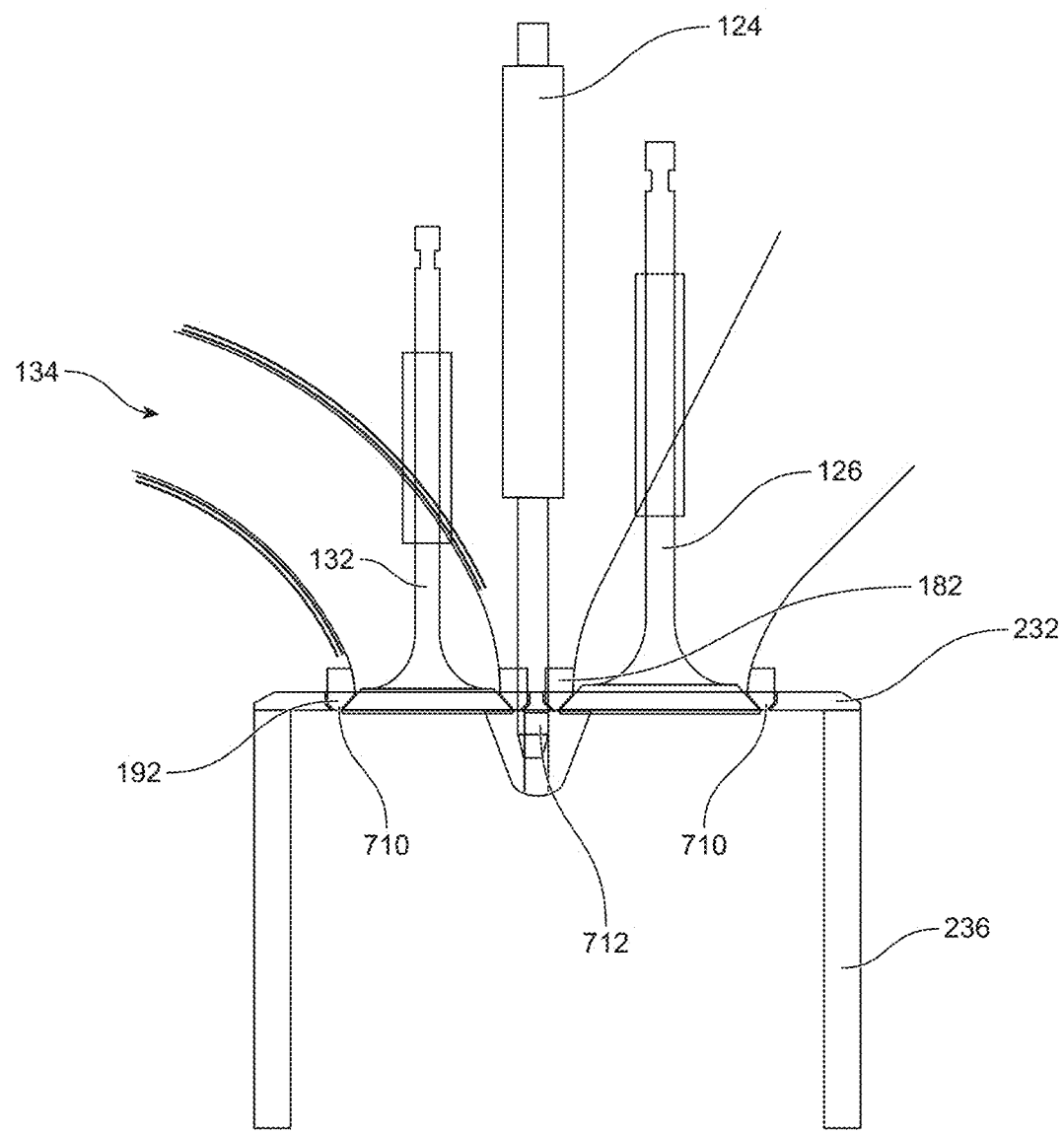
FIG. 81 illustrates a partial view of components of an example configuration of the internal combustion engine with a uniblock in which an exhaust port includes an exhaust port liner comprising one or more thermal materials.

As illustrated in FIG. 81, the cylinder top plate 232 can have one or more valve seat openings 710. The valve seat openings 710 can receive one or more intake valve seat 182 and one or more exhaust valve seat 192. The cylinder top plate 232 can comprise one or more central hole 712. The central hole 712 can accommodate the fuel injector (e.g., diesel injector) 124. In some configurations, the central hole 712 may not be present, for example in an engine that uses a carburetor. In some configurations, where more than one central hole 712 is provided, the internal combustion engine 100 with the uniblock 102 can rapidly switch between fuel types, for example but without limitation, through the use of multiple fuel injectors 124.

In some configurations, one or more intake valve seats 182 and/or one or more exhaust valve seats 192 can be machined into the cylinder top plate 232 after the cylinder top plate 232 has been seated into position within the uniblock 102. In some configurations, the cylinder top plate 232 can be slip fit into position. In some configurations, the cylinder top plate 232 can have a round shape cutout to better accommodate thermal expansion. In some configurations, the cylinder top plate 232 can be conical or can have a slight dish shape in the center. In some configurations, a central compression nut can be provided to secure the cylinder top plate 232 in position relative to the uniblock 102.

FIG. 79 illustrates an example of the top of the piston 110. The top of the piston 110 can include a first piston head layer 714 and a second piston head layer 716 disposed between the first piston head layer 714 and the piston body 600. The first piston head layer 714 can be exposed to the combustion chamber 104. The first piston head layer 714 can be the same or a different material than the first cylinder wall layer 700 and/or the first layer 704 of the cylinder top plate 232. The second piston head layer 716 can be the same or a different material than the second cylinder wall layer 702 and/or the second layer 706 of the cylinder top plate 232. The piston body 600 can be the same material or a different material than the uniblock 102.

As shown in the schematic illustration of FIG. 79, the second piston head layer 716 can have a downward extension 720. The downward extension 720 can fit into a cavity of the piston body 600. While one cavity and one downward extension 720 are shown in FIG. 79, there can be multiple cavities, multiple downward extensions, and the cavity and/or the downward extensions may not be placed in the center in all configurations.

The first piston head layer 714 can have an extension 722 that passes through an opening in the second piston head layer 716 and into a cavity of the piston body 600. In some configurations, there can be multiple extensions 722 that may or may not be centered. In some configurations, rather than passing through the second piston head layer 716 to the piston body 600, the second piston head layer 716 can have one or more cavities for receiving the extension 722 of the first piston head layer 714 and the extension 722 may extend only partially into the second piston head layer 716. In some configurations, the layers of the piston top plate 630 can be secured using interference fitting. In some configurations, the layers of the piston top plate 630 can be secured using one or more bolts. In some configurations, the layers of the piston top plate 630 can be secured using one or more dowels.

Figure 80:
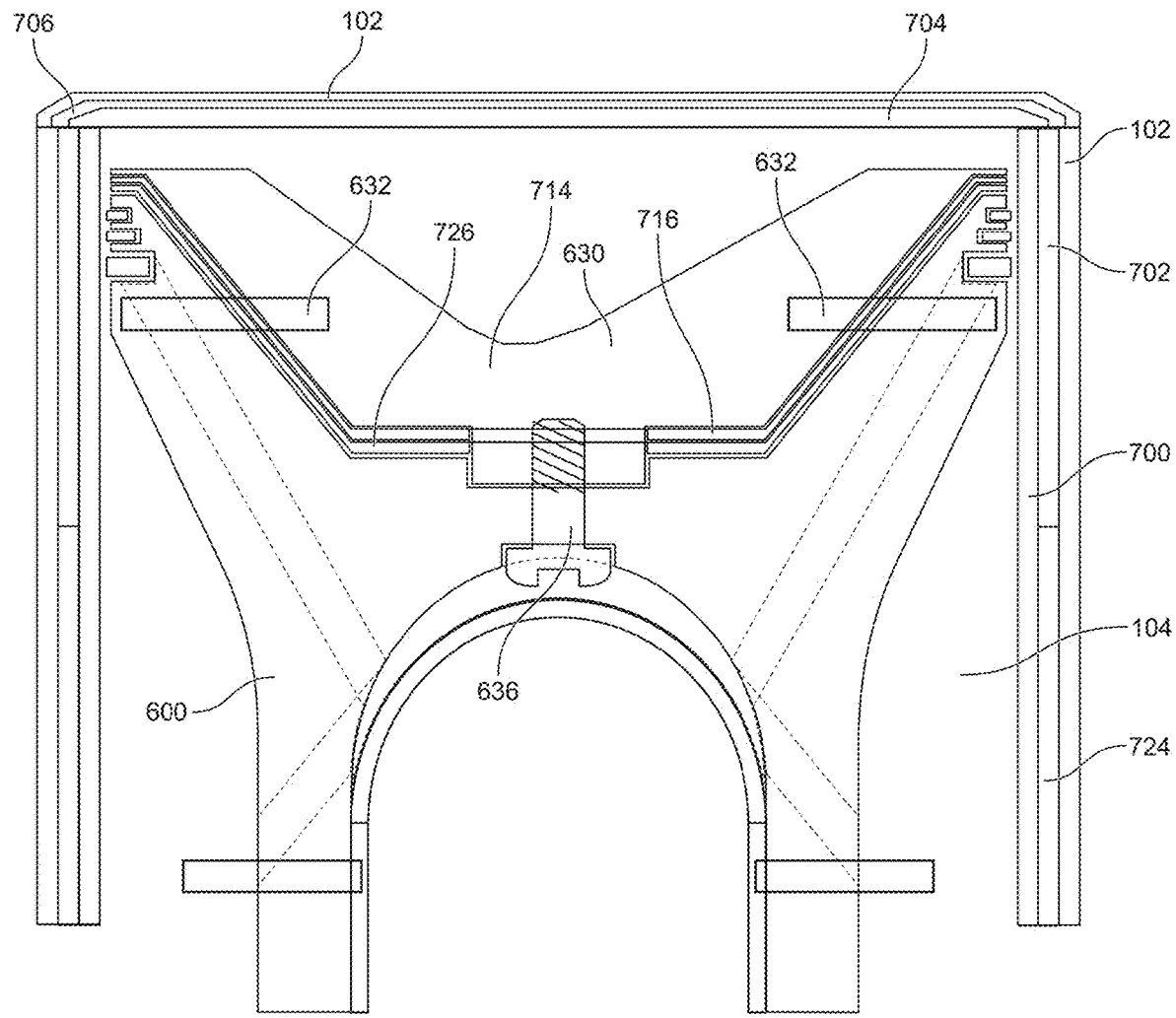
FIG. 80 illustrates an example configuration of a cylinder bore, a cylinder top plate, and a piston head top, each of which is multilayered.

FIG. 80 illustrates an example configuration of the cylinder liner 236, the cylinder top plate 232, and the piston top plate 630. As shown in FIG. 80, the illustrated first layer 704 of the cylinder top plate 232 and the second layer 706 of the cylinder top plate 232 can be held in place by the structures of the uniblock 102. The cylinder bore 106 can have the second cylinder wall layer 702 disposed thereon. The second cylinder wall layer 702 can have the first cylinder wall layer 700 disposed thereon. In some configurations, a fourth cylinder wall layer 724 can be included. For example, the second cylinder wall layer 702 may extend along a portion of the cylinder bore 106, and the fourth cylinder wall layer 724 can extend along another portion of the cylinder bore 106 in areas without the second cylinder wall layer 702. Such an approach can have several benefits. For example, the use of different materials along the length of the cylinder bore 106 can cause heat to be selectively directed to desired locations, for example to facilitate heat extraction.

The piston top plate 630 can include the plurality of layers, as discussed above. For example, the piston top plate 630 can include the first layer 714 and the second layer 716. In some configurations, a third layer 726 can be included. There can be more or fewer layers. As illustrated in FIG. 80, the first layer 714 can be secured to the piston body 600 using the fastener 636. For example, the second layer 716 and the third layer 726 can have a hole or slot through which the fastener 636 can be extend. The first layer 714 can have a threaded hole that receives the fastener 636. In some configurations, the first layer 714 can be secured using dowels 632. In some configurations, the dowels 632 can also secure the second layer 716, the third layer 726, or both. In some configurations, both of the dowels 632 and the fastener 636 can be used. In some configurations, neither fasteners nor dowels may be used. For example, the layers may be held in place using interference fits in some configurations. As discussed above, the layers associated with the piston top plate 630 can generally be subjected to compressive forces, which can reduce or eliminate the need to physically secure the layers to one another and/or to secure the layers to the piston body 600.

FIGS. 77-80 illustrate the use of layering or onioning for surfaces that are exposed to the combustion chamber 104. In some configurations, similar approaches can be used for other engine components. For example, exhaust gases and other byproducts exiting through the exhaust passage 134 can be at a relatively high temperatures. To reduce the likelihood of undesirable heating of the internal combustion engine 100 using the uniblock 102 by the exhaust gasses and other byproducts, in some configurations, the exhaust passage 134 can be lined with an exhaust port liner 730. The exhaust port liner 730 can comprise one or more layers that have relatively low thermal conductivities to act as a thermal barrier between the exhaust gasses and other byproducts and the internal combustion engine 100 with the uniblock 102.

FIG. 81 illustrates a partial view of components of an example configuration of the internal combustion engine 100 with the uniblock 102 in which the exhaust passage 134 includes the exhaust port liner 730. The exhaust port liner 730 comprises one or more thermal materials. As shown in FIG. 81, the exhaust port liner 730 can extend along at least part of the length of the exhaust passage 134. The exhaust port liner 730 can be a thermal barrier to reduce transfer of heat from the exhaust into the uniblock 102. The exhaust port liner 730 is illustrated as a single layer in FIG. 80, but there can be multiple layers. The layers can comprise, for example, a ceramic material, Inconel, Kovar, Invar, or any other suitable material. In some configurations, the portion of the exhaust passage 134 that will receive the exhaust port liner 730 can have a set radius of curvature such that the exhaust port liner 730 can be slid into position. In other configurations, at least a portion of the exhaust passage 134 can be coated with the materials defining the exhaust port liner 730.

Engine Cooling

While preventing excess heat loss from the combustion chamber 104 can improve efficiency and/or can reduce the transfer of waste heat to moving engine parts, some heat may transfer to various engine components. It can be important to remove waste heat from engine components to reduce the likelihood of overheating of the internal combustion engine 100, which could lead to increased wear, damage to engine components, seizing of movable engine components, and degradation of lubricating oils. In some configurations, fixed engine parts such as, for example, the uniblock 102, can be cooled directly. In some configurations, moving parts can rely on thermal transfer through mediums such as lubricating oil. For example but without limitation, the crankshaft 112 and the connecting rods 116 can transfer excess heat via lubricating oil.

To reduce the likelihood of excess heat buildup in the internal combustion engine 100 with the uniblock 102, materials with high thermal conductivity can be incorporated into the body of the internal combustion engine 100 and the crankshaft caps 202, for example but without limitation. In some configurations, copper fins, rods, and slabs can be integrated into the uniblock 102. The fins, rods, and slabs can be arranged to transfer heat from the interior of the internal combustion engine 100 using the uniblock 102 to air or liquid cooling outside of the main components of the internal combustion engine 100. In some configurations, thermally conductive materials (e.g., copper) can be included during casting of the uniblock 102. In some configurations, thermally conductive materials can be added to the uniblock 102 after casting. For example, holes, slits, and other types of recesses can be formed in the uniblock 102 after casting. These holes, slits, and other types of recesses can be at least partially filled with a thermally conductive material, such as copper, for example. In some configurations, such holes, slits, and other types of recesses can be through-holes. In some configurations, the holes, slits, and other types of recesses can be blind and may not extend all the way to an interior or exterior surface of the uniblock 102.

In some configurations, the uniblock 102, the crankshaft caps 202, or both can have embedded heat-conducting hollow tubes, solid or hollow pipes, solid or hollow rods, or solid or hollow fins, for example but without limitation. In some configurations, the heat-conducting tubes, pipes, rods, or fins can be fully embedded in the uniblock 102, the crankshaft caps 202, and other components. In some configurations, the heat-conducting tubes, pipes, rods, or fins can be partially embedded in the uniblock 102, the crankshaft caps 202, for example but without limitation.

Figure 82:
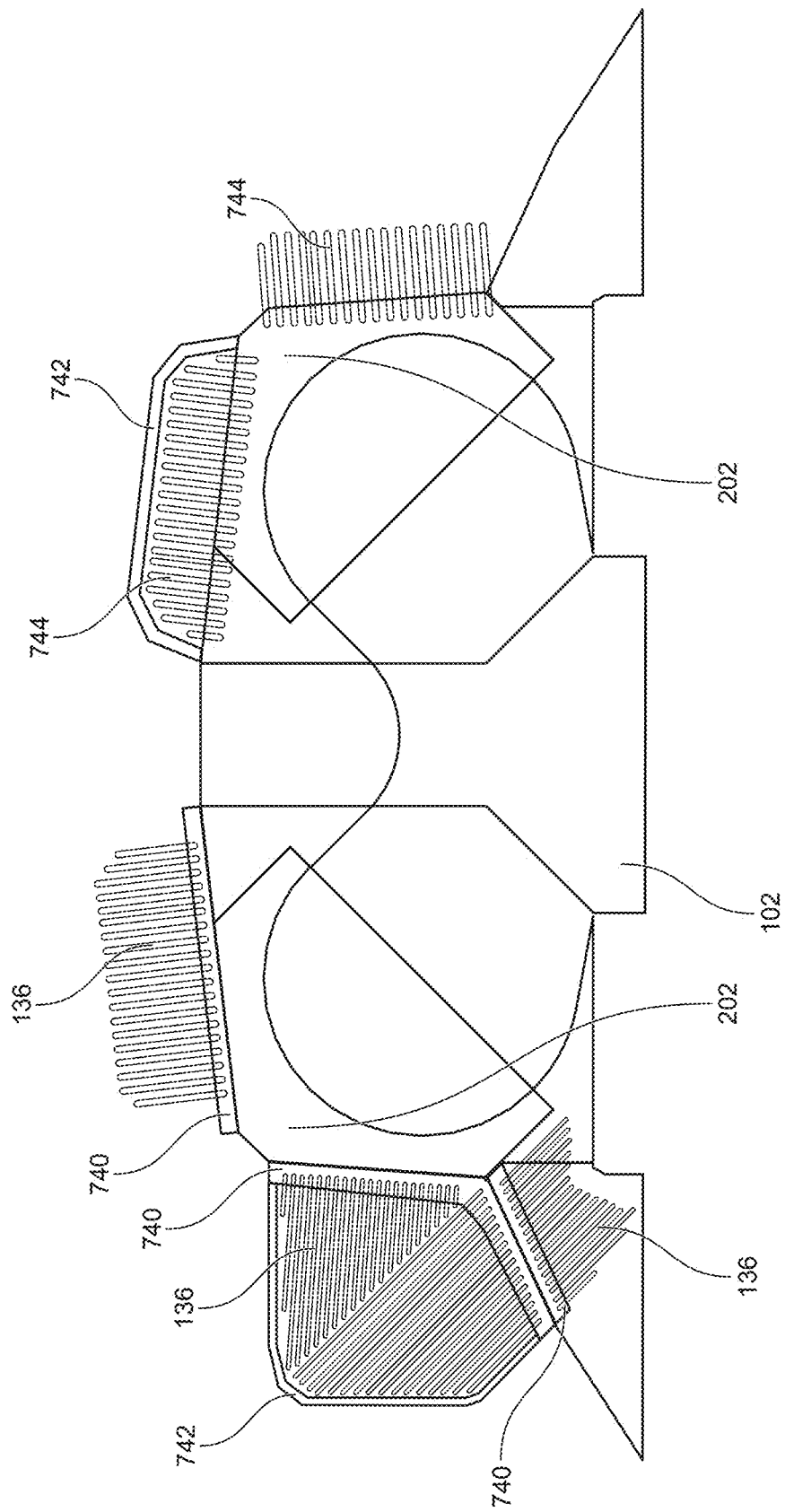
FIG. 82 illustrates some configurations of cooling structures that can be used to transfer heat away from internal combustion engines using uniblocks.

As illustrated in FIG. 82, a heat plate 740 can be disposed at or near an outer surface of the uniblock 102 or the crankshaft cap 202, for example without limitation. In some configurations, heat-conducting tubes, pipes, rods, or fins can be disposed on an outer surface of the uniblock 102 or the crankshaft cap 202. For example, in some configurations, the heat plate 740 can have heat-conducting tubes, pipes, rods, or fins embedded therein and extending away from the exterior surface of the uniblock 102 or the crankshaft cap 202. In some configurations, heat-conducting tubes, pipes, rods, or fins that are exposed outside the uniblock 102 and the crankshaft cap 202 can be exposed to air. In some configurations, heat-conducting tubes, pipes, rods, or fins that are exposed outside the uniblock 102 or the crankshaft cap 202 can be encapsulated in a cover. For example, uncovered exposed cooling features (e.g., heat-conducting tubes, pipes, rods, or fins) can be used in an air-cooled engine design. Capped cooling features can be used in engine designs that utilize liquid cooling and/or phase change cooling. In some configurations, the covers (e.g., crankshaft caps, camshaft covers) can be added to the uniblock 102 or can be cast together with the uniblock 102. In some configurations, the covers can form or partially form passages for oil or other coolants.

In some configurations, heat transfer to the heat plate 740 can be improved by the use of a thermal interface material. In some configurations, the thermal interface material can include, for example and without limitation, thermal paste, indium, sintered silver, or another thermally conductive material. In some configurations, facing surfaces of the heat plate 740, the uniblock 102, and/or the crankshaft cap 202 can be polished to improve thermal contact.

FIG. 82 illustrates some configurations of cooling structures that can be used to transfer heat away from the internal combustion engine 100 with the uniblock 102. The uniblock 102 can include one or more cooling components 136. In some configurations, the cooling component 136 can be embedded into the uniblock 102. The cooling component 136 can be, for example, heat-conducting tubes, pipes, rods, or fins, for example but without limitation.

In some configurations, the cooling component 136 can be connected to the heat plate 740. The heat plate 740 can be incorporated into the uniblock 102. The cooling component 136, the heat plate 740, or both can comprise thermally conductive materials such as, for example, copper. In some configurations, the heat plate 740 can be in thermal communication with an external heat plate 740 that is external to the uniblock 102. The external heat plate 740 can have the cooling component 136 embedded or partially embedded therein. In some configurations, the heat plate 740 and the external heat plate 740 can be in direct contact with one another. In some configurations, a thermal interface material, such as a thermal paste, indium, sintered silver, and/or other thermally conductive material can be disposed between the heat plate 740 and the external heat plate 740. The thermal interface material can, in some configurations, improve thermal transfer from the heat plate 740 to the external heat plate 740.

The one or more cooling component 136 can project from the uniblock 102. In some configurations, the one or more cooling component 136 can comprise machined voids in the uniblock 102. In some configurations, the one or more cooling component 136 can be cast into the uniblock 102. For example, the uniblock 102 can be machined and a cooling fin material (e.g., aluminum) can be poured into recesses machined into the uniblock 102 to form the one or more cooling component 136. Further, any of the other components/features associated with the internal combustion engine 100 (e.g., heat blockers, cylinder liners, exhaust runner liners, etc.) can be cast into the uniblock 102 in a similar manner. In some implementations, the cooling fins 744 can be hollow and may contain a cavity under a vacuum or near vacuum condition. In some cases, a liquid may be stored in the hollow cooling fins 744. The liquid may be capable of a phase change to gas and/or may include fine materials to enhance the capillary effect such that the cooling fins 744 provide phase change cooling.

In some configurations, the cooling component 136 can be exposed, for example in an air-cooled engine design. In some configurations, the cooling component 136 can be enclosed in a housing 742. In some configurations, the housing 742 can be filled with a fluid. In some configurations, the fluid can be exchanged via a heat exchanger or pump, for example.

In some configurations, the uniblock 102 and/or the crankshaft cap 202 can have cooling structures 744 at least partially embedded therein and partially exposed. In such configurations, a cooling plate, such as the heat plate 740 and the external heat plate 740 may not be used. In some configurations, the cooling structures 744 can be enclosed in the housing 742 for cooling using a fluid. In some configurations, the cooling structures 744 can be exposed for air cooling.

In some configurations, the external heat plate 740, the cooling structures 744, and the housing 742 can be a component that can be bolted to an engine. In some configurations, the external heat plate 740, the cooling structures 744, and the housing 742 can be secured to the engine using one or more straps.

Partially embedded cooling structures, such as the cooling structures 744 shown in FIG. 82, can have several advantages. For example, less material may be needed for the cooling structures relative to cooling structures that are mounted to the engine with the external heat plate 740 and manufacturing processes can be relatively simple. However, partially embedded cooling structures can also have disadvantages, such as difficulty modifying an engine after manufacturing to increase cooling capabilities or to reduce cooling capabilities (for example, depending upon the operating conditions, it may be desirable to remove external cooling structures to make the engine lighter or to reduce drag). The use of external cooling structures and internal cooling structures can add flexibility because external cooling structures can be added, modified, or removed relatively easily and without rework of the uniblock 102 or the crankshaft caps 202.

Figure 83:
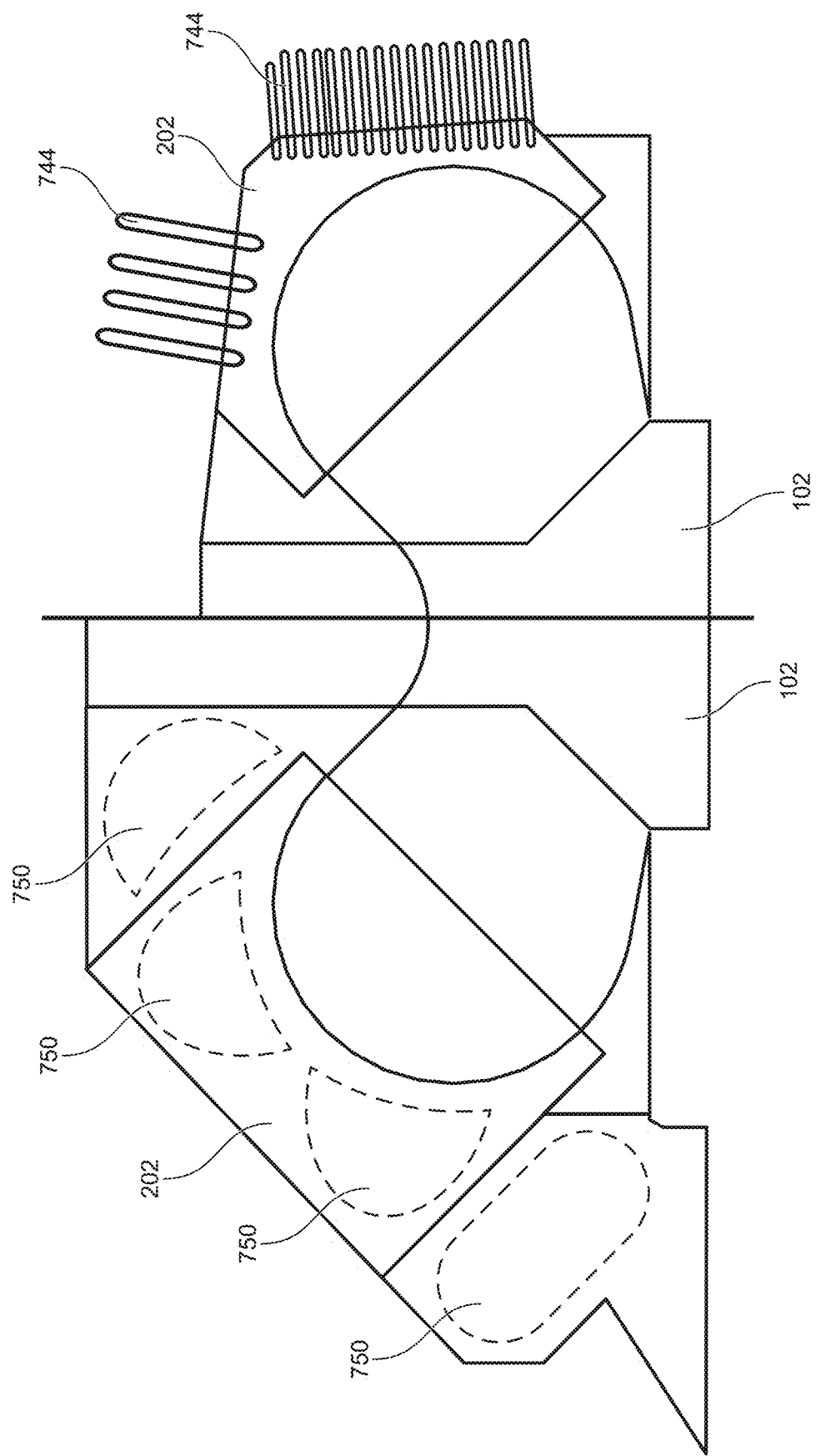
FIG. 83 illustrates additional examples of cooling features that can be used with internal combustion engines using uniblocks.

FIG. 83 illustrates additional examples of cooling features according to some configurations. According to some configurations, each crankshaft cap 202 can enclose a crankshaft 112 in the uniblock 102. Accordingly, the crankshaft cap 202 can contain half of the main bearings used to journal the crankshaft 112. The crankshaft cap 202 can be bolted to a uniblock 102 or otherwise suitably secured to the uniblock 102. As illustrated in FIG. 83, the crankshaft cap 202 can have partially embedded cooling structures 744. In some configurations, the crankshaft cap 202 can include one or more oil passages 750. In some configurations, openings can allow the flow of oil from the oil passages 750 to the respective crankshaft 112.

In some configurations, the uniblock 102 also can include oil passages 750. The oil passages 750 can help to cool the uniblock 102 and/or other engine components. In some configurations, the oil passages 750 can include one or more openings to facilitate the flow of oil into and out of the oil passages 750 of the uniblock 102.

Figure 84:
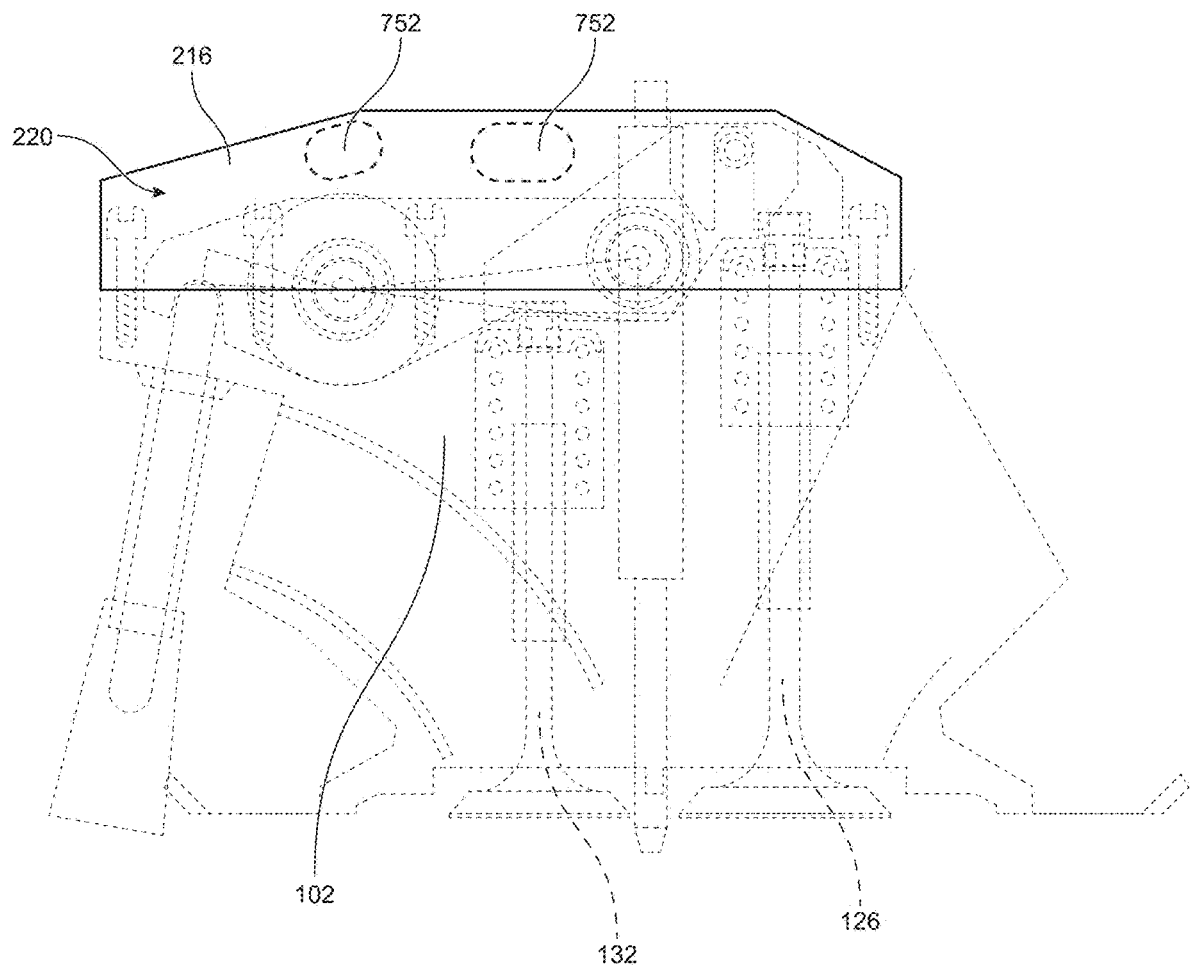
FIG. 84 illustrates a camshaft cap that can be used with internal combustion engines having uniblocks.

In some configurations, the internal combustion engine 100 using the uniblock 102 can include one or more camshafts that can be used to actuate one or more valves (e.g., intake valves 126 and/or exhaust valves 132). In some configurations, the camshaft(s) can be enclosed in a chamber 220. For example, the valve train cover 216 can be mounted to the uniblock 102 to enclose the valve train. As illustrated in FIG. 84, the valve train cover 216 can be bolted or otherwise secured to the uniblock 102 and can enclose the valve train that drives the intake valves 126 and the exhaust valves 132. The valve train cover 216 can include oil passages 752. Openings can allow for the flow of oil or other coolants from the oil passages 752 to the camshaft and/or to other components covered by the valve train cover 216, such as, for example, lash adjusters and/or other components of a valve actuation system.

Figure 85:
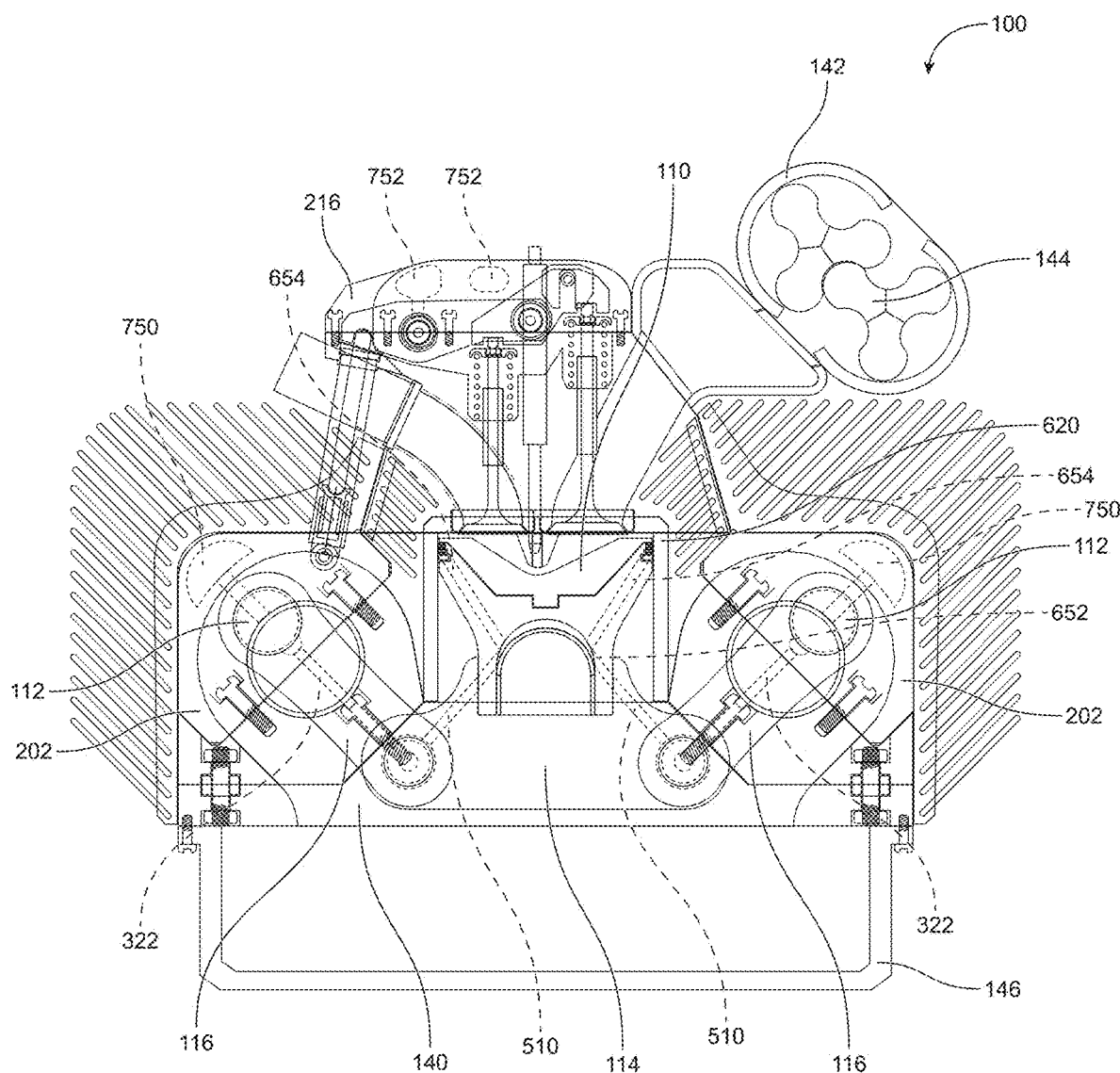
FIG. 85 illustrates a configuration of the internal combustion engine of FIG. 1 with cooling structures and other auxiliary components.

FIG. 85 illustrates another configuration of the internal combustion engine 100 using the uniblock 102. According to some configurations, oil can flow from the oil passages 750 in the crankshaft caps 202 to the crankshafts 112. In some configurations, the crankshafts 112 may include one or more oil passages. Oil can flow from the crankshafts 112 to the oil passages 322 of the connecting rods 116. Oil can flow from the oil passages 322 of the connecting rods 116 to the oil passages 510 of the crosshead 114. From the crosshead 114, oil can flow into the oil passages 652, 654 of the piston 110. The oil passages 652, 654 can provide lubrication to the piston rings 620 of the piston 110. Oil passages can be used to provide lubrication to the camshaft and/or other components of a valve actuation system. The arrangement depicted in FIG. 85, however, uses a pushrod arrangement to drive the valve actuation system instead of the camshaft. The lubrication arrangement depicted in FIG. 85 can be readily adapted to any other configurations. Additionally, as illustrated in FIG. 85, the example internal combustion engine 100 can include the intake plenum 142, the scavenging blower/supercharger 144, and/or the oil pan 146.

Baseplates

As illustrated in FIG. 1 and in FIG. 85, for example, in some configurations, the baseplate 140 can be provided. Depending upon the configuration, one or more uniblock 102 can be mounted to the baseplate 140 to define the type of internal combustion engine that results.

Figure 86:
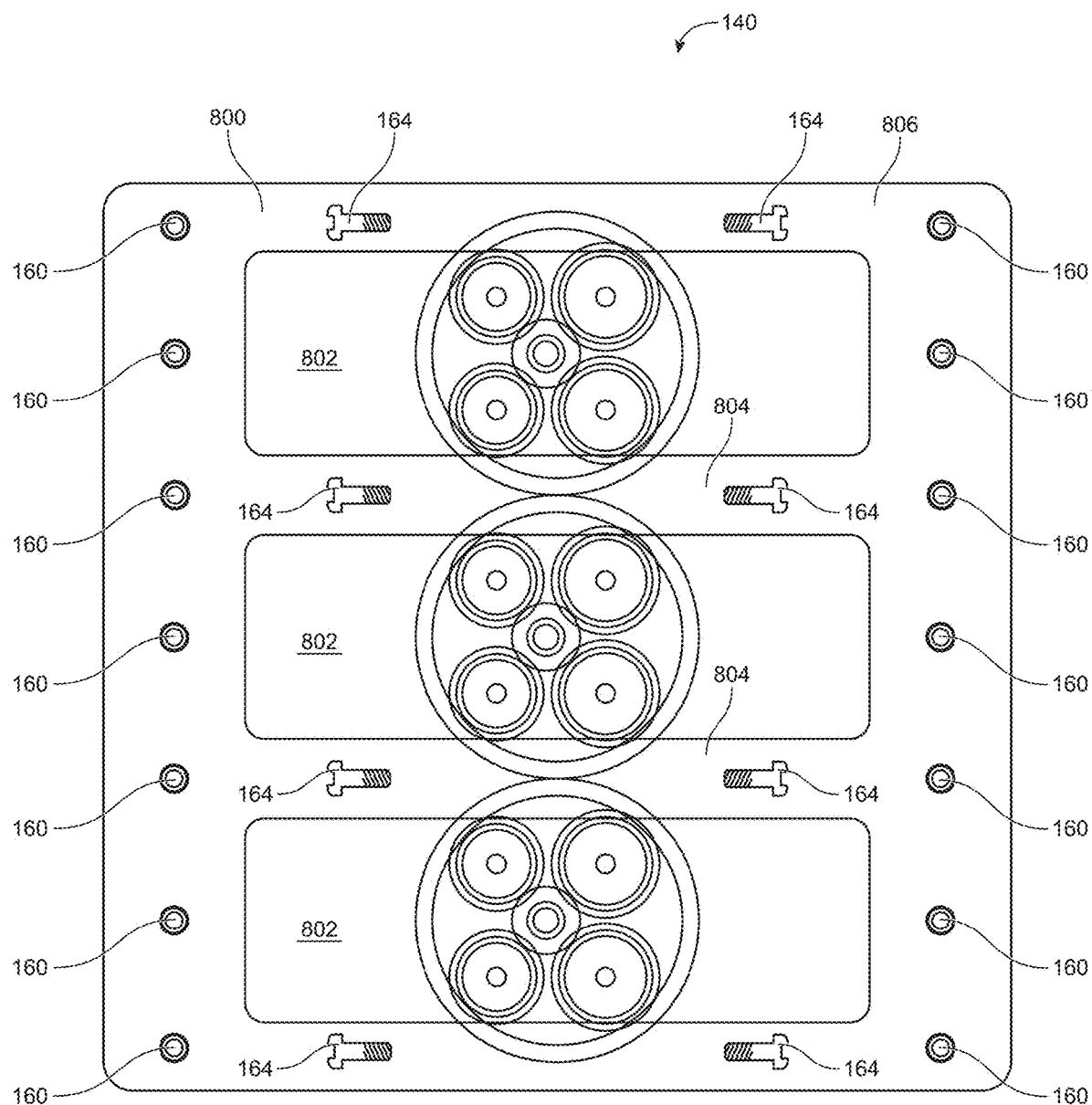
FIG. 86 illustrates a bottom view of an example configuration of a baseplate.
Figure 87:
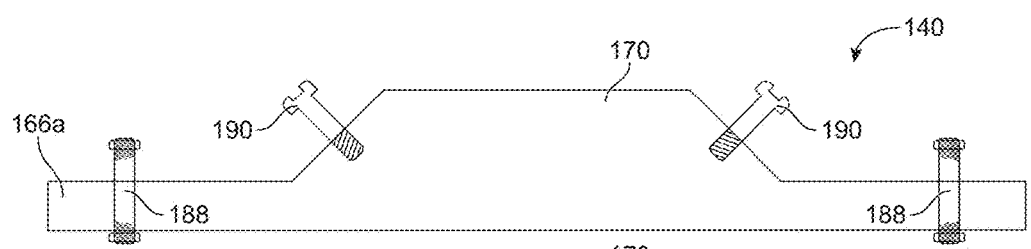
FIGS. 87-90 illustrate various examples of baseplates that can be used with internal combustion engines employing uniblocks.

With reference to FIG. 86, the illustrated baseplate 140 is configured for a three-cylinder engine (or a six-cylinder engine). The baseplate 140 can comprise a body 800. In some configurations, the body 800 comprises a generally plate like structure with a central plateau. The body comprises one or more central cavity, recess, or opening 802. The central cavity, recess, or opening 802 can accommodate engine components, and lubricating oil, for example but without limitation. In the illustrated configuration, the body 800 comprises three such openings 802. The baseplate 140 can be altered to accommodate any number of cylinders. In some configurations, one cavity, recess, or opening 802 will be provided for each uniblock 102 (e.g., in an in-line engine) or pair of paired uniblocks 102 (e.g., opposed engine). The openings 802 in the illustrated configuration are separated by a stringer 804. The stringers 804 extend from one side of a frame 806 to another side of the frame 806. In some configurations, the stringers 804 define at least a portion of the central plateau. The central plateau results from the embossed region 170 that is illustrated in FIG. 6, for example. In some configurations, the baseplate(s) 140, and their stringers 804 can be sufficiently thick to have added, either at fabrication, or later, passages for lubrication or other fluids.

The illustrated baseplate 140 comprises a plurality of outer mounting holes 160. The mounting holes 160 can be used to secure the uniblock 102 to the baseplate 140. In some configurations, the plurality of outer mounting holes 160 can be threaded. In some configurations, the plurality of outer mounting holes 160 may not be threaded. For example, if the uniblock 102 includes non-threaded outer mounting holes 154, the plurality of outer mounting holes 160 of the baseplate 140 may be threaded. Alternatively, if the outer mounting holes 154 of the uniblock 102 are threaded, the plurality of outer mounting holes 160 of the baseplate 140 may not be threaded. In some configurations, neither the outer mounting holes 154 of the uniblock 102 nor the outer mounting holes 160 of the baseplate 140 are threaded. For example, in some configurations, threaded studs can be used as the second fasteners 166, as illustrated in FIG. 6, for example but without limitation. The threaded studs 166 can be connected to the baseplate 140 and the uniblock 102. The threaded studs 166 can pass through the outer mounting holes 160 of the uniblock 102 and the threaded studs 166 can be secured using nuts, for example but without limitation, to one or a pair of uniblocks 102. In the configuration illustrated in FIG. 86, the baseplate 140 is shown with a combination of the threaded studs 166 (with nuts) and the bolts 164. The bolts 164 can be mechanically coupled to the baseplate 140 by way of inner mounting holes 162, which are shown in FIG. 6, for example but without limitation.

In some configurations, the shape of the baseplate 140, the size of the baseplate 140, and so forth can be varied to accommodate various engine configurations. For example, in some configurations, the baseplate 140 can be thicker to accommodate a longer stroke length of the piston 110. In some configurations, the baseplate 140 can be thinner in internal combustion engines 100 that use a shorter stroke length of the piston 110. In some configurations, the baseplate 140 can be interchangeable. For example, the thinner baseplate 140 can be swapped for the thicker baseplate 140 to accommodate a longer stroke length of the piston 110.

FIGS. 87-90 illustrate various examples of the baseplate 140, each of which is arranged and configured in accordance with certain features, aspects, and advantages of the present disclosure. The baseplate 140 of FIG. 87 can be designed to accommodate the uniblocks 102 on a single side of the baseplate 140. The baseplate 140 of FIG. 87 can be used in various engine designs such as, for example, an inline engine design. In the inline engine, the baseplate 140 (shown in FIG. 87) can be relatively thin and need not accommodate uniblocks 102 on opposite sides of the baseplate 140. Accordingly, the raised embossed region 170 is not present on both sides of the baseplate 140.

Figure 88:
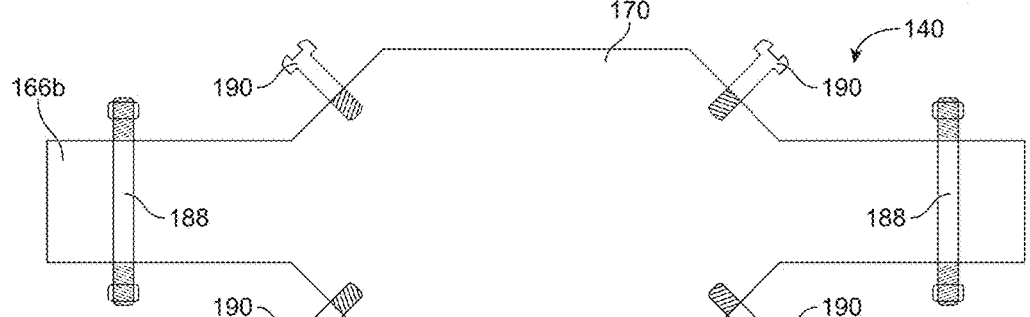

The baseplate 140 of FIG. 88 can be designed to accommodate two uniblocks 102 disposed on opposite sides of the baseplate 140. The baseplate 140 of FIG. 88 can be used in various engine designs such as, for example, opposed compact, opposed balanced, or captive free piston engine designs. In some configurations, the baseplate 140 of FIG. 88 can be configured for a captured free piston engine. In the captured free piston engine, the pistons 110 move in the same direction at the same time and are coupled to each other, which can facilitate the use of the smaller crosshead 114, thereby enabling the use of the thinner baseplate 140.

Figure 89:
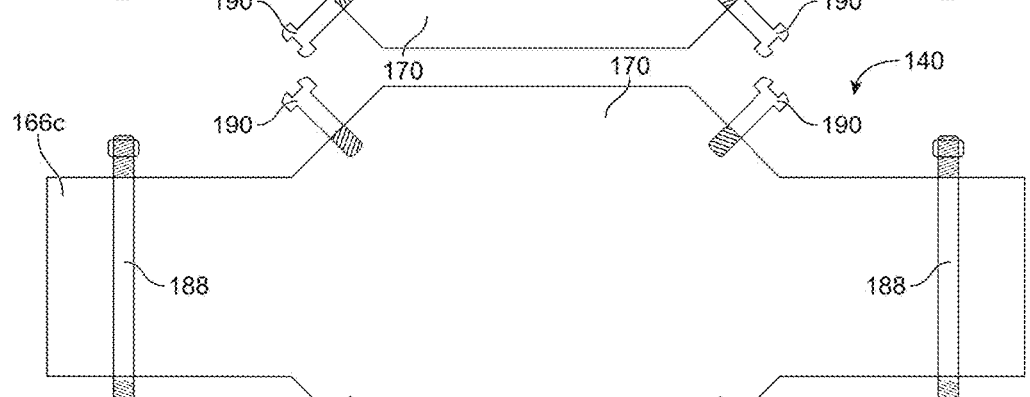
Figure 90:
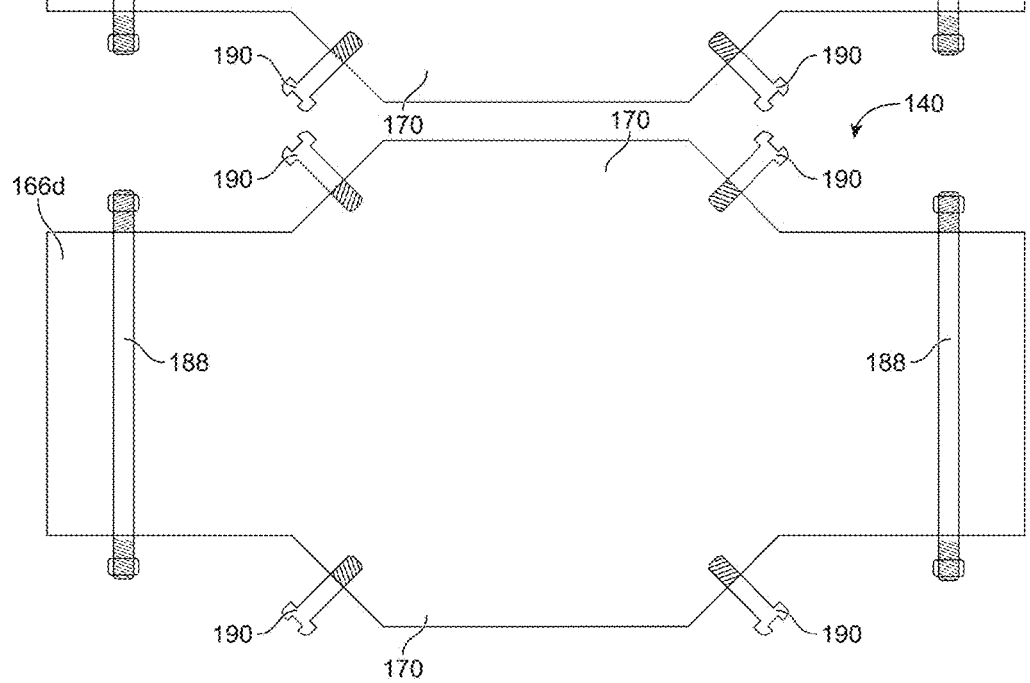

With reference to FIGS. 89 and 90, the baseplates 140 illustrated therein are broadly similar to the baseplate 140 illustrated in FIG. 88. As demonstrated by FIGS. 88-90, the baseplates 140 can be provided in a variety of overall thicknesses. In some configurations, the baseplate 140 of FIG. 89 can be configured for an opposed piston compact engine. In the opposed compact engine, each piston 110 may be coupled to the associated crosshead 114 and the opposed pistons 110 may not be coupled to each other in some configurations. Accordingly, the thickness of the baseplate 140 may be thicker than the baseplate 140 shown in FIG. 88 and used in the captured free piston engine. In some configurations, the baseplate 140 of FIG. 90 can be configured for an opposed piston balanced engine. In the opposed balanced engine, the pistons 110 may move in opposite directions, for example, so that both pistons 110 of the pair of opposed pistons 110 are at top dead center or bottom dead center at the same time.

As shown in FIGS. 87-90, the baseplates 140 can have raised embossed regions 170. For example, there can be one or more embossed regions 170 on one side of the baseplate 140 (i.e., when configured to be used in an inline engine, V engine, etc.). There can be one or more embossed regions 170 on opposing sides of the baseplate 140 when configured to be used in opposed engine designs, such as the captive free piston, opposed compact, and opposed balanced engine designs. The embossed regions 170 can generally align with the pistons 110 of the internal combustion engine 100 with the uniblock 102. The embossed regions 170 can define or include recesses or openings such that the embossed regions 170 do not interfere with movement of the pistons 110, the crossheads 114, or the connecting rods 116, for example but without limitation.

The embossed regions 170 can provide several benefits. For example, the embossed regions 170 can help to align the uniblock 102 with the baseplate 140. In other words, the uniblock 102 can include the mounting region 150 with the central recess 152 (see FIG. 3) to accommodate the embossed regions 170 of the baseplate 140. The embossed regions 170 can increase the structural integrity of the baseplate 140 and/or the structural integrity of the internal combustion engine 100 that uses the baseplate 140. In some configurations, the baseplate 140 may not include embossed regions 170.

Figure 100:
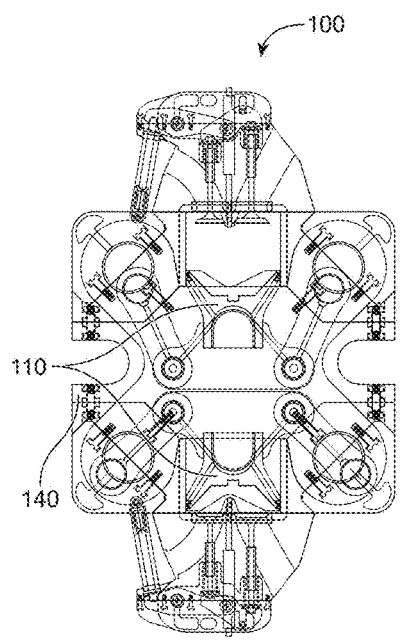

While some configurations of the internal combustion engine 100 using the uniblock 102 implement baseplates 140, in some cases it may be desirable not to include a baseplate 140. For example, in some small engine use cases, it may be desirable to not include any baseplate 140. Not using any baseplate can reduce the material cost of the internal combustion engine 100 using the uniblock 102. In some configurations that do not use any baseplate, the internal combustion engine 100 may include internal bracing 810. The internal bracing 810 can include partial baseplates and/or structural ribs that can be coupled to the inside of the uniblock(s) 102. In some configurations, the internal bracing 810 takes the form of the embossed regions 170 of the stringers 804 of the baseplates. Desirably, the internal bracing 810 fills the central recess 152 of the mounting region 150 of the uniblock 102. While baseplates 140 are illustrated in FIGS. 91, 94, 91, and 100, internal bracing 810 is demonstrated in FIGS. 92, 95, 98, and 101, for example but without limitation.

With reference now to FIGS. 91-102, simplified schematic sectional views of the internal combustion engine 100 with one or more uniblocks 102 are illustrated in various configurations. As mentioned above, three drawings are provided of four types of engine configurations in FIGS. 91-102. The first drawing of the set features the baseplate 140, the second drawing features the internal bracing 810, and the third drawing features a direct connection with no baseplate 140 and no internal bracing 810.

Figure 91:
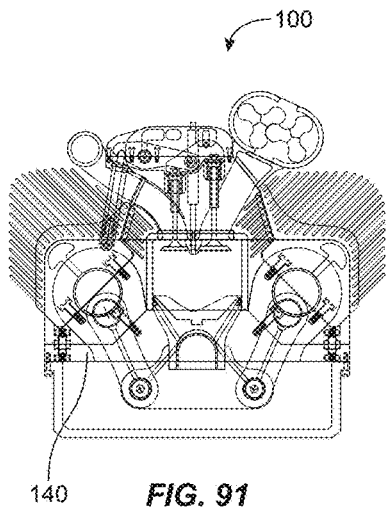
FIGS. 91-102 illustrate examples of internal combustion engines employing uniblocks having baseplates, reinforcing, and no reinforcing.
Figure 92:
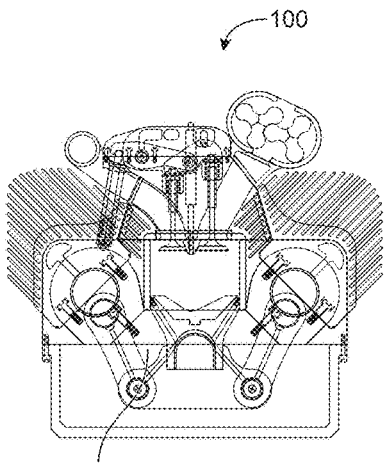
Figure 93:
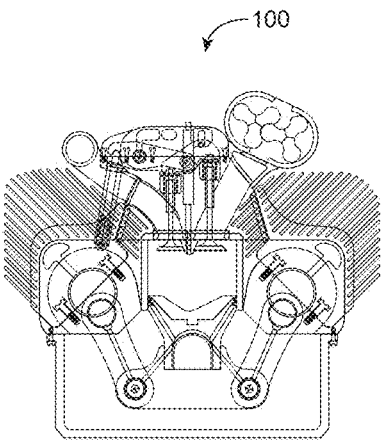

FIGS. 91-93 illustrate the internal combustion engine 100 configured as an inline engine. As discussed, FIG. 91 incorporates a baseplate 140, while FIG. 92 incorporates the internal bracing 810, and FIG. 93 incorporates neither.

Figure 94:
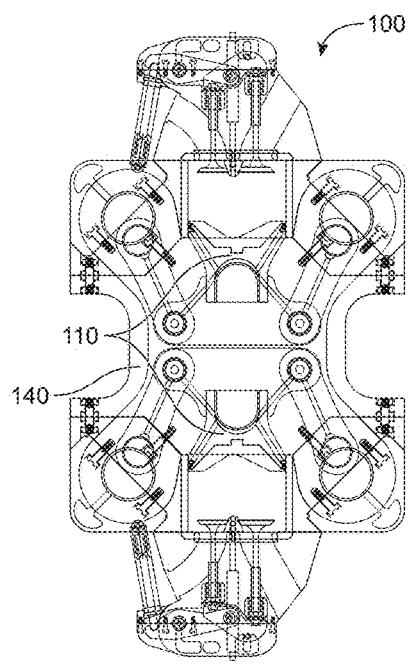
Figure 95:
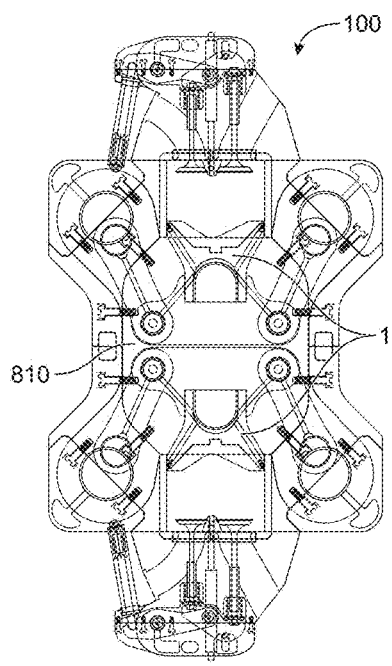
Figure 96:
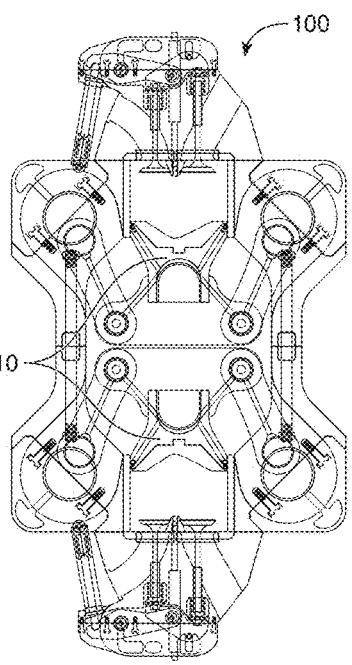

FIGS. 94-96 illustrate the internal combustion engine 100 configured as an opposed piston compact engine. In the configuration of FIGS. 94-96, the pistons 110 are paired together. The pair of pistons 110 moves in the same direction at the same time such that, when one piston 110 is at top dead center, the other piston 110 is at bottom dead center. In such a construction, multiple pairs of pistons 110 can be used to achieve balancing.

Figure 97:
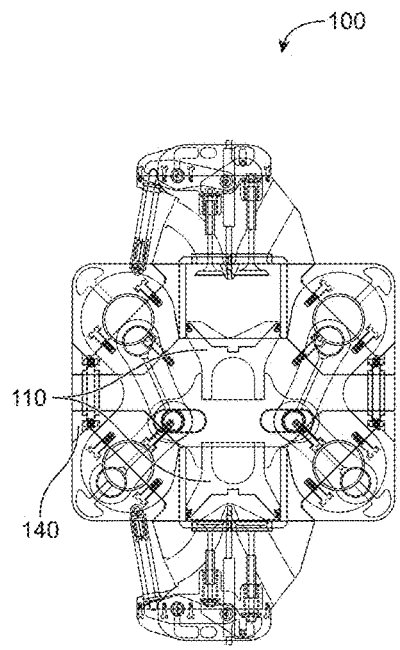
Figure 98:
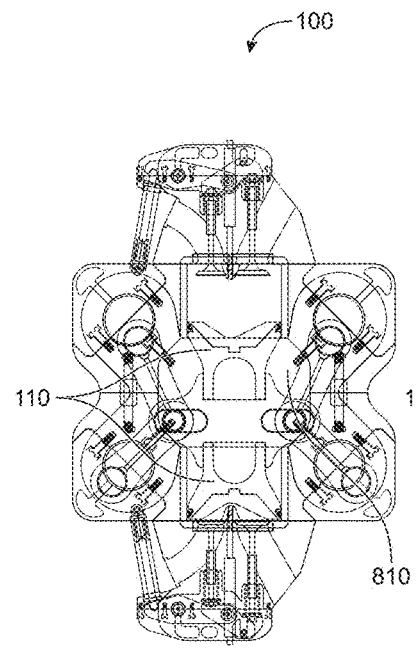
Figure 99:
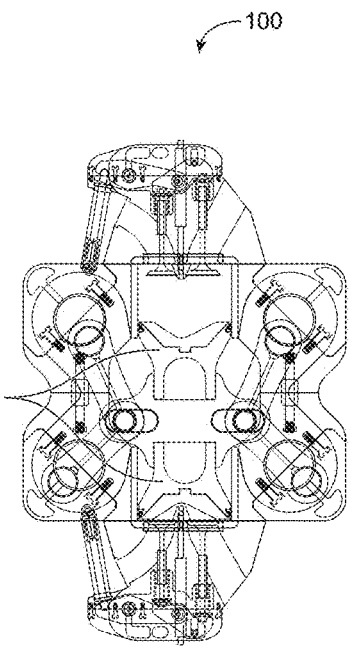

FIGS. 97-99 illustrate the internal combustion engine 100 configured as an opposed piston balanced construction. As shown in FIGS. 97-99, in the opposed piston balanced construction, the pistons 110 can move opposite of one another, such that both of the pistons 110 are at top dead center at the same and/or at bottom dead center at the same time.

Figure 101:
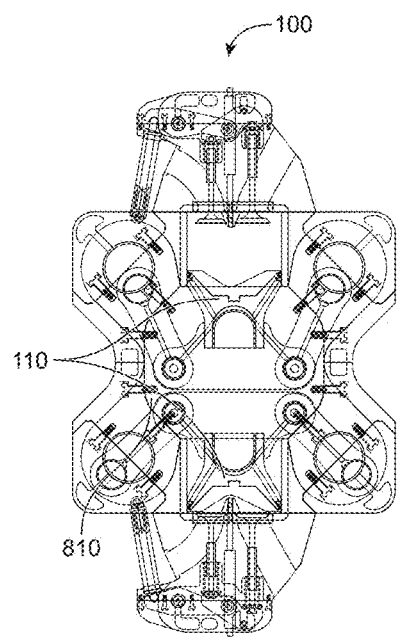
Figure 102:
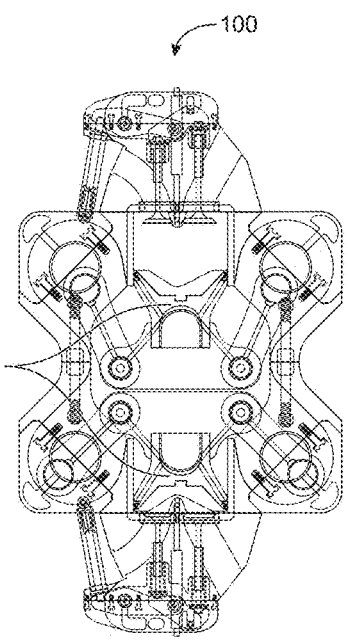

FIG. 100-102 illustrates the internal combustion engine 100 configured as a captive free piston construction. As shown in FIGS. 100-102, the pair of pistons 110 can be immovably coupled to one another by the crosshead 114. In such a construction, when one piston 110 moves, the other piston 110 moves in the same direction.

Conditional language used herein, such as, among others, "can," "could," "might," "may," "e.g.," and the like, unless specifically stated otherwise, or otherwise understood within the context as used, is generally intended to convey that certain configurations include, while other configurations do not include, certain features, elements and/or states. Thus, such conditional language is not generally intended to imply that features, elements and/or states are in any way required for one or more configurations or that one or more configurations necessarily include these features, elements and/or states.

Conjunctive language, such as the phrase "at least one of X, Y, and Z," unless specifically stated otherwise, or otherwise understood within the context as used, is generally intended to convey that an item, term, etc. may be either X, Y, or Z. Thus, such conjunctive language is not generally intended to imply that certain configurations require the presence of at least one of X, at least one of Y, and at least one of Z.

While the above detailed description may have shown, described, and pointed out novel features as applied to various configurations, it may be understood that various omissions, substitutions, and/or changes in the form and details of any particular configuration may be made without departing from the spirit of the disclosure. As may be recognized, certain configurations may be embodied within a form that does not provide all of the features and benefits set forth herein, because some features may be used or practiced separately from others.

Additionally, features described in connection with one configuration can be incorporated into another of the disclosed configurations, even if not expressly discussed herein, and configurations having the combination of features still fall within the scope of the disclosure. For example, features described above in connection with one configuration can be used with a different configuration described herein and the combination still fall within the scope of the disclosure.

It should be understood that various features and aspects of the disclosed configurations can be combined with, or substituted for, one another in order to form varying modes of the configurations of the disclosure. Thus, it is intended that the scope of the disclosure herein should not be limited by the particular configurations described above. Accordingly, unless otherwise stated, or unless clearly incompatible, each configuration of this disclosure may comprise, additional to or in place of its features described herein, one or more features as described herein from each other configuration disclosed herein.

Features, materials, characteristics, or groups described in conjunction with a particular aspect, configuration, or example are to be understood to be applicable to any other aspect, configuration, or example described in this section or elsewhere in this specification unless incompatible therewith. All of the features disclosed in this specification (including any accompanying claims, abstract, and drawings), and/or any or all of the steps of any method or process so disclosed, may be combined in any combination, except combinations where at least some of such features and/or steps are mutually exclusive. The protection is not restricted to the details of any foregoing configurations. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some configurations, the actual steps taken in the processes illustrated and/or disclosed may differ from those shown in the figures. Depending on the configuration, certain of the steps described above may be removed, others may be added.

Furthermore, the features and attributes of the specific configurations disclosed above may be combined in different ways to form additional configurations, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular configuration. Thus, for example, those skilled in the art will recognize that the disclosure may be embodied or carried out in a manner that achieves one advantage or a group of advantages as taught herein without necessarily achieving other advantages as may be taught or suggested herein.

Language of degree, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain configurations, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred configurations in this specification and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Unless the context clearly requires otherwise, throughout the description and the claims, the words "comprise," "comprising," and the like are to be construed in an inclusive sense as opposed to an exclusive or exhaustive sense, that is to say, in the sense of "including, but not limited to."

Reference to any prior art in this description is not, and should not be taken as, an acknowledgement or any form of suggestion that that prior art forms part of the common general knowledge in the field of endeavor in any country in the world.

The invention may also be said broadly to consist in the parts, elements, and features referred to or indicated in the description of the application, individually or collectively, in any or all combinations of two or more of those parts, elements, or features.

Where, in the foregoing description, reference has been made to integers or components having known equivalents, those integers or components are herein incorporated as if individually set forth. In addition, where the term "substantially" or any of its variants have been used as a word of approximation adjacent to a numerical value or range, it is intended to provide sufficient flexibility in the adjacent numerical value or range that encompasses standard manufacturing tolerances and/or rounding to the next significant figure, whichever is greater.

It should be noted that various changes and modifications to the presently preferred configurations described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present configurations. Accordingly, the scope of protection is intended to be defined only by the claims.

What is claimed is:

1. An internal combustion engine comprising:
   a cylinder block, the cylinder block defining a cylinder bore;
   a piston capable of reciprocating within the cylinder bore between top dead center and bottom dead center;
   a combustion chamber defined above the piston within the cylinder bore;
   a cylinder sleeve surrounding the piston in all positions between top dead center and bottom dead center, the cylinder sleeve comprising:
      a first cylinder sleeve layer having a first thermal conductivity, at least a portion of the first cylinder sleeve layer exposed to the combustion chamber; and
      a second cylinder sleeve layer positioned radially outward relative to the first cylinder sleeve layer, the second cylinder sleeve layer having a second thermal conductivity less than the first thermal conductivity to reduce heat transfer from the combustion chamber to the cylinder block; and
   a cylinder top plate positioned between a top of the cylinder bore and a top end of the cylinder sleeve, the cylinder top plate comprising at least one intake opening, the at least one intake opening receiving a valve seat, the valve seat cooperating with an intake valve to open and close an intake air passage.

2. The internal combustion engine of claim 1, wherein the cylinder sleeve comprises a third cylinder sleeve layer, the third cylinder sleeve layer comprises a third thermal conductivity, and one or more of the first cylinder sleeve layer, the second cylinder sleeve layer, or the third cylinder sleeve layer is formed of a material selected from a group consisting of invar, nickel-chromium-based alloys, stainless steel, ductile grey cast iron, and aluminum.

3. The internal combustion engine of claim 1, further comprising a baffle, the baffle extending downwards into the cylinder bore from the cylinder top plate.

4. The internal combustion engine of claim 3, wherein the cylinder top plate comprises a lower surface and the baffle extends downward to a height of at least 5 mm below the lower surface of the cylinder top plate.

5. The internal combustion engine of claim 3, wherein the baffle covers about 25% of a valve curtain when the intake valve is open.

6. The internal combustion engine of claim 3, wherein the baffle is formed from a material having a thermal conductivity of less than 15 W/m*K.

7. The internal combustion engine of claim 6, wherein the baffle is formed from a nickel-chromium-based alloy.

8. The internal combustion engine of claim 1, wherein the cylinder top plate comprises a multi-layer construction, the multi-layer construction comprising a first cylinder top plate layer and a second cylinder top plate layer.

9. The internal combustion engine of claim 8, wherein the multi-layer construction comprises a third cylinder top plate layer and each of the first cylinder top plate layer, the second cylinder top plate layer, and the third cylinder top plate layer has a different thermal conductivity.

10. The internal combustion engine of claim 9, wherein at least one of the first cylinder top plate layer, the second cylinder top plate layer, or the third cylinder top plate layer comprises a material configured to cushion vibration or shock.

11. The internal combustion engine of claim 8, wherein the cylinder top plate comprises a central opening that accommodates an injector.

12. The internal combustion engine of claim 1, wherein the piston comprises a first portion and a second portion, the first portion and the second portion being formed of different materials and secured together, wherein an uppermost portion of the piston defines a crown formed of a material having a thermal conductivity of less than 15 W/m*K.

13. The internal combustion engine of claim 1, further comprising a baffle, the baffle extending downwards into the cylinder bore from a top end of the cylinder bore.

14. The internal combustion engine of claim 13, wherein the baffle is integrally formed with the cylinder top plate.

15. The internal combustion engine of claim 13, wherein the internal combustion engine comprises two exhaust valves and two intake valves, and wherein the baffle is positioned such that the two exhaust valves are on a first lateral side of the baffle and the two intake valves are on a second lateral side of the baffle.

16. The internal combustion engine of claim 13, wherein the piston comprises a crown, the crown of the piston being provided with a recess that accommodates the baffle when the piston is at top dead center.

17. The internal combustion engine of claim 1, wherein the cylinder top plate and the cylinder sleeve are integrally formed.

18. The internal combustion engine of claim 1, wherein the cylinder top plate has an outer perimeter, the outer perimeter defining a round shape.

19. The internal combustion engine of claim 1, wherein the piston comprises an oil labyrinth formed within the piston to provide oil to one or more piston rings.

20. An internal combustion engine comprising:
a cylinder block, the cylinder block defining a cylinder bore;
a piston capable of reciprocating within the cylinder bore between top dead center and bottom dead center;
a cylinder sleeve surrounding the piston in all positions between top dead center and bottom dead center, the cylinder sleeve configured to be inserted into the cylinder block from a bottom of the cylinder bore, the cylinder sleeve comprising:
a first cylinder sleeve layer having a first thermal conductivity; and
a second cylinder sleeve layer having a second thermal conductivity; and
a cylinder top plate positioned between a top of the cylinder bore and a top end of the cylinder sleeve, the cylinder top plate comprising at least one intake opening, the at least one intake opening receiving a valve seat, the valve seat cooperating with an intake valve to open and close an intake air passage.

21. An internal combustion engine comprising:
a cylinder block, the cylinder block defining a cylinder bore;
a piston capable of reciprocating within the cylinder bore between top dead center and bottom dead center;
a cylinder sleeve surrounding the piston in all positions between top dead center and bottom dead center, the cylinder sleeve comprising:
a first cylinder sleeve layer having a first thermal conductivity; and
a second cylinder sleeve layer having a second thermal conductivity, the second cylinder sleeve layer press fit within the first cylinder sleeve layer; and
a cylinder top plate positioned between a top of the cylinder bore and a top end of the cylinder sleeve, the cylinder top plate comprising at least one intake opening, the at least one intake opening receiving a valve seat, the valve seat cooperating with an intake valve to open and close an intake air passage.

22. The internal combustion engine of claim 1, wherein a length of the first cylinder sleeve layer is greater than a length of the second cylinder sleeve layer.

23. The internal combustion engine of claim 22, wherein a rate of heat transfer to the cylinder block at a first location where the combustion chamber is separated from the cylinder block by both the first cylinder sleeve layer and the second cylinder sleeve layer is different than a rate of heat transfer to the cylinder block at a second location where the combustion chamber is separated from the cylinder block by the first cylinder sleeve layer but not the second cylinder sleeve layer.

* * * * *